United States Patent
Radelet et al.

(10) Patent No.: US 10,942,318 B2
(45) Date of Patent: Mar. 9, 2021

(54) SEALED CONNECTION TERMINAL

(71) Applicant: COMMSCOPE CONNECTIVITY BELGIUM BVBA, Kessel-Lo (BE)

(72) Inventors: Christiaan Radelet, Aarschot (BE); David Jan Irma Van Baelen, Winksele (BE); Jan Willem Rietveld, Benschop (NL); Olivier Hubert Daniel Yves Rousseaux, Brussels (BE)

(73) Assignee: COMMSCOPE CONNECTIVITY BELGIUM BVBA

( * ) Notice: Subject to any disclaimer, the term of this patent is extended or adjusted under 35 U.S.C. 154(b) by 0 days.

(21) Appl. No.: 16/482,751

(22) PCT Filed: Feb. 1, 2018

(86) PCT No.: PCT/EP2018/052511
§ 371 (c)(1),
(2) Date: Aug. 1, 2019

(87) PCT Pub. No.: WO2018/141844
PCT Pub. Date: Aug. 9, 2018

(65) Prior Publication Data
US 2019/0353854 A1  Nov. 21, 2019

Related U.S. Application Data

(60) Provisional application No. 62/453,087, filed on Feb. 1, 2017.

(51) Int. Cl.
*G02B 6/38* (2006.01)
*G02B 6/40* (2006.01)
*G02B 6/44* (2006.01)

(52) U.S. Cl.
CPC ............ *G02B 6/3887* (2013.01); *G02B 6/40* (2013.01); *G02B 6/4471* (2013.01); *G02B 6/3894* (2013.01)

(58) Field of Classification Search
None
See application file for complete search history.

(56) References Cited

U.S. PATENT DOCUMENTS 7,376,322 B2  5/2008  Zimmel et al.
7,400,813 B2  7/2008  Zimmel
(Continued)

FOREIGN PATENT DOCUMENTS

FR    2 914 753 A1    10/2008
WO    2016/043922 A1   3/2016
(Continued)

OTHER PUBLICATIONS

International Search Report and Written Opinion of the International Searching Authority for International Patent Application No. PCT/EP2018/052511 dated Aug. 21, 2018, 19 pages.

*Primary Examiner* — Jerry Rahll
(74) *Attorney, Agent, or Firm* — Merchant & Gould P.C.

(57) ABSTRACT

An optical connection terminal includes a first connection module and a second connection module that each terminate multi-fiber cables. The second connection module operatively couples to the first connection module so that at least one of the optical connectors of the first connection module directly optically couples with one of the optical connectors of the second connection module. A connection between the at least one optical connector of the first connection module and the optical connector of the second connection module is sealed from an exterior of the terminal.

31 Claims, 56 Drawing Sheets

(56) References Cited

U.S. PATENT DOCUMENTS

| | | |
|---|---|---|
| 7,418,181 B2 | 8/2008 | Zimmel et al. |
| 9,348,096 B2 | 5/2016 | Kmit et al. |
| 2013/0236139 A1 | 9/2013 | Chen et al. |

FOREIGN PATENT DOCUMENTS

| | | |
|---|---|---|
| WO | 2016/161341 A2 | 10/2016 |
| WO | 2018/017544 A1 | 1/2018 |
| WO | 2018/046450 A1 | 3/2018 |

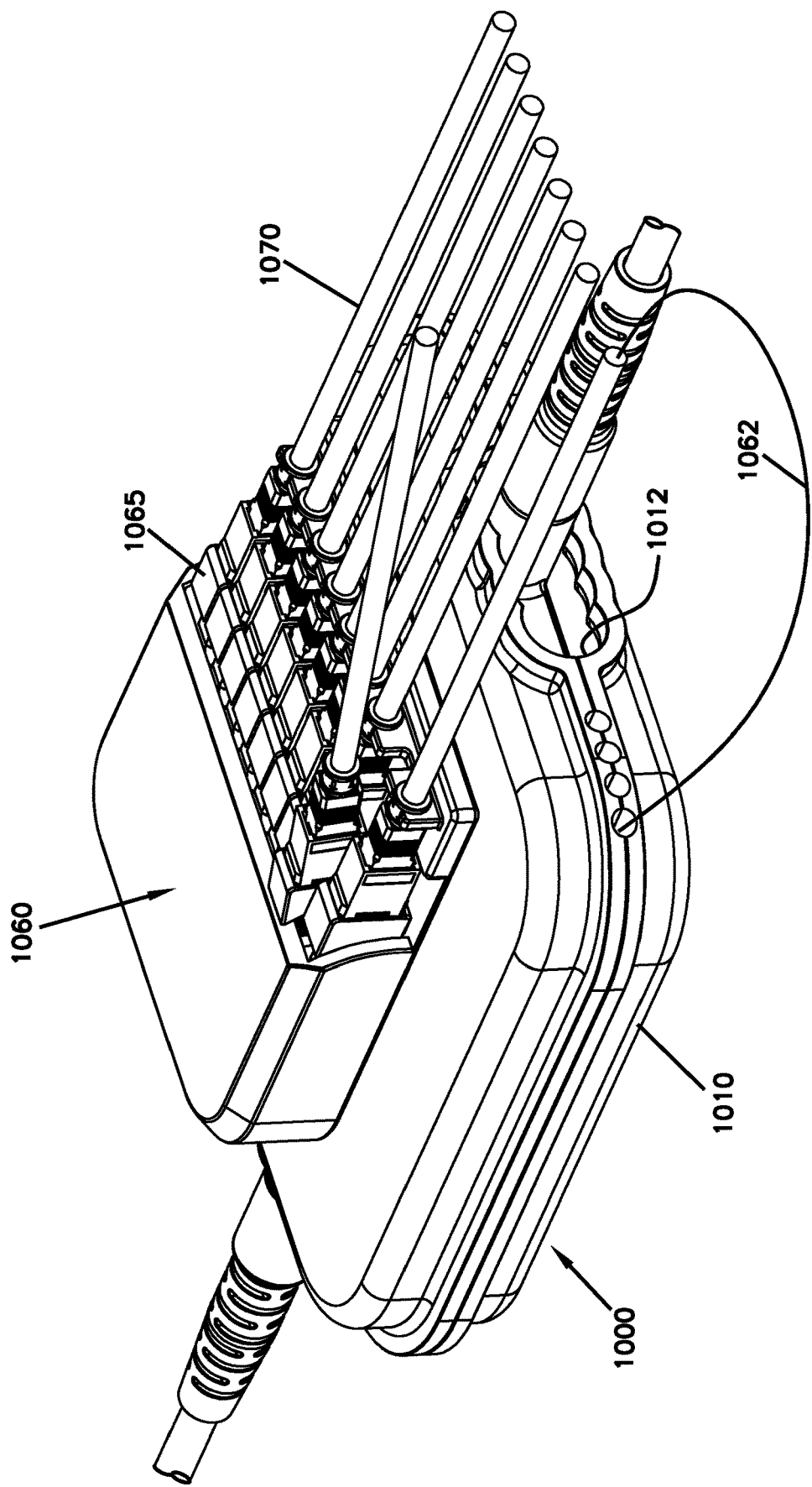

FIG. 58
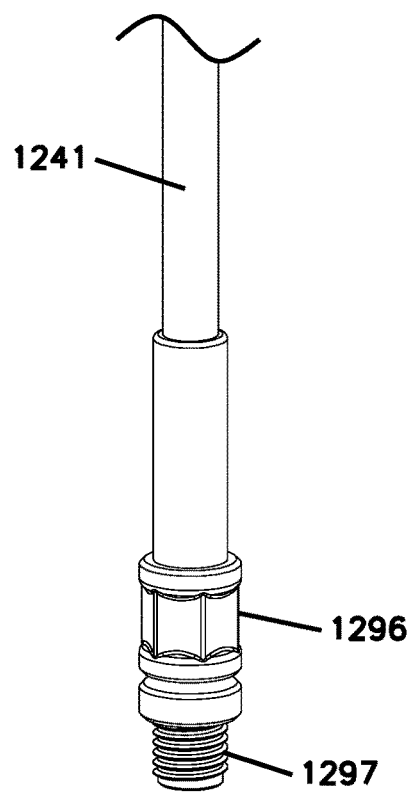
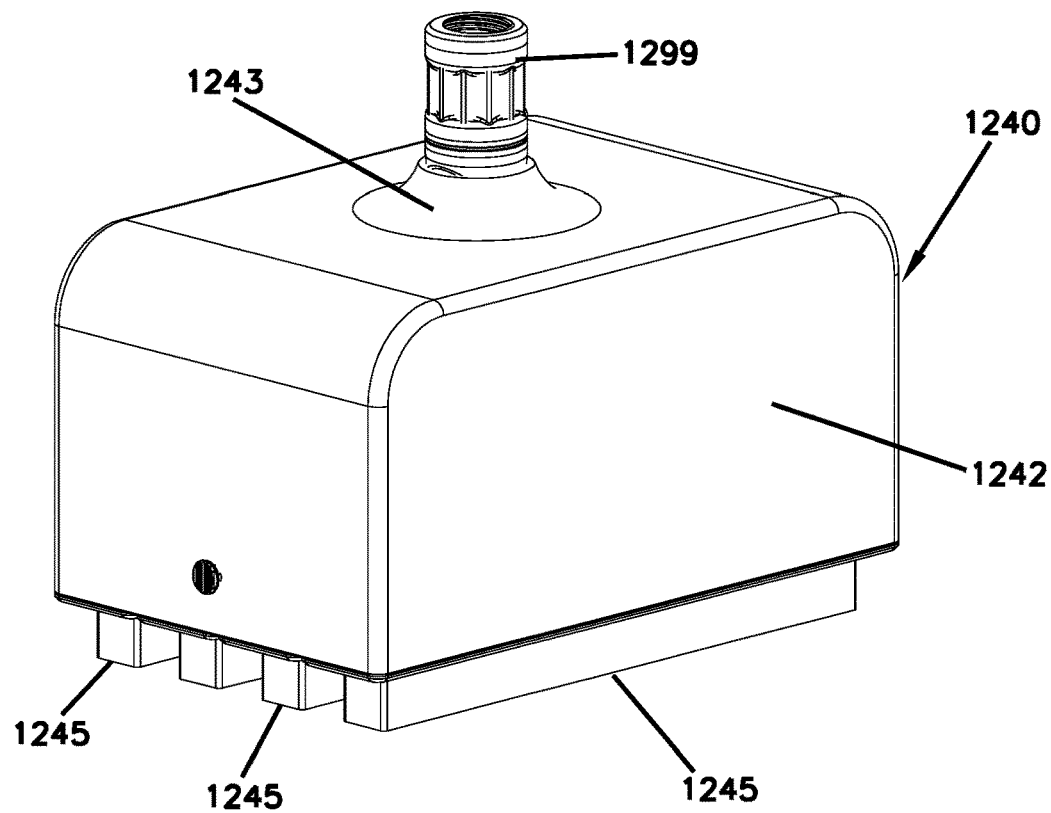

SEALED CONNECTION TERMINAL

CROSS-REFERENCE TO RELATED APPLICATION

This application is a National Stage Application of PCT/EP2018/052511, filed on Feb. 1, 2018, which claims the benefit of U.S. Patent Application Ser. No. 62/453,087, filed on Feb. 1, 2017, the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

Some aspects of the disclosure are directed to using modular arrays of single fiber connectors instead of multi-fiber connectors. For examples, these modular arrays may be used for outside plant, factory-sealed terminal applications. Alternatively, the modular arrays can be utilized for inside plant (e.g., unsealed) application. Advantageously, single fiber connectors tend to provide lower optical attenuation versus ruggedized multi-fiber connectors. The modular arrays also may be more compact and more cost effective than terminals. Such modular arrays may be referred to herein as connection modules.

In certain implementations when connecting the modular arrays, an offset of one or more connector positions allows for field-configurable fiber indexing. Accordingly, a wide range of configurations can be built with a limited number of modules.

In certain implementations, the modular arrays are packaged in a re-enterable, watertight enclosure. In an example, the watertight enclosure seals directly on the cable jacket of cables routed to the modular arrays.

Other aspects of the disclosure are directed to an optical connection terminal including a first connection module terminating a first cable having multiple fibers and a second connection module terminating a second cable having multiple fibers. The first connection module includes at least one row of optical connectors that each terminate at least one of the fibers of the first cable. The second connection module includes at least one row of connectors that each terminate at least one of the fibers of the second cable. The second connection module operatively couples to the first connection module so that at least one of the optical connectors of the first connection module directly optically couples with one of the optical connectors of the second connection module. A connection between the at least one optical connector of the first connection module and the optical connector of the second connection module is sealed from an exterior of the terminal.

Other aspects of the disclosure are directed to an optical connection terminal including a first connection module and a second connection module. Each connection module terminates a respective cable having multiple fibers and includes at least one row of optical connectors that each terminate at least one of the fibers of the respective cable. The second connection module being offset from the first connection module by at least one connector position while at least one of the optical connectors of the first connection module directly optically couples with one of the optical connectors of the second connection module.

In certain implementations, an enclosure defines a sealed interior. The enclosure defines a first sealed port and a second sealed port leading to the sealed interior. The first connection module and the second connection module are disposed within the sealed interior. The first cable extends into the sealed interior of the enclosure through the first sealed port. The second cable extends into the sealed interior of the enclosure through the second sealed port.

In certain implementations, the enclosure defines a sealed tap-off port through which a tap-off cable enters the sealed interior of the enclosure.

In certain implementations, each connection module is configured to anchor to the enclosure to hold the respective connection module in a fixed position relative to the enclosure.

In certain implementations, the first and second connection modules cooperate to define the terminal when operatively coupled together to seal the connection.

In certain examples, the second connection module includes a shroud extending over the row of connectors, the shroud defining an opening leading to a sealing surface recessed within the opening. The opening also leads to the respective row of connectors. The shroud is configured to extend over a portion of the first connection module when the first and second connection modules are operatively coupled.

In certain implementations, a tap-off port remains accessible from an exterior of the terminal when the connection is sealed.

In certain implementations, the optical connectors of the first connection module are male and the optical connectors of the second connection module are female and configured to receive the male connectors of the first connection module.

In certain implementations, a coupler arrangement aligns and optically couples the connectors of the first connection module to the connectors of the second connection module. The coupler arrangement defines a first row of coupler ports and a second row of coupler ports, the second row of coupler ports facing in an opposite direction from the first row of coupler ports. Each coupler port of the first row is aligned with one of the coupler ports of the second row.

In certain implementations, the first row of coupler ports of the coupler arrangement is one of a plurality of rows of coupler ports; and the second row of coupler ports of the coupler arrangement is one of a plurality of rows of coupler ports.

In certain implementations, the coupler arrangement is formed of a one-piece construction.

In certain implementations, the coupler arrangement includes multiple separate couplers.

In certain implementations, each connector module includes a fanout body, the at least one row of connectors accessible from a first end of the fanout body. The cable attached to a second end of the fanout body, the second end of the fanout body defining a tapered neck.

In certain implementations, the first and second ends of each fanout body face in opposite directions.

In certain implementations, the first and second ends of each fanout body face in orthogonal directions.

In certain implementations, the row of connectors of at least one of the connection module is slideable relative to the fanout body.

In certain implementations, the tapered neck of each connector module carries a sealing arrangement including a radial flange that abuts an exterior surface of the enclosure at the respective sealed port.

In certain examples, the radial flange is a first radial flange, and wherein the sealing arrangement includes a sealing surface extending between the first radial flange and a second radial flange. In an example, the sealing surface has a lens shape.

In certain implementations, the row of connectors of at least one of the connection modules is one of a plurality of rows of connectors.

In certain implementations, the first connection module is offset relative to the second connection module when the connection modules are operatively coupled.

In some examples, the first connection module is offset from the second connection module by one connector position. In other examples, the first connection module is offset from the second connection module by a plurality of connector positions.

In certain implementations, the first cable is secured to the first connection module using a twist-to-lock fastener.

In certain implementations, an optical splitter module has an input and a plurality of outputs. The input of the optical splitter module is optically coupled to one of the connectors of one of the first and second connection modules while the first connection module is operatively coupled to the second connection module in an offset configuration.

In certain implementations, an enclosure defines a sealed interior in which the first connection module, second connection module, and splitter module are disposed.

In certain examples, the enclosure includes a divider wall. The optical splitter is disposed at an opposite side of the divider wall from the first and second connection modules. The enclosure is partially openable to provide access to the outputs of the optical splitter without providing access to the first and second connection modules.

In certain examples, fiber flex foils can be used inside of the connection modules.

In some examples, cables routed to the connection modules are terminated by non-ruggedized connectors. In an example, the cables are terminated by non-ruggedized connectors with integrated strain relief. In other examples, cables routed to the connection modules are terminated by ruggedized connectors.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 49 is a perspective view of another example connection terminal having an external splitter module in a second orientation that is rotated 90° from the first orientation;

FIG. 58 shows the multi-fiber cable of FIG. 57 being inserted into an example connection module.

DETAILED DESCRIPTION

Figure 1:
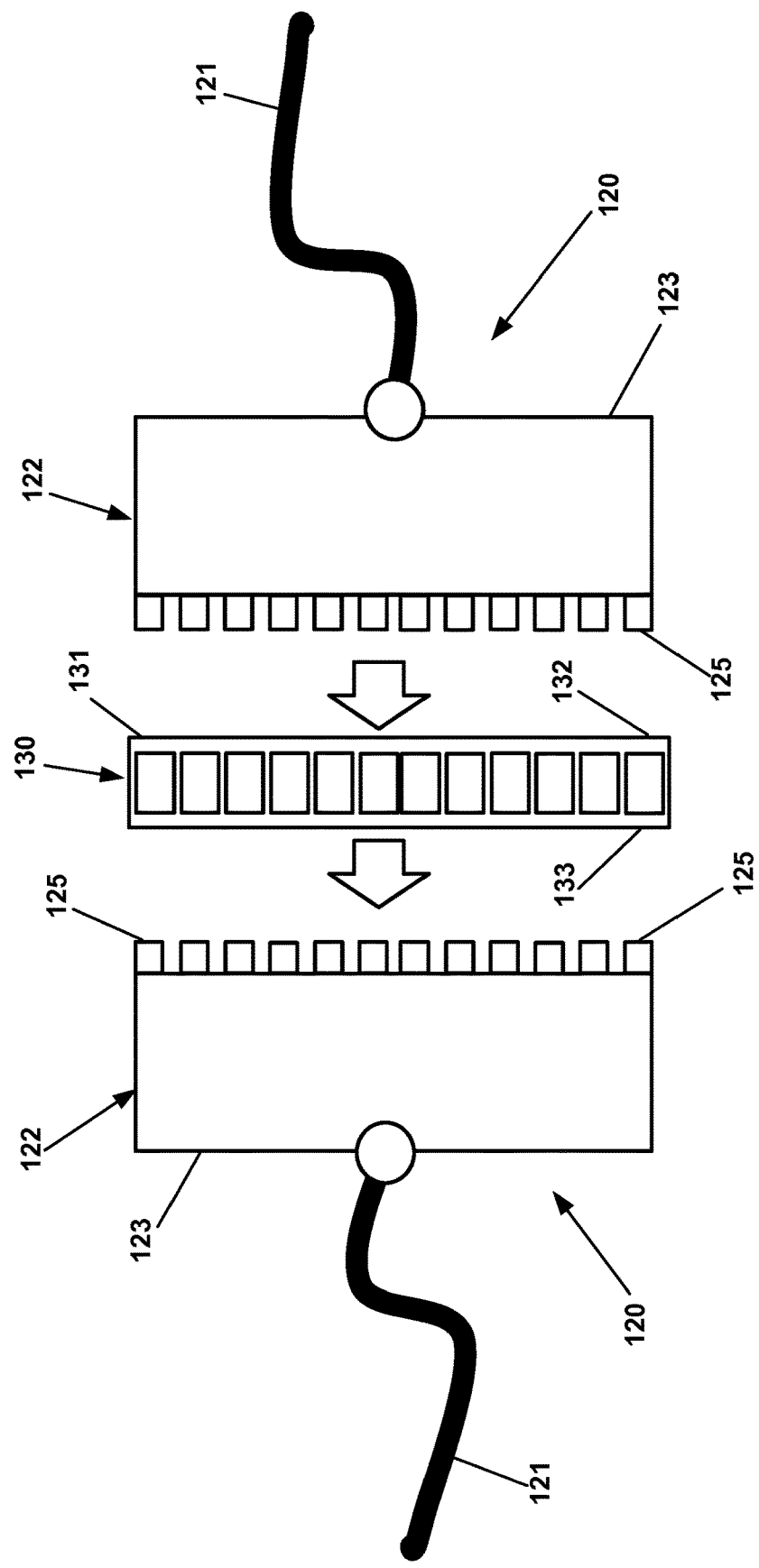
FIG. 1 is illustrates an example connection terminal including two male connection modules that directly optically couple together using a coupler arrangement.
Figure 2:
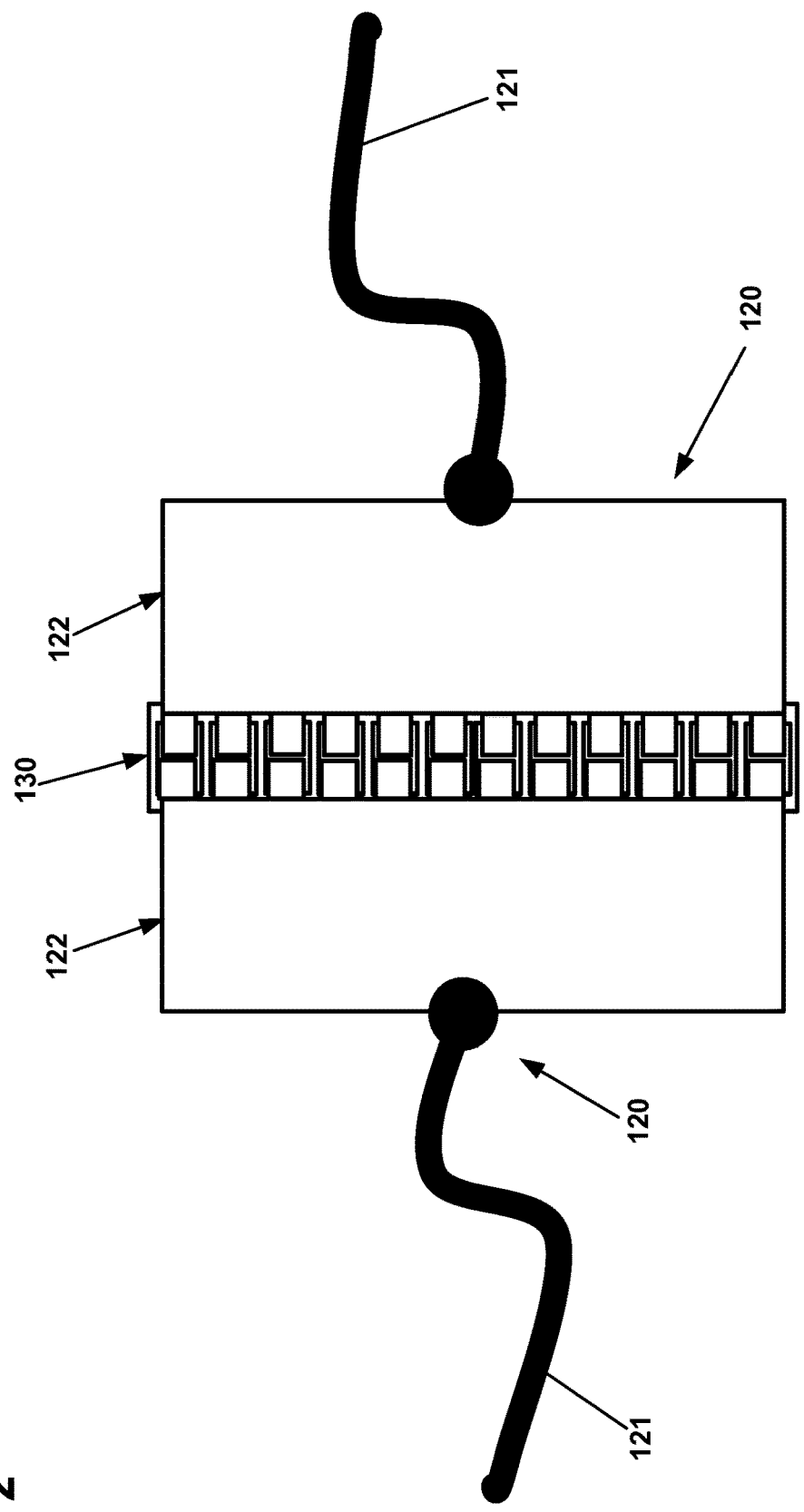
FIG. 2 shows the connection terminal of FIG. 1 with the connection modules directly optically coupled at the coupler arrangement.
Figure 3:
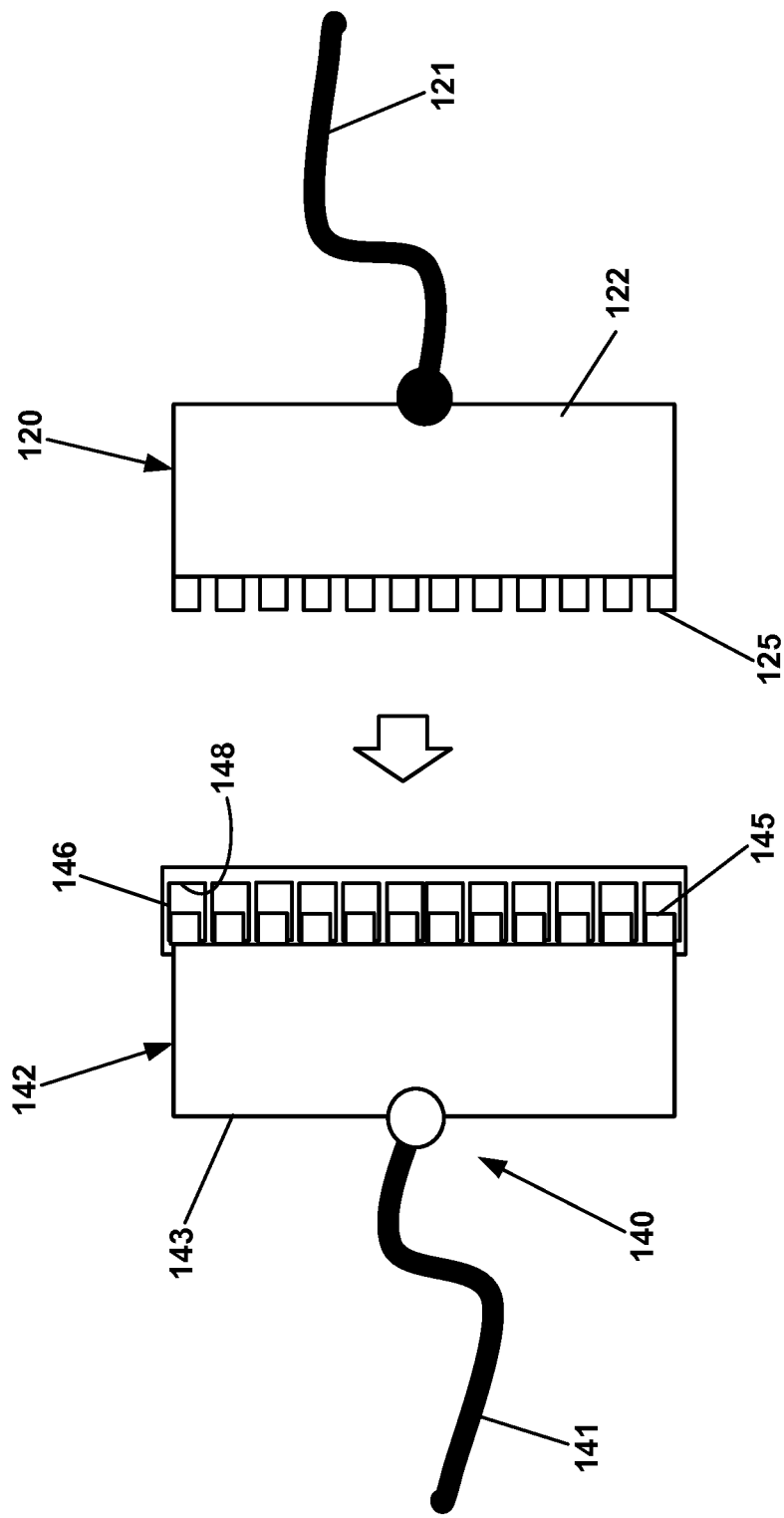
FIG. 3 illustrates an alternative connection terminal including a male connection module and a female connection module.

Reference will now be made in detail to exemplary aspects of the present disclosure that are illustrated in the accompanying drawings. Wherever possible, the same reference numbers will be used throughout the drawings to refer to the same or like parts.

The present disclosure is directed to an optical connection terminal 100 including a first connection module 120 and a second connection module 120, 140 that couple together. As shown in FIGS. 1-6, the first connection module 120 terminates a first cable 121 having multiple fibers 127. The first connection module 120 includes at least one row of optical connectors 125 that each terminate at least one of the fibers 127 of the first cable 121. The second connection module 120, 140 terminates a second cable 121, 141 having multiple fibers 127, 147. The second connection module 120, 140 includes at least one row of connectors 125, 145 that each terminate at least one of the fibers 127 of the second cable 121, 141.

As the reference numbers are assigned herein, the connection module 120 includes male connectors 125 and the connection module 140 includes female connectors 145. In some implementations, the terminal 100 includes two or more male connectors 120 that directly optically couple together using one or more coupler arrangements 130 (i.e., one or more optical adapters) as will be described herein. In other implementations, the terminal 100 includes a male connector 120 and a female connector 140 that directly optically couple together without a separate coupler arrangement 130.

The second connection module 120, 140 operatively couples to the first connection module 120 so that at least one of the optical connectors 125 of the first connection module 120 directly optically couples with one of the optical connectors 125, 145 of the second connection module 120, 140. As the term is used herein, a connector directly optically couples with another connector by aligning optical end faces of the connectors in close proximity to each other. No additional cables are disposed between the optical end faces. Accordingly, routing a patchcord between the first and second connection modules may optically couple the first and second connection modules, but it does not directly optically couple the first and second connection modules.

A connection between the at least one optical connector 125 of the first connection module 120 and the optical connector 125, 145 of the second connection module 120, 140 is sealed from an exterior of the terminal 100.

In some implementations, the connectors 125, 145 are single-fiber connectors. In other implementations, however, the connectors 125, 145 are multi-fiber connectors. In certain implementations, the connectors 125, 145 are keyed. In examples, all connectors in a row are keyed in a common orientation. In an example, all connectors 125, 145 of a connection module 120, 140 are keyed in a common orientation. In certain implementations, the connectors 125,145 are non-ruggedized connectors.

As the term is used herein, a connector is ruggedized if the connector includes structure to enable a robust connection at a port and environmental sealing between the connector and a receiving port. A port is ruggedized if the port includes structure to enable a robust connection to a connector and environmental sealing between the port and the connector. As the term is used herein, a robust connection protects the connector against an axial pull-out force of about fourteen pounds. In certain examples, the structure to enable the robust connection includes a twist-to-lock fastener (e.g., a threaded nut, a bayonet-style connector, etc.). In certain examples, an O-ring or other seal member can be carried by either the port 114, 214 or the connector received at the port 114, 214 to environmentally seal the connection.

In some implementations, a coupler arrangement 130 aligns and optically couples the connectors 125 of the first connection module 120 to the connectors 125 of the second connection module 120. The coupler arrangement 130 defines a first row of coupler ports 132 and a second row of coupler ports 133. The second row of coupler ports 133 face in an opposite direction from the first row of coupler ports 132. Each coupler port 132 of the first row being aligned with one of the coupler ports 133 of the second row.

Figure 9:
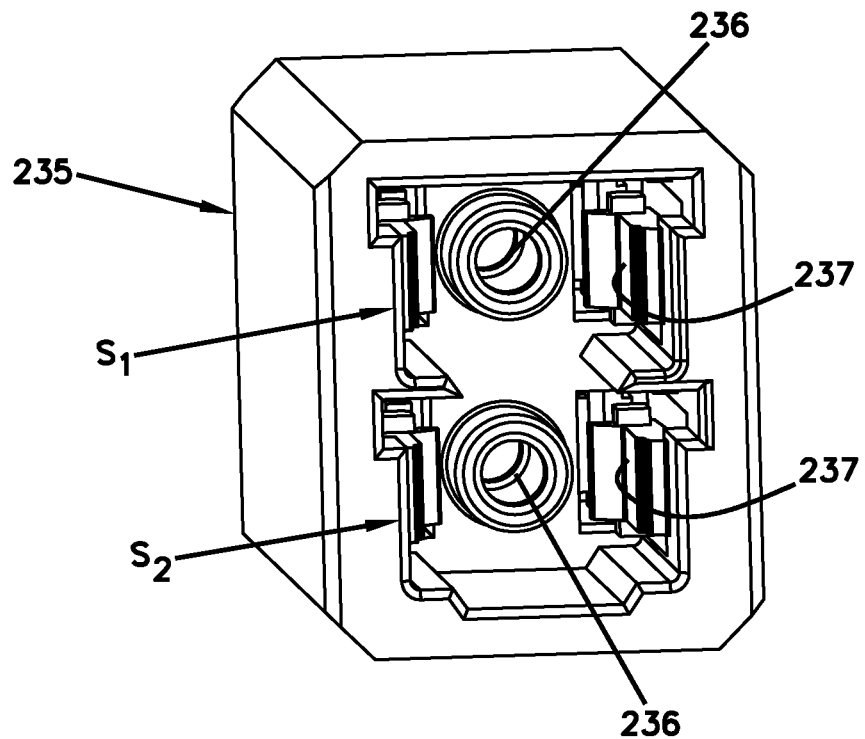
FIG. 9 is a perspective view of one of the couplers of FIG. 7.
Figure 10:
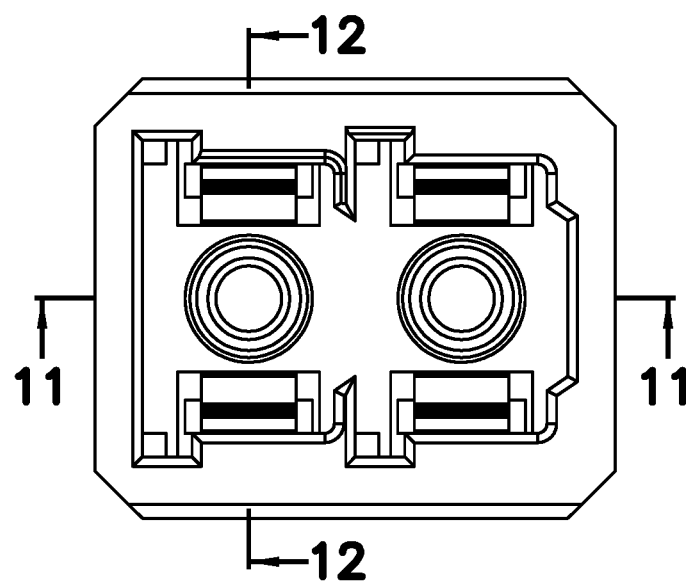
FIG. 10 is an end view of the coupler of FIG. 9.
Figure 11:
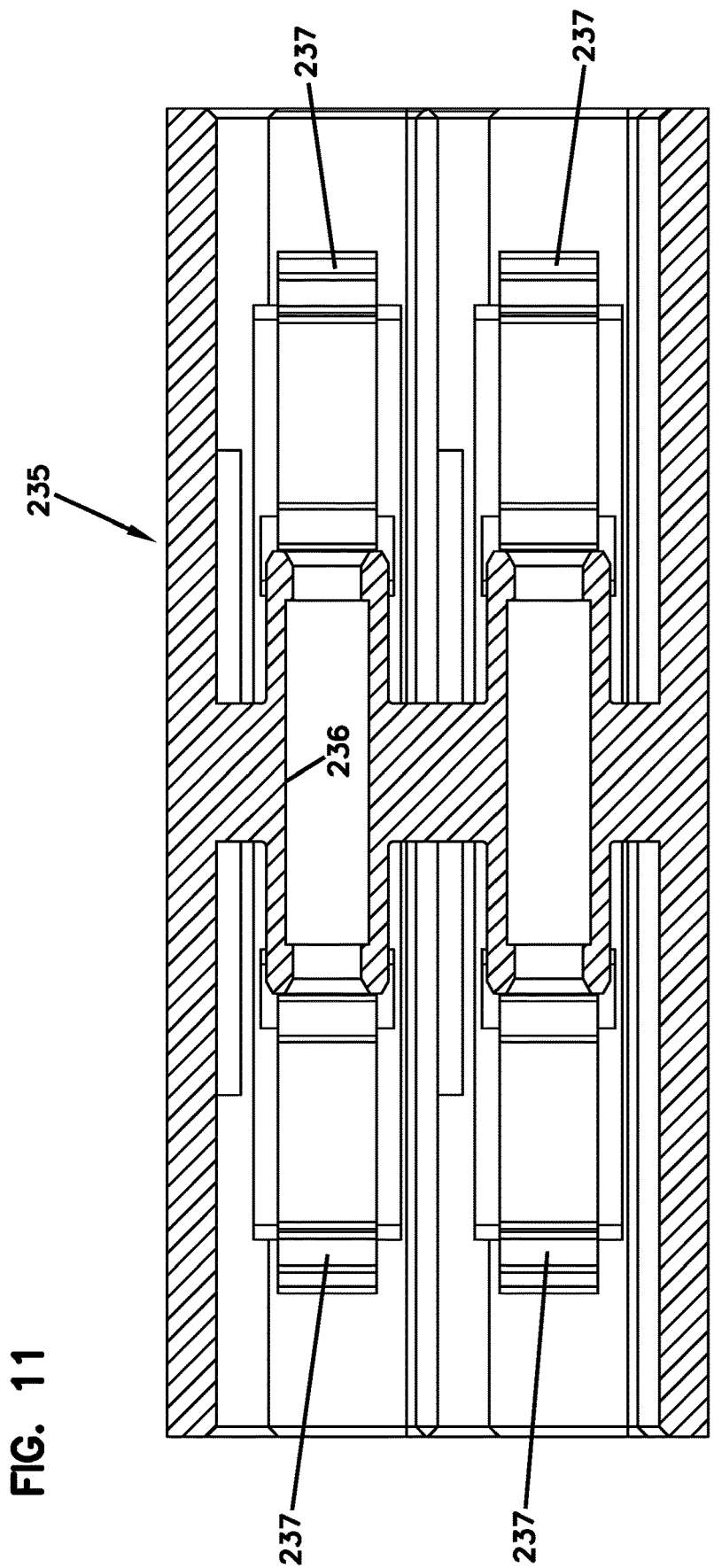
FIG. 11 is a cross-sectional view of the coupler of FIG. 10 taken along the 11-11 line.
Figure 12:
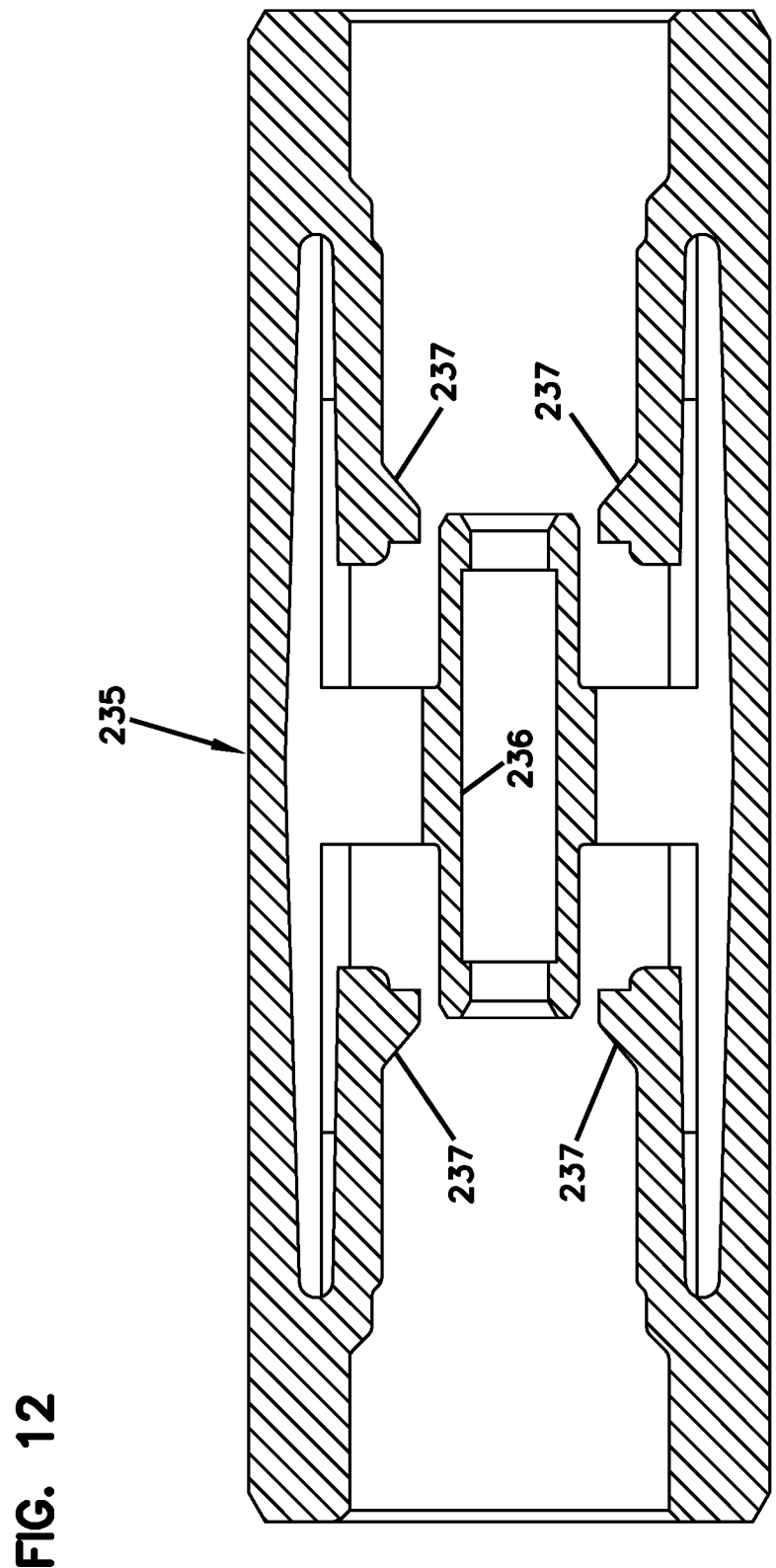
FIG. 12 is a cross-sectional view of the coupler of FIG. 10 taken along the 12-12 line.
Figure 13:
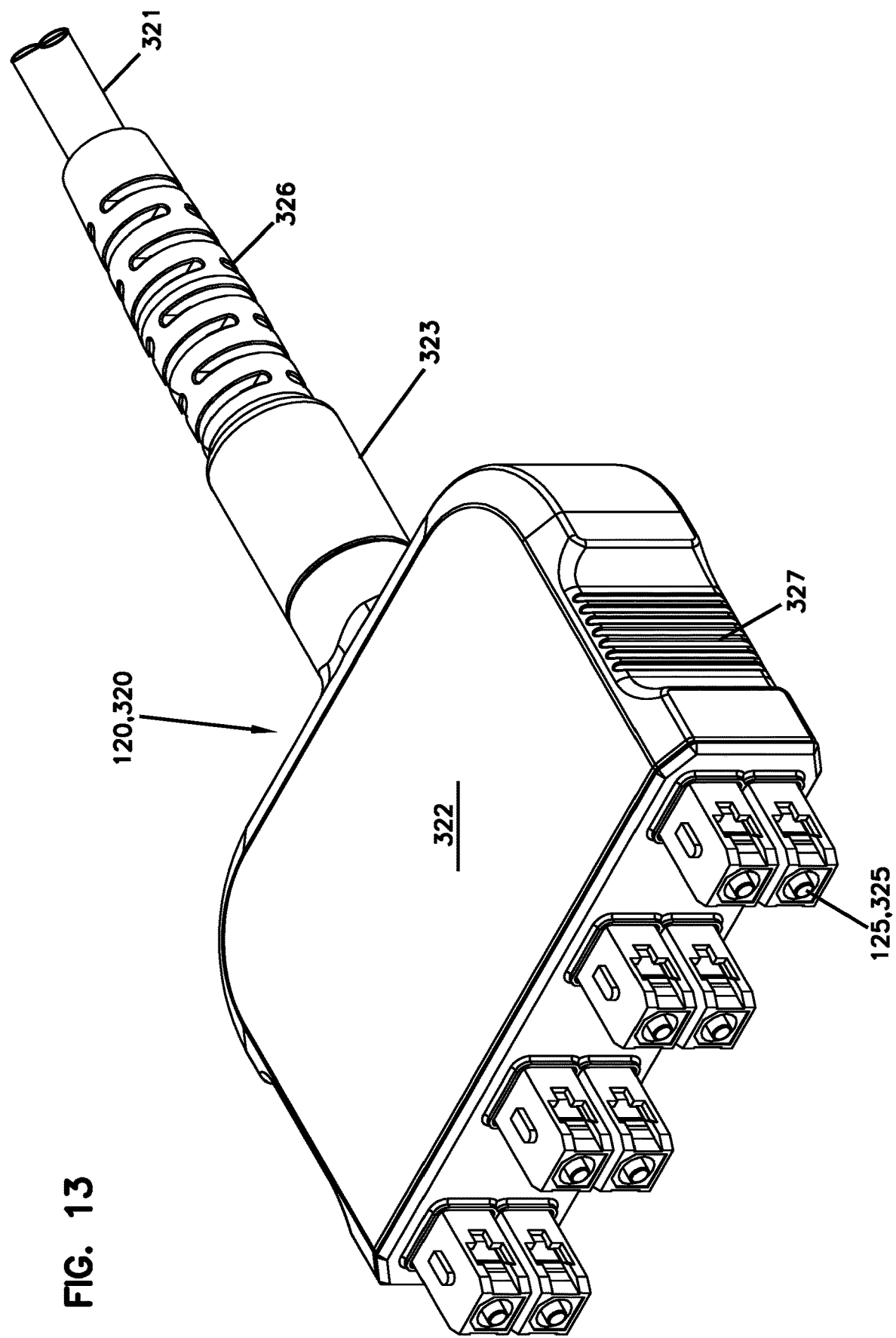
FIG. 13 illustrates another example connection module suitable for use in any of the connection terminals disclosed herein.
Figure 17:
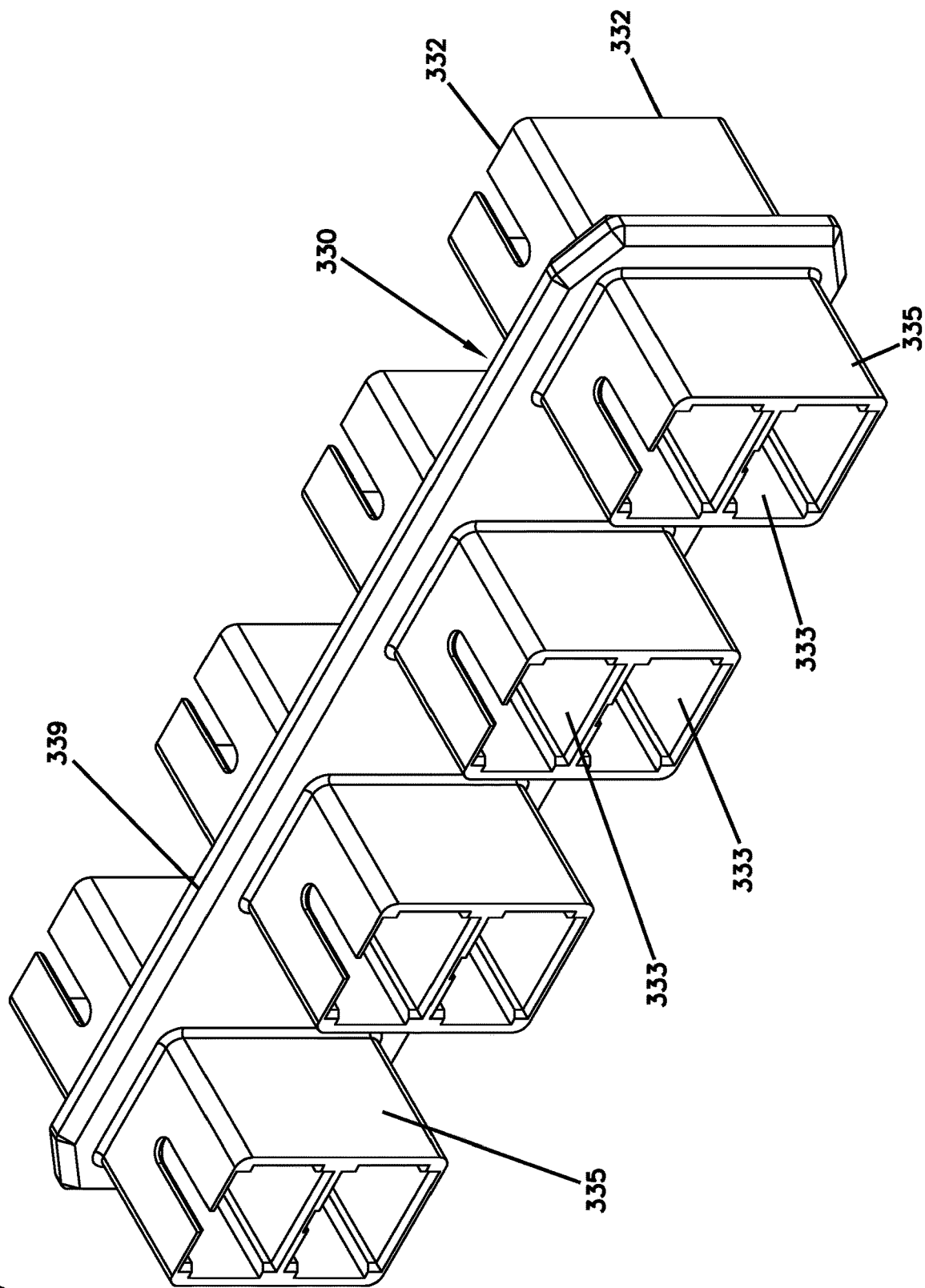
FIG. 17 is a perspective view of an example coupler arrangement shown in FIG. 14 and suitable for use in any of the connection terminals disclosed herein.

In some examples, the coupler arrangement 130 is formed of a one-piece construction (e.g. see FIG. 17). For example, a body 131 defines the coupler ports 132, 133. In other examples, the coupler arrangement 130 includes multiple separate couplers (e.g., see FIG. 9). In certain implementations, the first row of coupler ports 132 is one of a plurality of first rows of coupler ports 132 and the second row of coupler ports 133 is one of a plurality of second rows of coupler ports facing away from the first rows.

In other implementations, the first and second connection modules 120, 140 cooperate to define the terminal 100 when operatively coupled together to seal the connection between the connectors 125, 145. For example, one of the first and second connection modules 120, 140 can carry a gasket or other seal positioned to engage the other connection module 120, 140 when the two connection modules 120, 140 are operatively coupled together.

Figure 4:
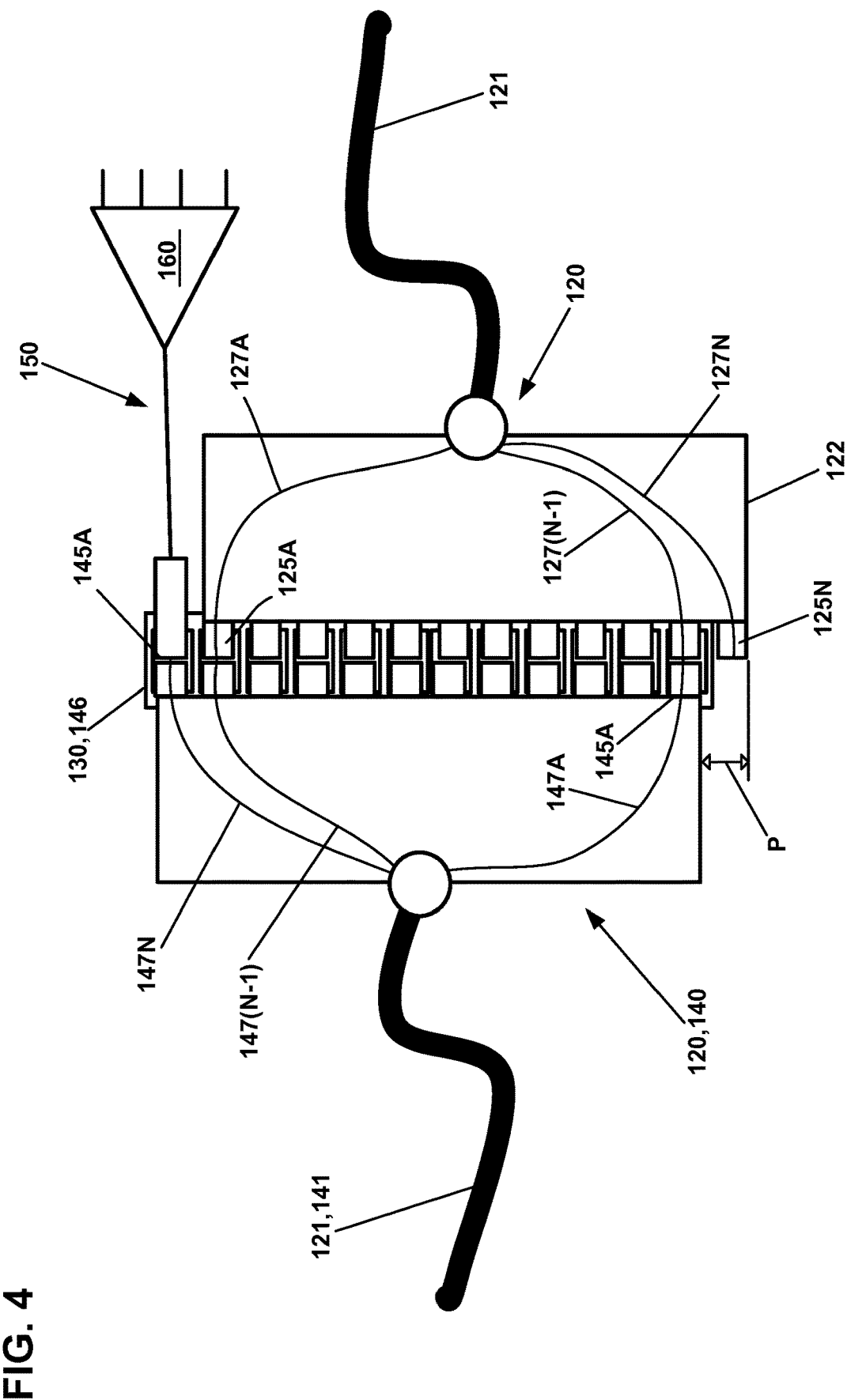
FIG. 4 illustrates offsetting the connection modules by one connector position to index the optical signal and to provide tap-off connectors.
Figure 5:
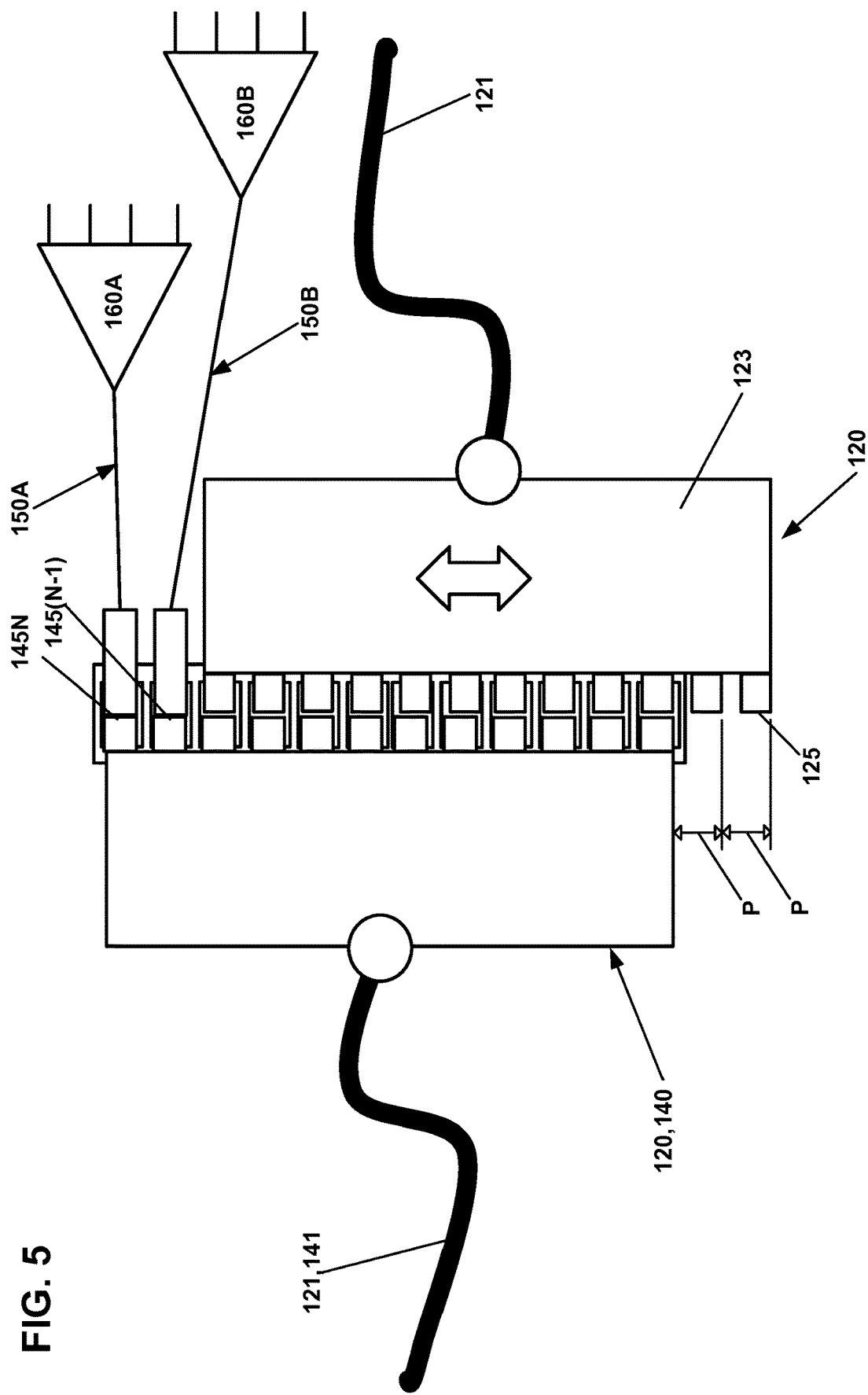
FIG. 5 illustrates offsetting the connection modules by two connector positions to index the optical signal and to provide tap-off connectors.

As shown in FIGS. 4 and 5, the first connection module 120 can be operationally coupled to the second connection module 120, 140 in an offset configuration so that at least one connector 125 of the first connection module 120 does not align with at least one connector 125, 145 of the second connection module 120, 140. For example, the connector 125 of the first connection module 120 can be offset relative to the connector 125, 145 of the second connection module 120, 140 by one or more connector positions along the row of connectors 125, 145. In FIG. 4, the first connection module 120 is offset from the second connection module 120, 140 by a single connector position P. In FIG. 5, the first connection module 120 is offset from the second connection module 120, 140 by two connector positions P.

In some implementations, the connectors 125, 145 are offset from each other by offsetting the connection modules 120, 140 from each other. In other implementations, one or more connectors 125, 145 may be movable relative to the respective connection modules 120, 140.

Offsetting the first and second connection modules 120, 140 can index the optical signals carried by the optical cables 121, 141. An example of such indexing is shown in FIG. 4. For clarity, the fibers fanned out by the second connection module 120, 140 are labeled 147A-147N. It will be understood, however, that the second connection module could be identical to the first connection module 120 and the fibers could have been labeled 127A-127N. Only one fiber is shown routed to each connector 125, 145 in FIG. 4 for clarity. It will be understood, however, that the connectors 125, 145 could be multi-fiber connectors and that groups of optical fibers are routed to the connectors 125, 145.

The first optical fiber 127A, 147A in each row of each connection module 120, 140 is routed to a first connector 125A, 145A. The last optical fiber 127N, 147N in each row is routed to a last connector 125N, 145N. When the connection modules 120, 140 are coupled together without an offset, the first fiber 125A of the first connection module 120 is optically coupled to the last fiber 147N of the second connection module 140. The last fiber 125N of the first connection module 120 is optically coupled to the first fiber 147A of the second connection module 140.

However, when the connection modules 120, 140 are offset by a single connector position as shown in FIG. 4, the connector 125A of the first connection module 120 is directly optically coupled with the connector 145(N–1) of the second connection module 140. Accordingly, the corresponding optical fiber 127A is optically coupled to the optical fiber 147(N–1). The optical connector 125N does not align with any of the connectors 145 of the second connection module 140. Accordingly, the optical connector 125N remains accessible even when the first and second connection modules 120, 140 are directly optically coupled. This accessible connector 125N is referred to as a tap-off connector.

The connector 145A of the second connection module 140 is directly optically coupled with the connector 125(N–1) of the first connection module 120. Accordingly, the corresponding optical fiber 147A is optically coupled to the optical fiber 127(N–1). The optical connector 145N does not align with any of the connectors 125 of the first connection module 120. Accordingly, the optical connector 145N also remains accessible as a tap-off connector.

By daisy-chaining terminals 100 with offset connection modules 120, 140 in a network, the optical signals are indexed between terminals 100 so that an optical signal is always provided to the first connectors 125A, 145A in a row (assuming a signal source is provided from both ends of the network). The optical signals also are made available at each terminal 100 at the tap-off connector(s) 125N, 145N.

FIG. 5 shows an example terminal 100 in which the connection modules 120, 140 are offset by two connector positions. Accordingly, each connection module 120, 140 provides at least two tap-off connectors. (If one of the connection modules 120, 140 has multiple rows of connectors, then the connection module 120, 140 may provide additional tap-off connectors.)

Tap-off cables 150 can be connected to the tap-off connectors 125N, 145N. As the term is used herein, tap-off cable 150 refers to any bare fiber, buffered fiber, or fiber cable that connects to a tap-off connector 125N, 145N. Accordingly, signals routed to the tap-off connectors are carried by the tap-off cables 150. In some implementations, the tap-off cables 150 can be coupled to the input of an optical splitter 160 (e.g., an optical power splitter and/or a wave division multiplexer). For example, in FIG. 5, a first splitter input cable 150A supplies signals from a first tap-off connector 145N to a first splitter module 160A. A second splitter input cable 150B supplies signals from a second tap-off connector 145(N–1) to a second splitter module 160B. In other implementations, the tap-off cables 150 can be directed to tap-off ports 114 of the terminal 100.

For convenience, the remainder of this paper will refer to tap-off connectors with the reference numbers 125N and 145N. This numbering does not imply that the connection modules 120, 140 are offset by only one connector position or that only one tap-off connector per row exists. Rather, hereinafter, reference numbers 125N, 145N refer to all tap-off connectors regardless of how many connector positions the connection modules 120, 140 are offset from each other.

Additional details regarding indexing can be found in U.S. Pat. No. 9,348,096, and in U.S. Application Nos. 62/383,965, filed Sep. 6, 2016, and 62/363,724, filed Jul. 18, 2016, the disclosures of which are hereby incorporated herein by reference.

Figure 6:
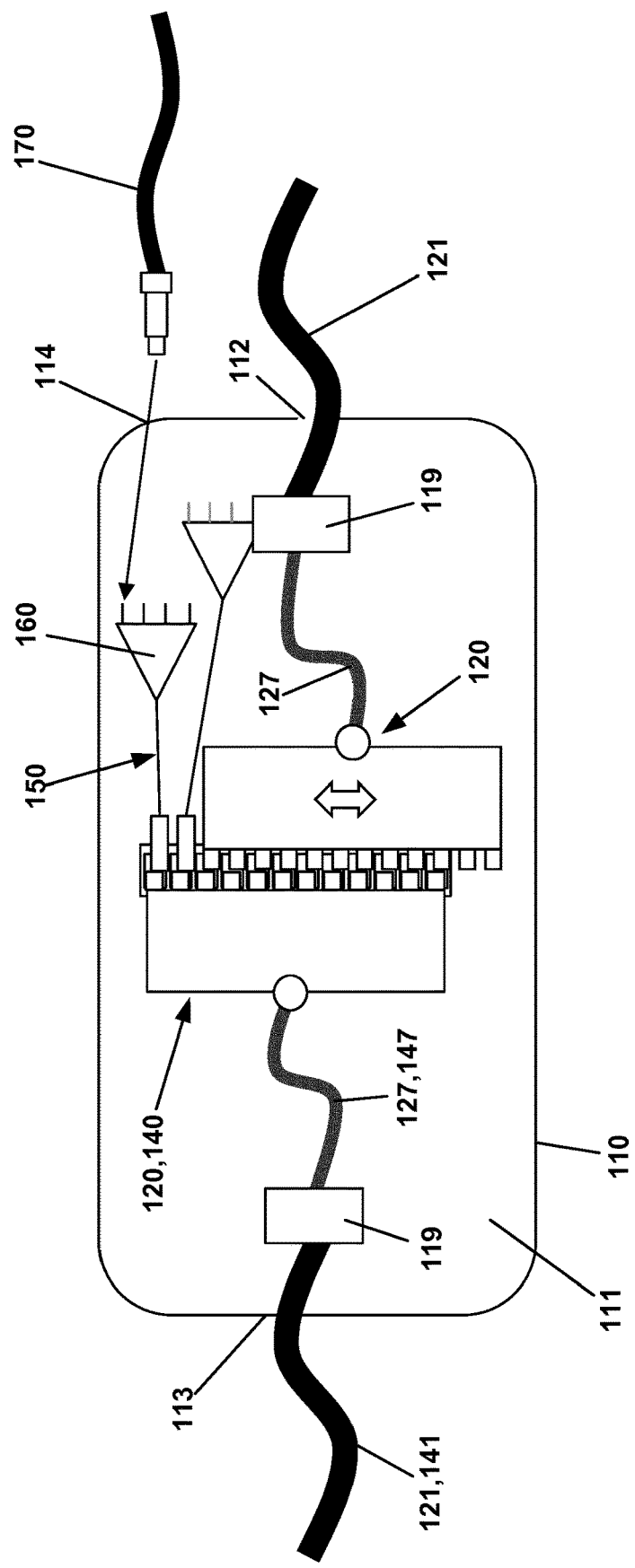
FIG. 6 illustrates the connection modules of FIG. 1 or 3 disposed within a sealed enclosure.

In some implementations, the terminal 100 includes a sealed enclosure 110 in which the connection modules 120 are disposed (see FIG. 6). The enclosure 110 defines a sealed interior 111, a first sealed port 112 leading to the sealed interior, and a second sealed port 113 leading to the sealed interior 111. The first cable extends into the sealed interior 111 of the enclosure 110 through the first sealed port 112 and the second cable 121 extends into the sealed interior 111 of the enclosure 110 through the second sealed port 113.

In some implementations, the enclosure 110 defines a sealed tap-off port 114 that can receive optical signals from the tap-off connectors 125N, 145N. In some implementations, the tap-off cables 150 are routed between the tap-off connectors 125N, 145N and the tap-off ports 114. In other implementations, one or more splitters 160 are disposed within the enclosure 110 and the tap-off ports 114 receive outputs from the splitters 160 (see FIG. 6).

In certain implementations, each connection module 120, 140 is configured to anchor to the enclosure 110 to hold the respective connection module 120, 140 in a fixed position relative to the enclosure 110.

In other implementations, the first and second connection modules 120, 140 seal together without a surrounding housing. In certain implementations, the second connection module 140 includes a shroud extending over the row of connectors 145 (see FIG. 34). The shroud defines an opening leading to a sealing surface recessed within the opening. The opening also leads to the row of connectors 145. The shroud is configured to extend over a portion of the first connection module 120 when the first and second connection modules 120, 140 are operatively coupled (see FIG. 32).

FIGS. 7-12 illustrate one example terminal 100, 200 including an enclosure 110, 210 defining an interior 111, 211 in which two connection modules 120, 220 are disposed. In the example shown, each connection module 200 includes male connectors 125, 225 that directly optically couple together using a coupler arrangement 130, 230. As discussed above, the connection modules 120, 220 can directly optically couple together in alignment or in an offset configuration.

In certain implementations, sealed ports 112, 113, 212, 213 of the enclosure 110, 210 facilitate offsetting of the connection modules 110, 220. In the example shown, the first sealed port 112, 212 defines three positions (e.g., see FIGS. 14-16) at which the first connection module 120, 220 can be disposed. In a first position, the first connector module 100, 200 aligns with the second connection module 120, 220. In a second position, the first connector module 100, 200 is offset from the second connection module 120, 220 by one connector position. In a third position, the first connector module 100, 200 is offset from the second connection module 120, 220 by two connector positions.

Figure 7:
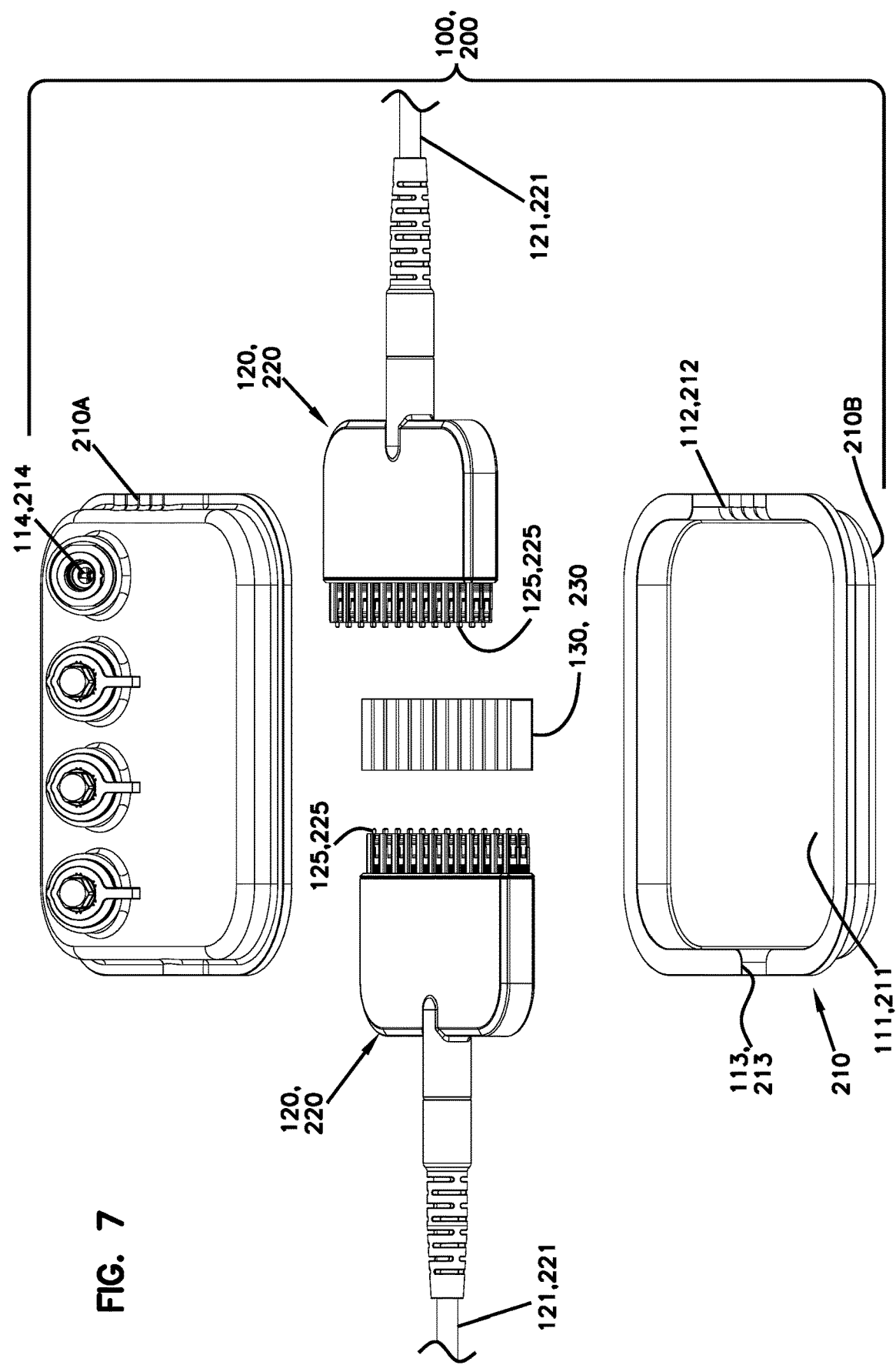
FIG. 7 is an exploded view of another example connection terminal including two male connection modules, a coupler arrangement, and a sealed enclosure.

In FIG. 7, the enclosure 110, 210 includes a first housing piece 210A and a second housing piece 210B that cooperate to define the sealed interior 111, 211. In various examples, rubber seals, gel seals, foam seals or other types of seals can be disposed between the housing pieces 210A, 210B to seal the interior 111, 211. In certain examples, a rubber gasket can extend around a perimeter of the housing pieces 210A, 210B while gel seals or foam seals are disposed at the sealed ports 112, 113, 212, 213. In other examples, however, any desired type of seal can be used.

In certain implementations, the enclosure 110, 210 defines four tap-off ports 114, 214. In certain examples, each of the tap-off ports 114, 214 is ruggedized.

When the connection modules 120, 220 are directly optically coupled in an offset configuration, optical fibers 150 can be routed from one or more tap-off connectors 125N to respective tap-off ports 114, 214. In the example shown, the tap-off ports 114, 214 are configured to receive DLX-style connectors. In other examples, however, the tap-off ports 114, 214 can be configured to receive any connector (e.g., single-fiber connector or multi-fiber connector).

Figure 8:
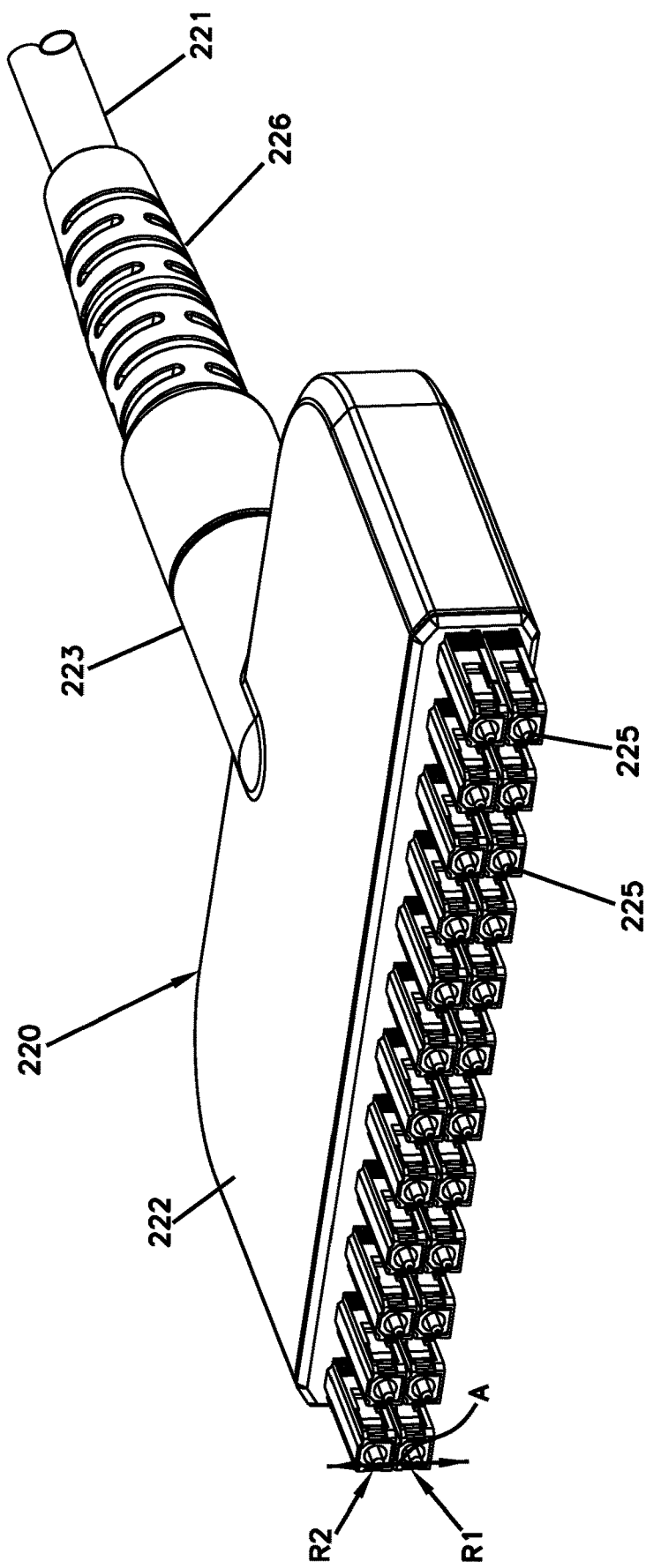
FIG. 8 is a perspective view of one of the connection modules of FIG. 7.

FIG. 8 shows an example connection module 120, 220. The connection module 120, 220 includes a fanout body 222 carrying a plurality of connectors 225 in two rows. In other examples, the connectors 225 can be disposed in more rows or fewer rows. The connectors 225 of adjacent rows align with each other along axes A extending orthogonal to the row. In the example shown, the connectors 225 are SC connectors. In other examples, however, the connectors 225 can be LC connectors, MPO connectors, or other non-ruggedized connectors.

A cable 221 couples to the fanout body 222 at a tapered neck 223. A strain-relief boot 226 can be coupled to the tapered neck 223 and extend outwardly over the cable 221. In some examples, the tapered necks 223 of the connection modules 220 are configured to pass through the sealed ports 212, 213. In other example, the tapered necks 223 are fully disposed within the enclosure 220 and the cables 221 pass through the sealed ports 212, 213.

In some implementations, the coupler arrangement 230 is formed of multiple couplers 235. In the example shown in FIGS. 9-12, each coupler 235 is configured to receive two connectors (e.g., the connectors 225 in the same connector position from the two rows of the connection module 220). In certain examples, each coupler 235 includes an alignment sleeve 236 and a latching arrangement 237 for each connector 225 to be received. In the example shown, each coupler 235 includes two alignment sleeves 236 and two latch arms 237 for each alignment sleeve 236.

FIGS. 13-17 illustrate alternative designs of the connection modules 320 also having two rows of connectors 325 disposed at a fanout body 322. A cable 321 couples to the fanout body 322 at a tapered neck 323. A strain-relief boot 326 can be coupled to the tapered neck 323 and extend outwardly over the cable 321. Grip surfaces 327 also are disposed at the fanout body 322.

Figure 14:
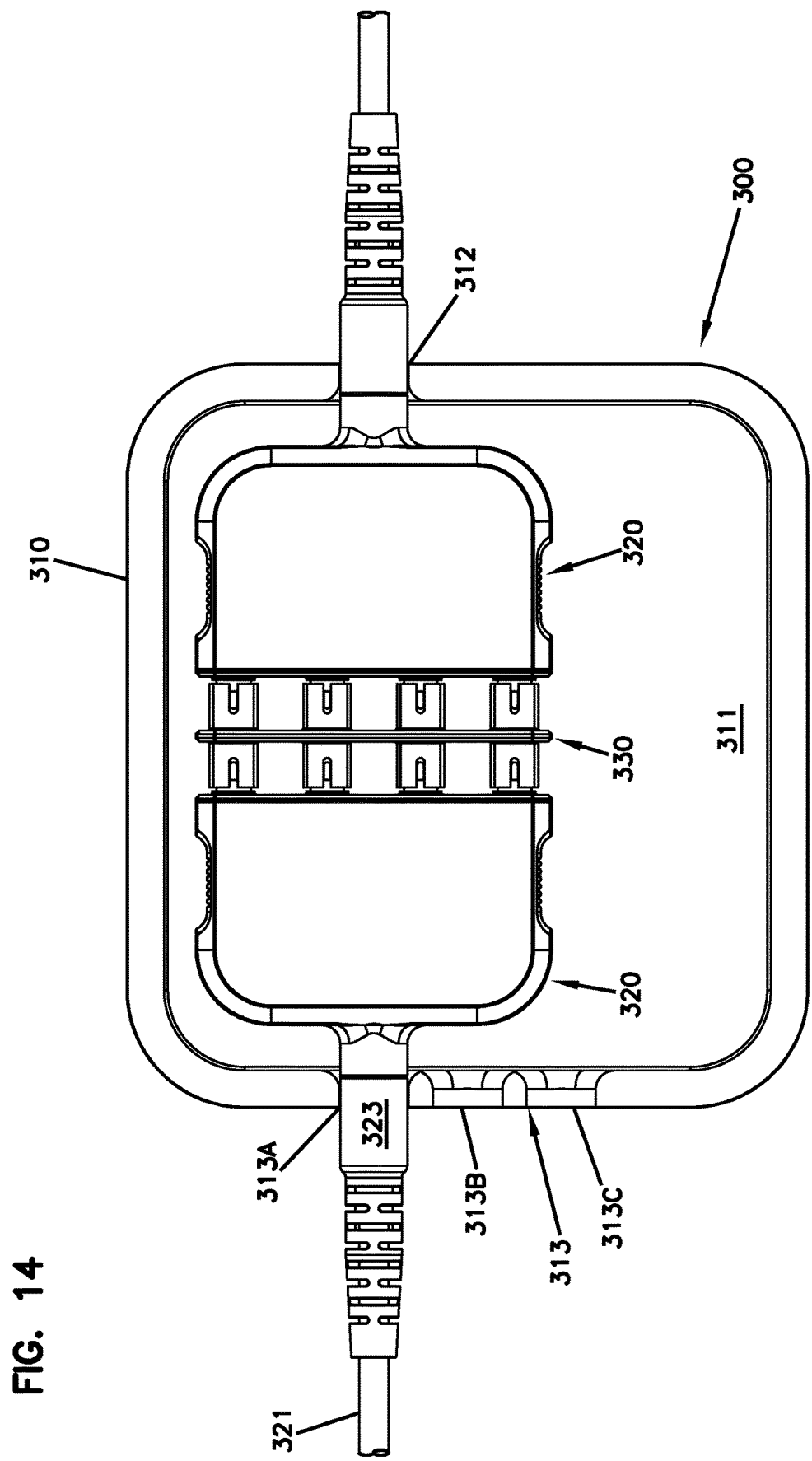
FIG. 14 is a top plan view of the connection module of FIG. 13 directly optically coupled to another such connection module by a coupler arrangement within an enclosure (a portion of which is hidden from view for ease in viewing) to form an example connection terminal.
Figure 15:
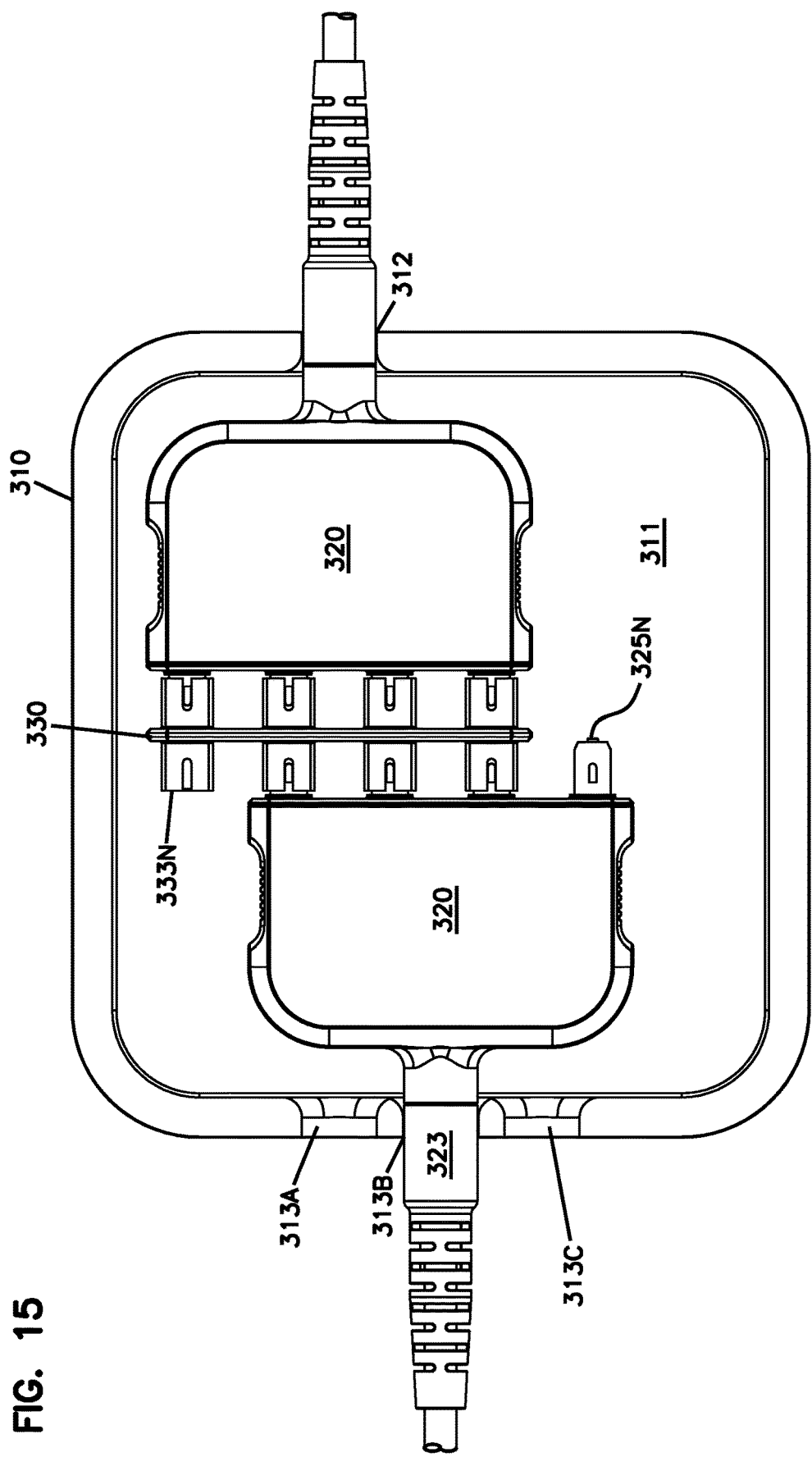
FIG. 15 is a top plan view of the connection terminal of FIG. 14 offset from the other connection module to index the optical signals.
Figure 16:
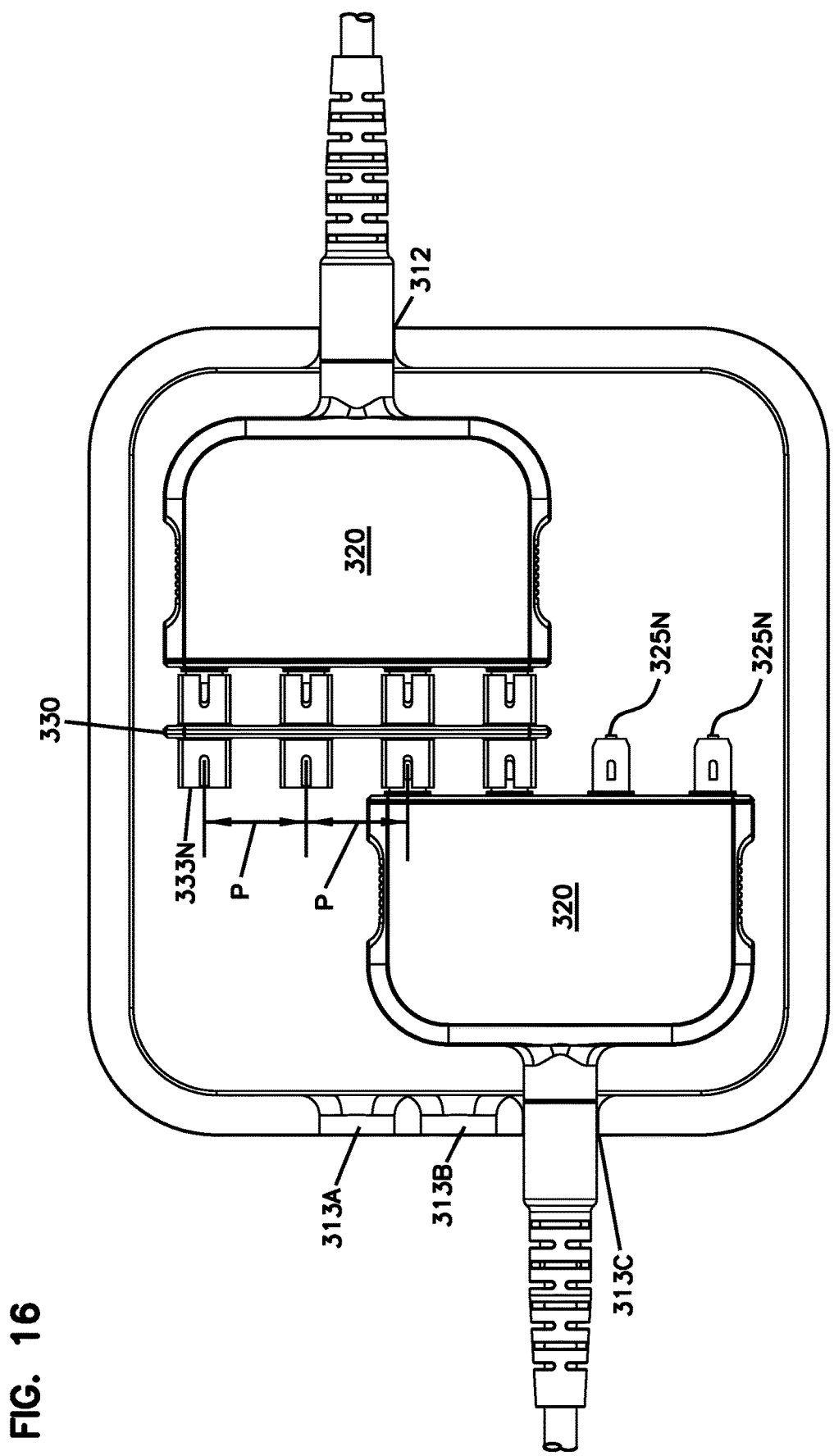
FIG. 16 is a top plan view of the connection terminals of FIG. 14 in another offset configuration.

In FIGS. 14-16, the enclosure 310 has a sealed port 312 with one position and a sealed port 313 with three positions 313A, 313B, 313C. The multiple positions facilitate offsetting of the second connection module 320 relative to the first connection module 320. In FIG. 14, the first and second connection modules 320 fully align. All connectors 325 of each connection module 320 are directly optically coupled to a corresponding connector 325 of the other connection module 320 by a coupler arrangement 330.

In FIG. 15, the second connection module 320 is offset relative to the first connection module 320 by one connector position P. Accordingly, two tap-off connectors 325N (i.e., the end connector of the top row and the end connector of the bottom row) of the second connection module 320 are accessible within the sealed interior 311 of the enclosure 310. Further, two tap-off connectors 325N of the first connection module 320 are accessible through respective ports 332N of the adapter arrangement 330.

In FIG. 16, the second connection module 320 is offset relative to the first connection module 320 by two connector positions P. Accordingly, four tap-off connectors 325N of the second connection module 320 are accessible within the sealed interior 311 of the enclosure 310. Further, four tap-off connectors 325N of the first connection module 320 are accessible through respective ports 332N of the adapter arrangement 330.

FIG. 17 illustrates an example coupler arrangement 330 suitable for use with any two row connection module disclosed herein. The coupler arrangement 330 includes a plurality of couplers 335 positioned along a spacer member 339. In the example shown, each coupler 335 defines two ports on each side. In other examples, however, each coupler 335 could define a single port, three ports, four ports, or more ports. In the example shown, the ports 332, 333 are SC ports. In other examples, however, the ports 332, 333 can be LC ports, MPO ports, ST ports, LX.5 ports, etc.

Figure 18:
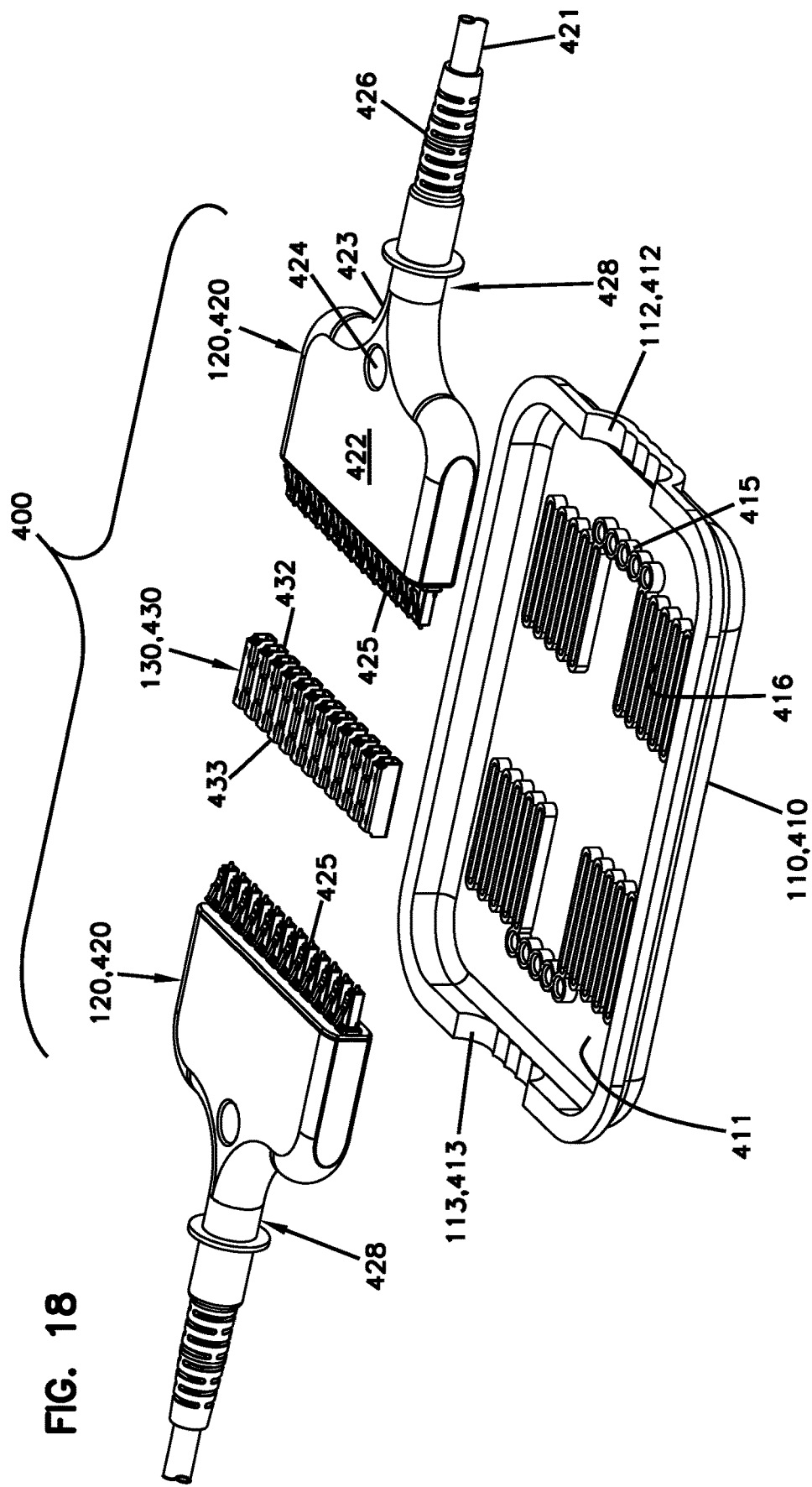
FIG. 18 is an exploded view of another connection terminal including two male connection modules, a coupler arrangement, and a sealed enclosure (a portion of which is hidden from view for ease in viewing)
Figure 19:
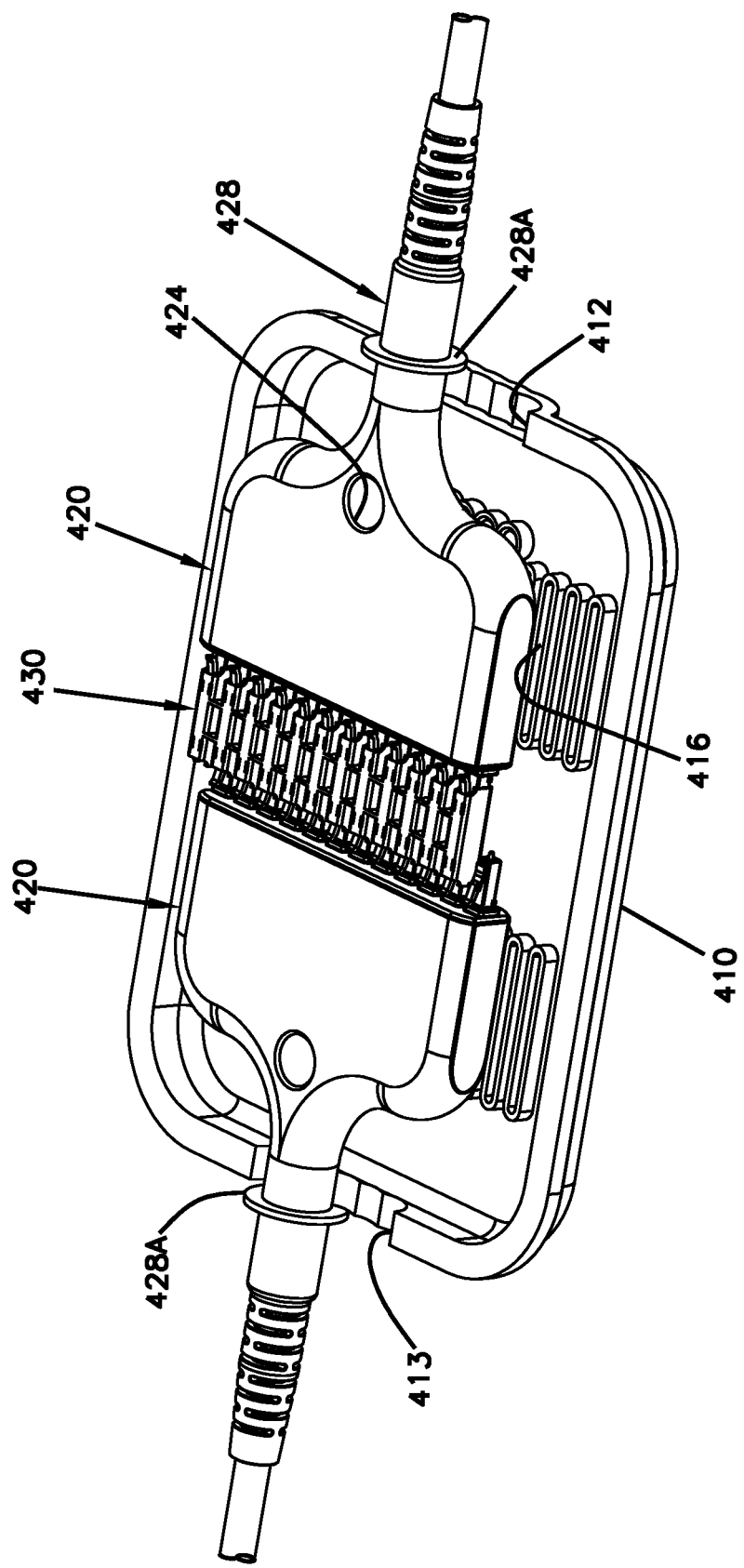
FIG. 19 is an assembled view of the connection terminal of FIG. 18 with the connection modules in an offset configuration.
Figure 20:
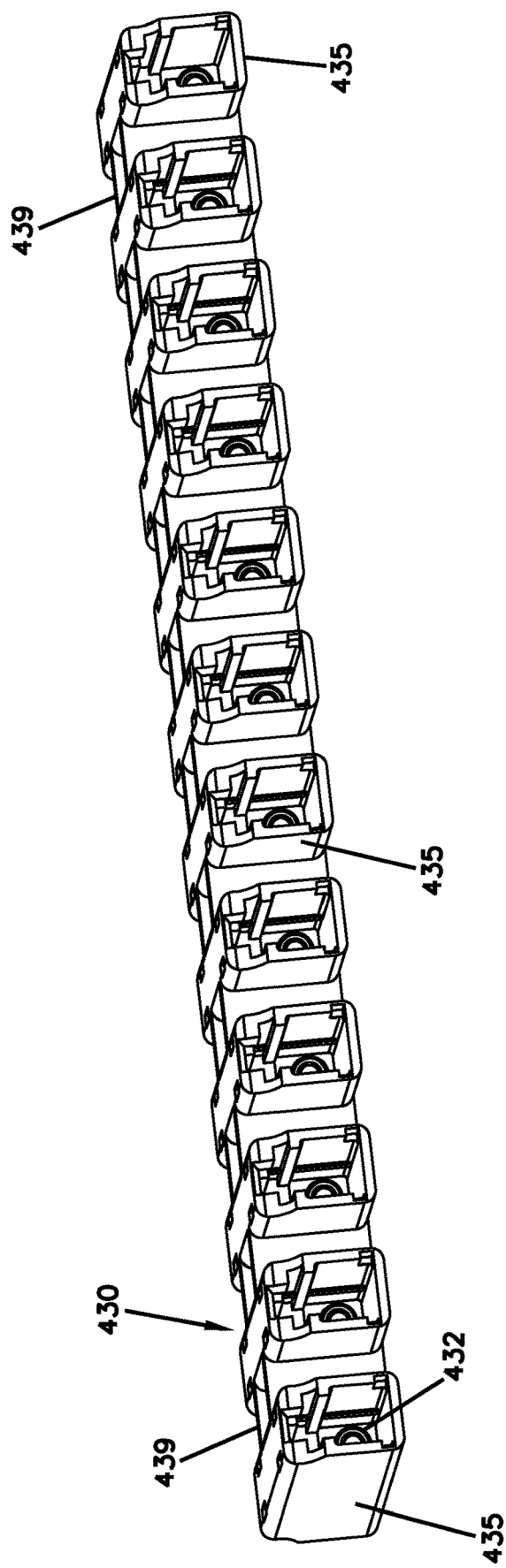
FIG. 20 is a perspective view of the example coupler arrangement of FIG. 18.

FIGS. 18-20 illustrate another example terminal 100, 400 including two connection modules 120, 420, a coupler arrangement 130, 430, and an enclosure 110, 410. For ease in viewing, the top housing piece of the enclosure 410 is removed from view.

The enclosure 110, 410 has first and second sealed ports 412, 413 that each define multiple positions at which the connection modules 420 can be positioned. In the example shown, each sealed port 412, 413 defines five positions. In other examples, however, each sealed port 412, 413 can define a greater or lesser number of positions.

In certain implementations, the enclosure 110, 410 also includes mounting structure 415 disposed at the sealed ports 112, 113, 412, 413 to facilitate anchoring the connection modules 420 to the enclosure 410 in a selected position. In the example shown, the mounting structure 415 defines apertures that each correspond with one of the positions defined by the respective sealed port 412, 413. Each connection module 420 also defines an aperture 424 that aligns with one of the apertures 415 of the enclosure when the connection module 420 is positioned at the sealed port 412, 413. A fastener can be inserted through the aperture 424 and the aperture 415 to anchor the connection module 420 to the enclosure 410.

In certain implementations, the enclosure 110, 410 includes routing structures 416 for managing tap-off cables 150 that connect to tap-off connectors of the modules 120, 420. In the example shown, the routing structures 416 define a channel that aligns with each possible tap-off connector for any offset configuration of the connection modules 420. Axial ends of the channels are bounded by curved surfaces to protect the tap-off cables 150. Since each connection module 420 can be positioned in any of five positions in the example shown in FIG. 19, each connection module 420 could have up to four tap-off connectors 425 accessible. Other configurations are possible.

As shown in FIG. 19, the connection modules 120, 420 have a sealing arrangement 428 configured to engage the enclosure 410 to environmentally seal between the connection module 420 and the enclosure 410 at the sealed ports 412, 413. In the example shown, the sealing arrangement 428 includes a radial flange that abuts the enclosure 410 and overlaps the respective sealed port 412, 413 to facilitate sealing.

FIG. 20 shows another example coupler arrangement 130, 430. The coupler arrangement 430 includes a plurality of couplers 435 held together in a row by spacers 439 to form a single-piece construction. In the example shown, each coupler 435 is configured to receive an LC connector. In other examples, however, each coupler 435 can be configured to receive an SC connector, an MPO connector, or multiple connectors (e.g., a duplex LC connector).

Figure 21:
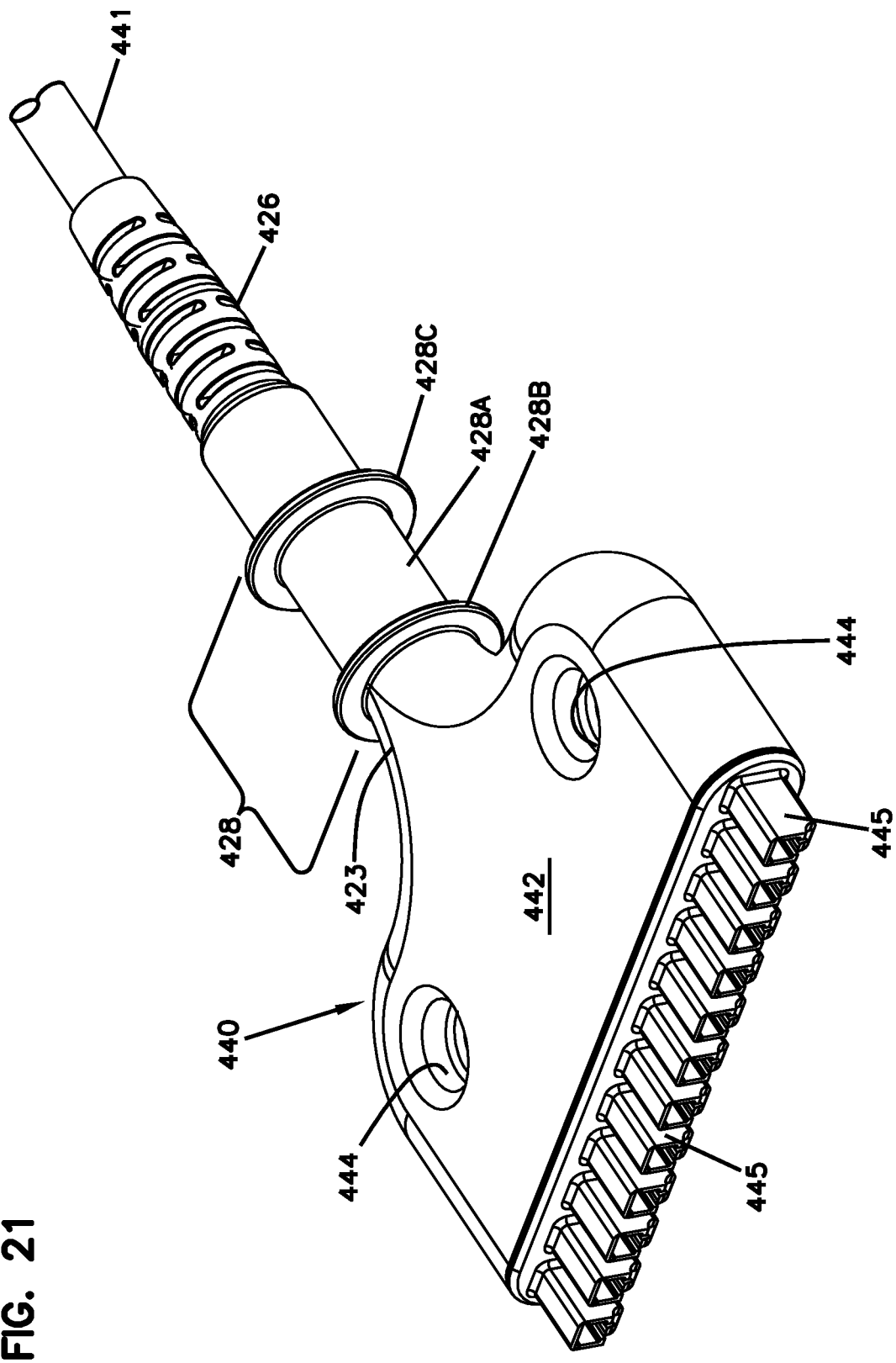
FIG. 21 is a perspective view of an alternative connection module suitable for use in any of the connection terminals disclosed herein.

FIG. 21 illustrates a female version 140, 440 of the connection module 120, 420 shown in FIGS. 18 and 19. The female connection module 140, 440 includes female connectors 145, 445 arranged in a row and carried by a fanout body 442. The fanout body 442 defines one or more apertures 444 with which the connection module 440 can be secured to the mounting structure 415 of the enclosure 410. In the example shown, the connection module 440 defines two apertures 424.

The connection module 440 in FIG. 21 also illustrates an alternative sealing arrangement 428 suitable for use with any connection module disclosed herein. The sealing arrangement 428 includes a sealing surface 428A disposed between two radial flanges 428B and 428C. When the connection module 440 is disposed at one of the sealed ports 412, 413 of the enclosure 410, the first radial flange 428B is disposed inside the enclosure 410 and the second radial flange 428C is disposed outside of the enclosure 410. The sealing surface 428A spans the length of the sealed port 412, 413.

In certain implementations, the radial flange 428B within the enclosure 410 aids in anchoring the connection module 440 within the enclosure 410.

Figure 22:
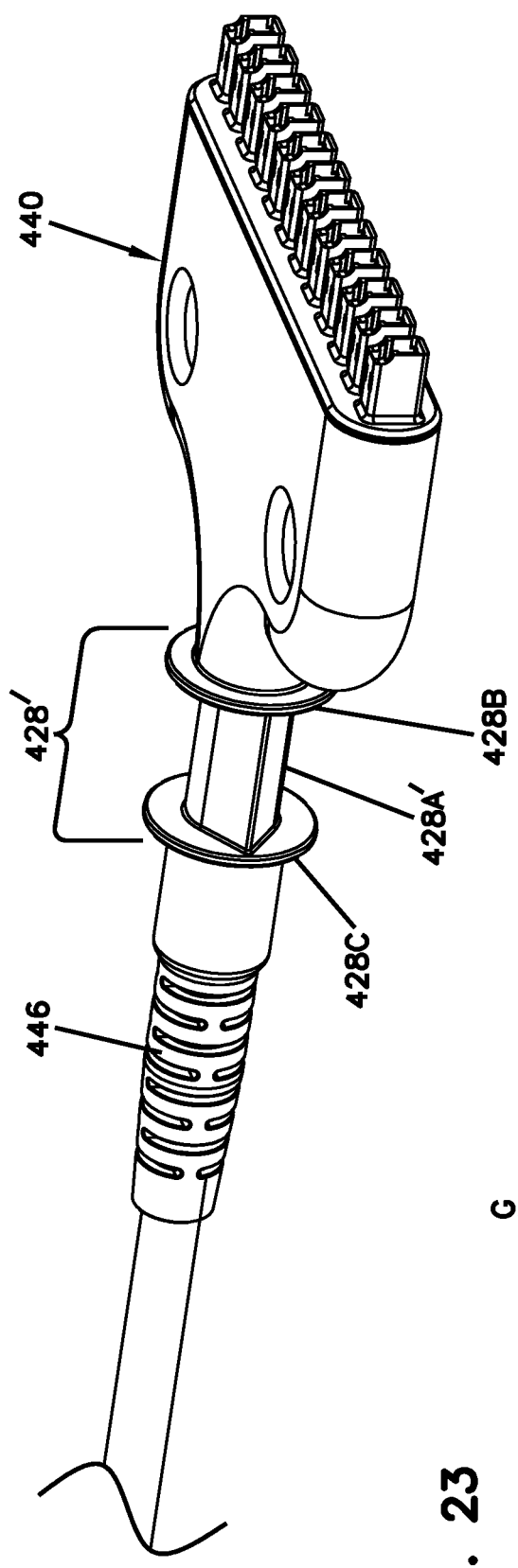
FIG. 22 is a perspective view of another alternative connection module suitable for use in any of the connection terminals disclosed herein.
Figure 23:
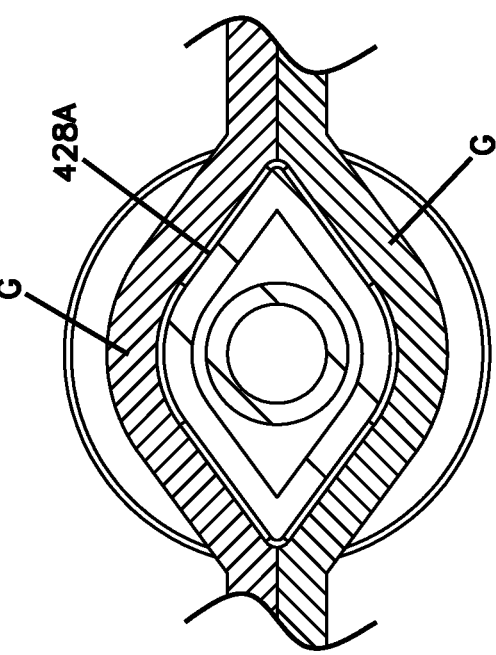
FIG. 23 is a transverse cross-section of the sealing arrangement shown in FIG. 22.

FIGS. 22 and 23 illustrate another example sealing arrangement 428' suitable for use with any connection module disclosed herein. FIG. 22 illustrates a connection module 440 having the sealing arrangement 428'. The sealing arrangement 428' is substantially similar to the sealing arrangement 428, except that the sealing surface 428A' is lens shaped (i.e., eye shaped) instead of cylindrical (see FIG. 23 for a transverse cross-section of the sealing surface 428A').

The lens shape of the sealing surface 428A' facilitates contact between the sealing surface 428A' and a gasket arrangement G (e.g., rubber gasket, foam gasket, gel gasket, etc.) disposed at the sealed port 412, 413 of enclosure 410. The gasket arrangement G includes an upper gasket and a lower gasket that meet to seal the port 412, 413. The lens shape of the sealing surface 428A' provides a three point seal where the upper and lower gaskets meet on either side of the sealing surface 428A'.

In certain implementations, the sealing surface 428A' is integrally formed with the fanout body 442. In certain implementations, the sealing arrangement 428' is integrally formed with the fanout body 442. In certain implementations, the sealing surface 428A' is integrally formed with the cable strain-relief boot 446 coupled to the fanout body 442.

Figure 24:
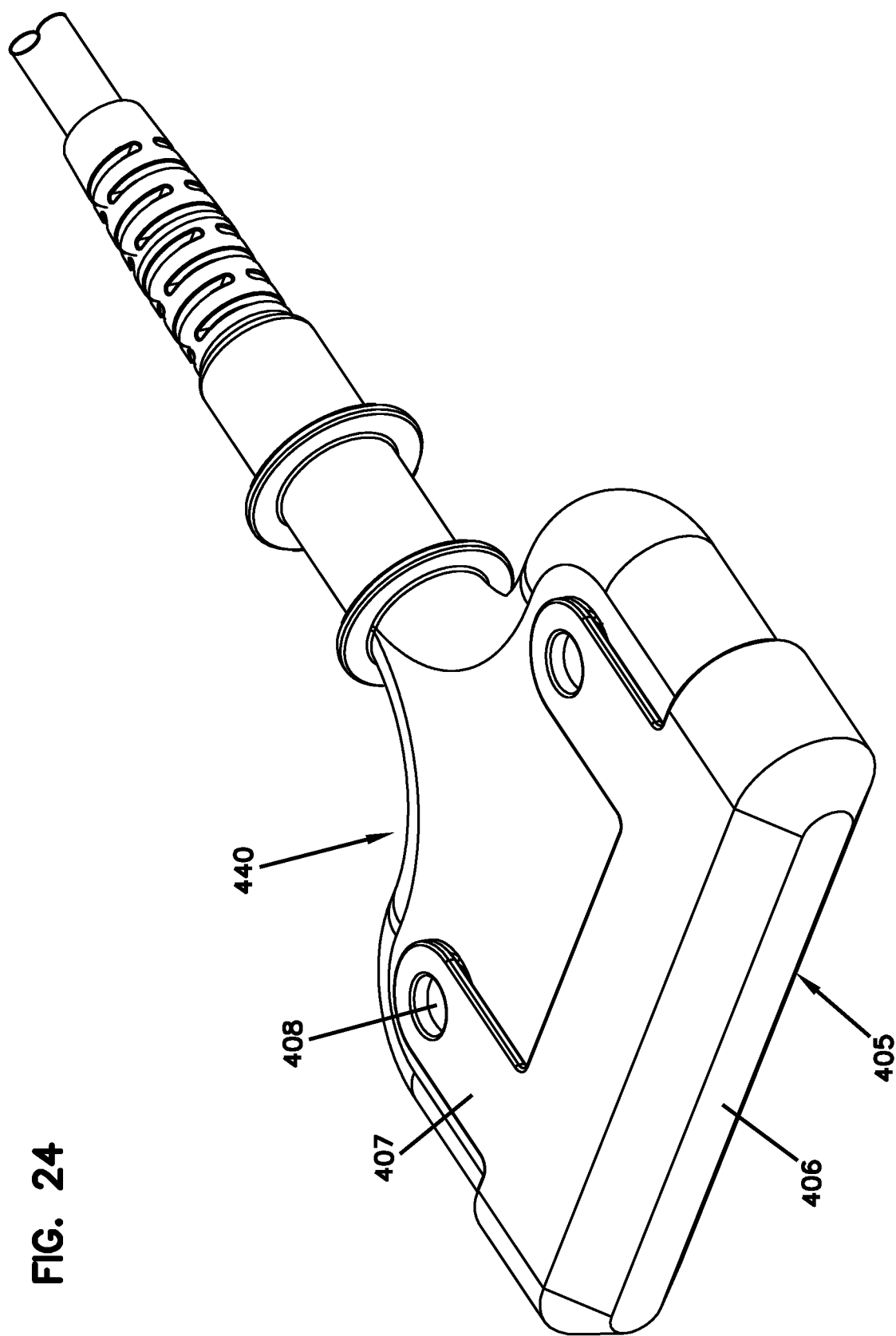
FIG. 24 illustrates an example protective cover for the connection module shown in FIG. 22.

FIG. 24 illustrates a protective cap 405 that can be mounted over the connectors 445 of the connection module 440. The protective cap 405 may inhibit dust or other contaminants from entering the female connectors 445. The protective cap 405 may protect the female connectors 445 from mechanical breakage or other physical damage (e.g., protects the cantilevered connectors 445 from snapping off the fanout body 422).

In certain implementations, the protective cap 405 includes one or more flexible arms 407 each having a distal latch 408 that snaps into a respective aperture 444 of the connection module 440. In some examples, the protective cap 405 has flexible arms 407 extending over both a top and bottom of the connection module 440. In other examples, the protective cap 405 has flexible arms 407 extending over only one side of the connection module 440 or has only one flexible arm 407. In still other examples, the protective cap 405 can be otherwise secured to the connection module 440.

Of course, the protective cap 405 also can be utilized with connection modules having male connectors.

Figure 25:
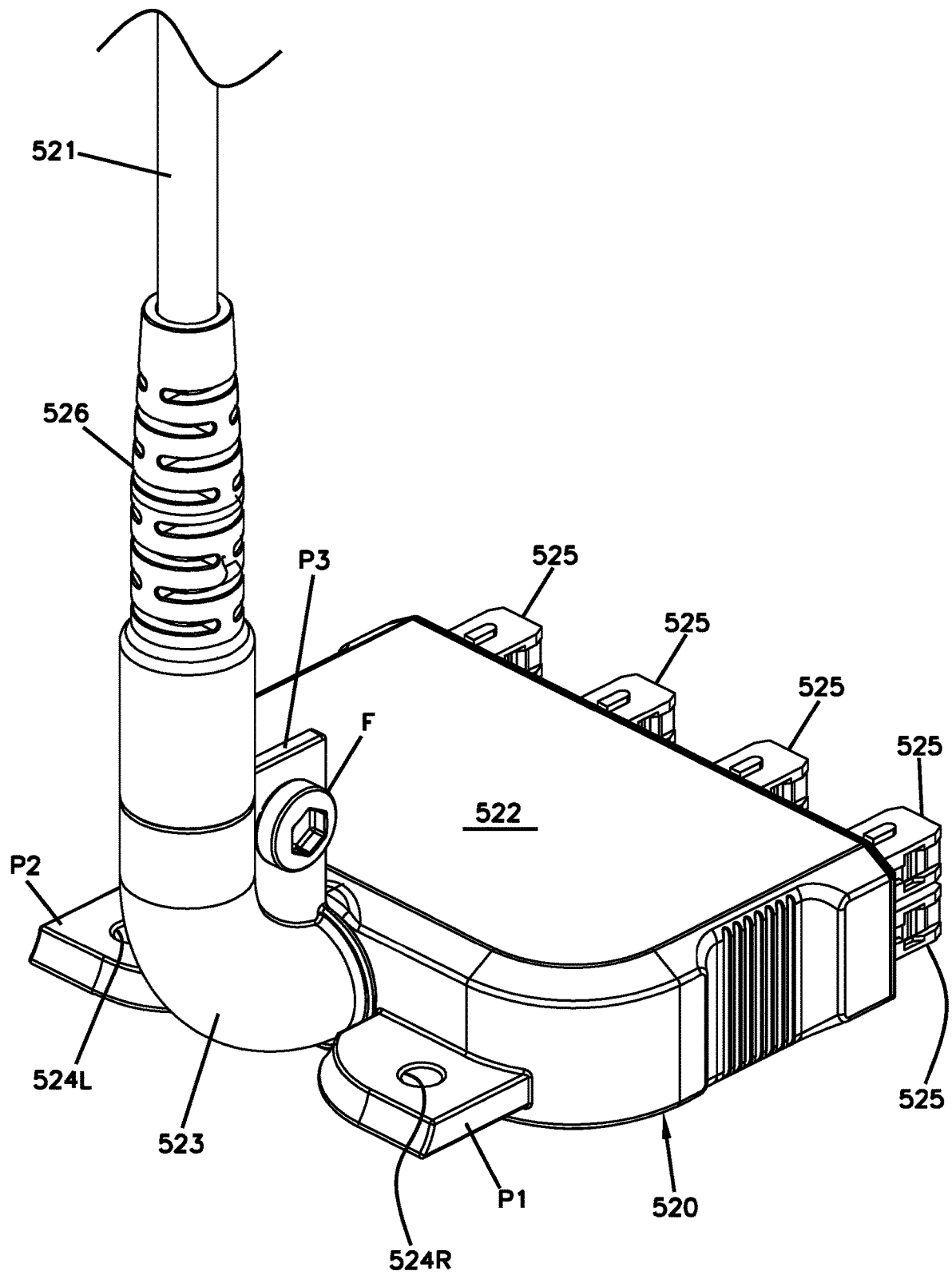
FIGS. 25-27 are rear perspective views of another example connection module at which the cable is routed away from the connection module in a curve.
Figure 26:
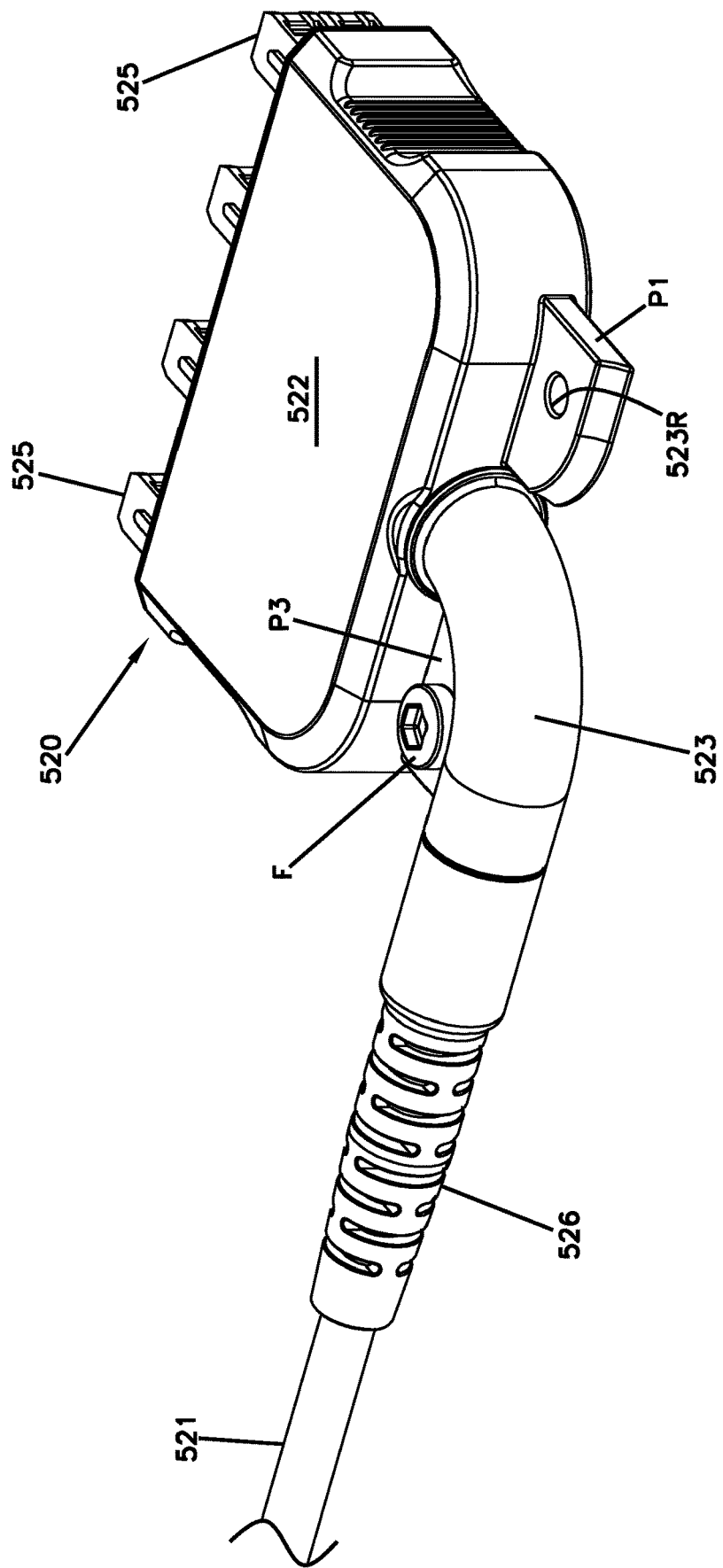
Figure 27:
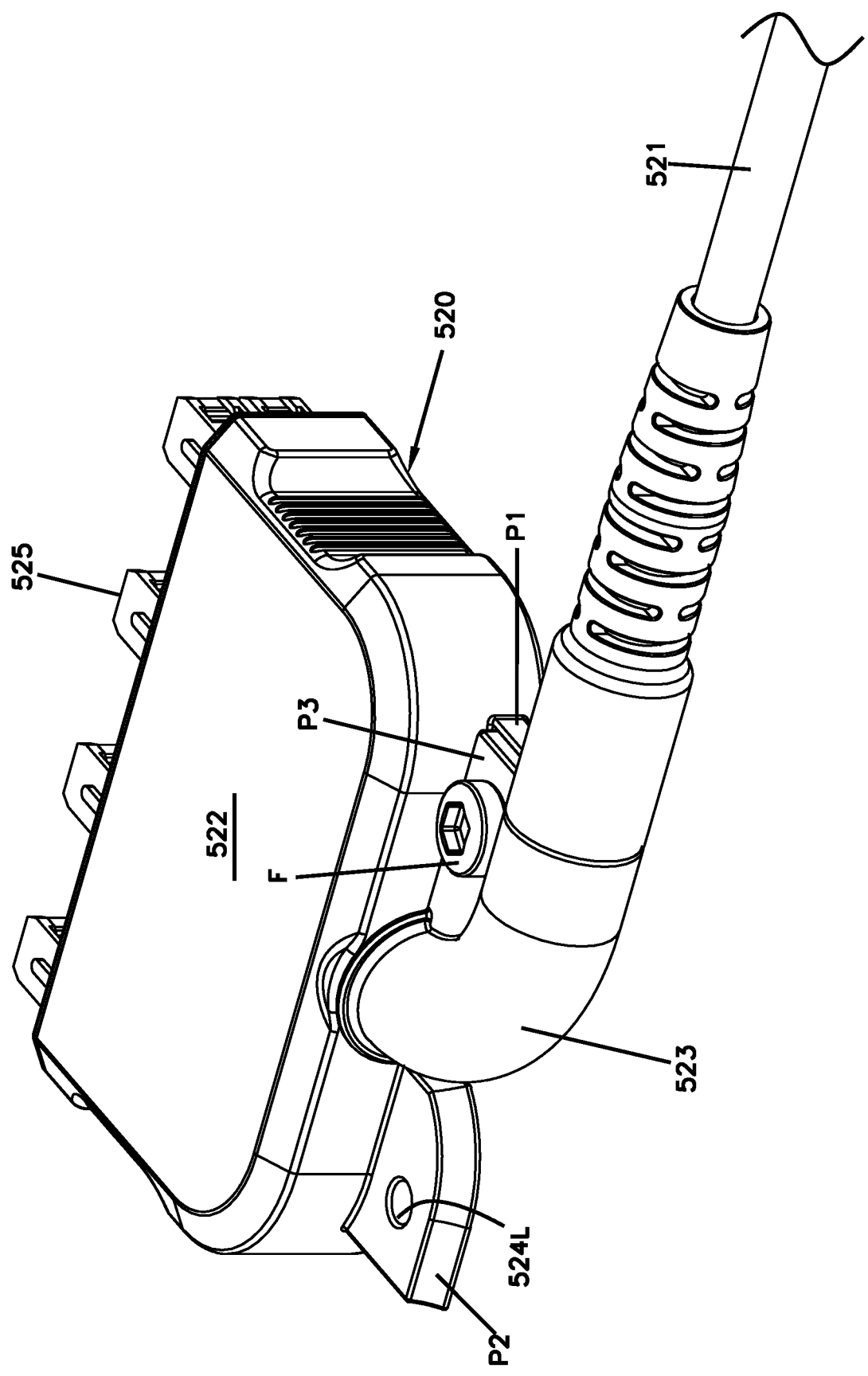

FIGS. 25-27 illustrate another example connection module 120, 520 configured to route the cable 521 away from the connection module 520 at an angle to the connection module 520. For example, the cable 521 can be routed at a 90° angle to an insertion axis of the connectors 525 of the connection module 520. In such implementations, the tapered neck 523 of the connection module 520 curves as the neck 523 extends away from the fanout body 522. The curve is selected to provide bend radius protection.

In certain implementations, the tapered neck 523 is movable to adjust the direction in which the cable 521 curves away from the connection module 520. For example, the connection module 520 includes a securement arrangement providing multiple possible securement positions for the tapered neck 523. In certain examples, the orientation of the neck 523 relative to the fanout body 522 is set before cabling the connection module 520 (i.e., before routing fibers of the cable 521 within the fanout body 522 and to connectors 525). In other examples, the orientation of the neck 523 relative to the fanout body 522 can be set after cabling the connection module 520.

In certain implementations, the rotation of the neck 523 is limited to less than 360° rotation relative to the fanout body 522. In certain implementations, the rotation of the neck 523 is limited to no more than 270° rotation relative to the fanout body 522. In certain implementations, the rotation of the neck 523 is limited to no more than 210° rotation relative to the fanout body 522. In certain implementations, the rotation of the neck 523 is limited to no more than 180° rotation relative to the fanout body 522.

In the example shown in FIG. 25, the securement arrangement includes a first platform P1 and a second platform P2. The tapered neck 523 extends outwardly from the fanout body 522 between the first and second platforms P1, P2. The securement arrangement also includes a flange P3 that aligns with the first platform P1 when the tapered neck 523 is oriented in a first position (e.g., towards the right) and aligns with the second platform P2 when the tapered neck 523 is oriented in a second position (e.g., towards the left). Each platform P1, P2 defines an aperture 524R, 524L and the flange P3 defines an aperture 524S through which a fastener F can be inserted.

In FIG. 26, the first platform P1 of the securement arrangement is visible. The neck 523 is oriented in the second position so that the flange P3 abuts the second platform P2, which aligns the apertures 524S and 524L. A fastener F is inserted through the apertures 524S, 524L to hold the neck 523 in the second position. In FIG. 27, the first platform P2 of the securement arrangement is visible. The neck 523 is oriented in the first position so that the flange P3 abuts the first platform P1, which aligns the apertures 524S and 524R. A fastener F is inserted through the apertures 524S, 524R to hold the neck 523 in the first position. In certain implementations, the fanout body 522 or enclosure 510 can be modified to enable the neck 523 to be positioned as shown in FIG. 25 or in any other desired orientation.

Figure 28:
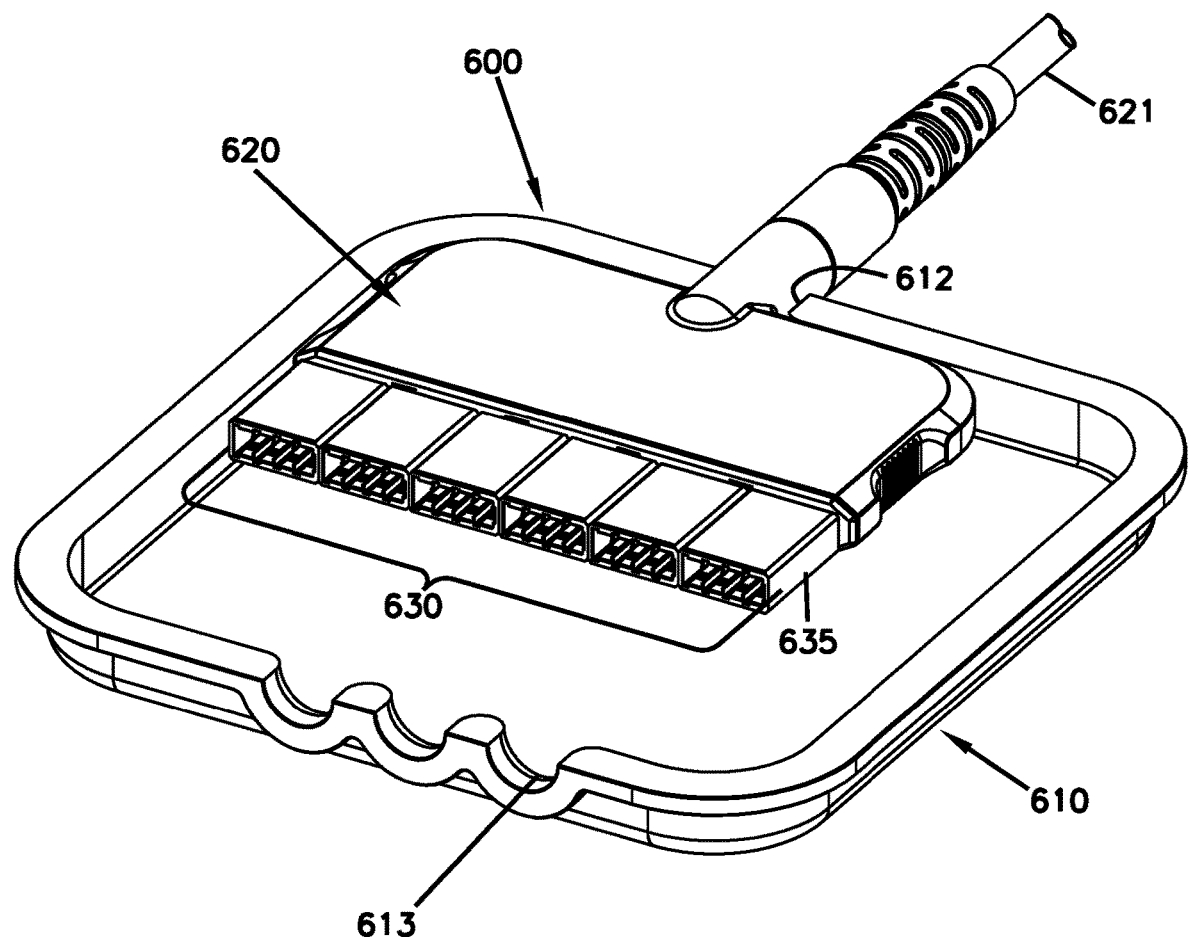
FIG. 28 is a perspective view of another example connection terminal including a male connection module and a coupler arrangement within an enclosure (a portion of which is hidden from view for ease in viewing)
Figure 29:
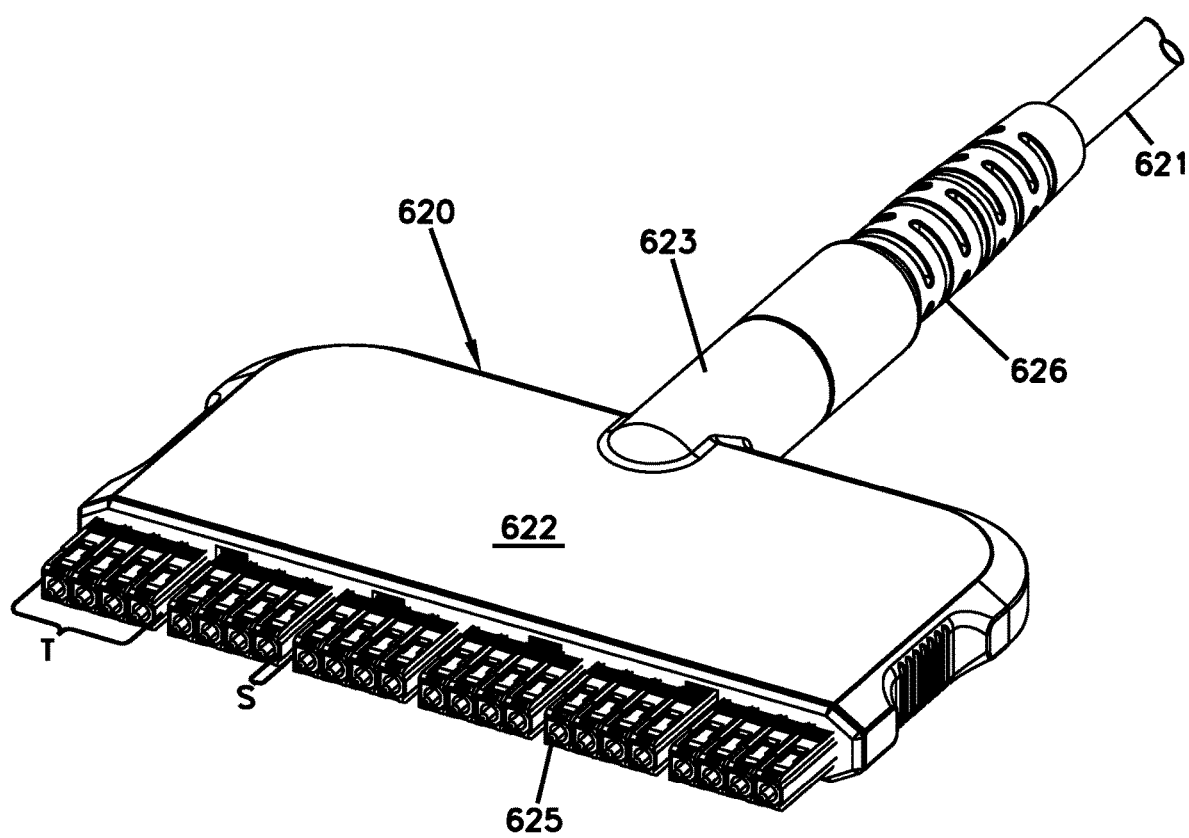
FIG. 29 is a perspective view of the connection module of FIG. 28.
Figure 30:
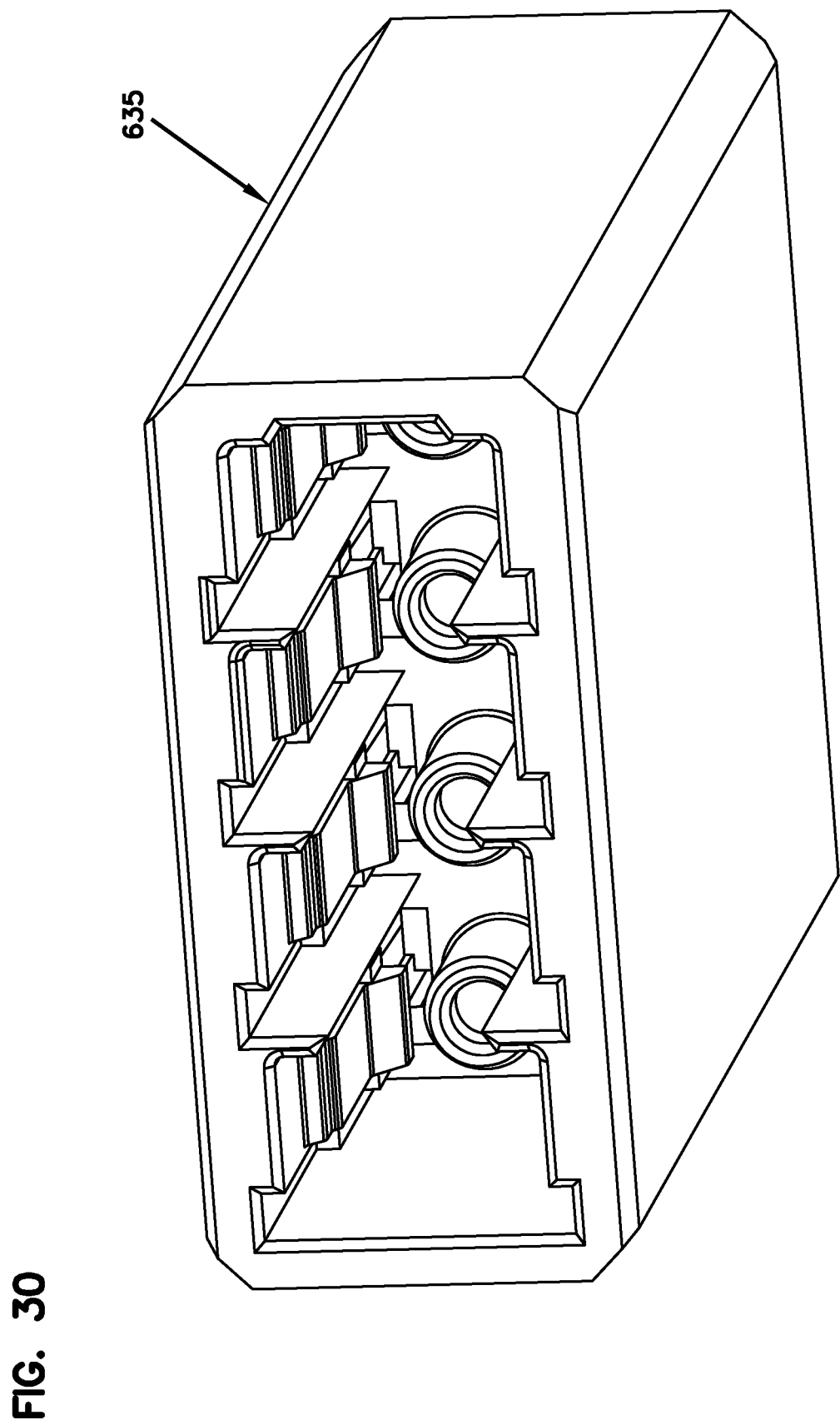
FIG. 30 is a perspective view of an example coupler of FIG. 28.

FIGS. 28-30 illustrate another example terminal 100, 600 including an enclosure 110, 610, a male connection module 120, 620, and a coupler arrangement 130, 630. The second male connection module 620 and the top piece of the enclosure 610 are not shown for ease in viewing of the remaining components. Of course, a female connection module could be utilized in place of the first or second male connection module 620 if the coupler arrangement 630 were removed.

The connection module 120, 620 shown in FIG. 29 has a plurality of male connectors 625. In some examples, the connectors 625 are evenly spaced along the row of the connection module 620. In other examples, the connectors 625 are arranged in groups T with a larger spacing S between each group T than spacing between individual connectors 625 within each group T.

As shown in FIG. 28, the coupler arrangement 630 can include a plurality of couplers 635 defining multiple ports. Each coupler 635 is configured to service multiple connector positions along a row of connectors 625 of the connection module 620. For example, each coupler 635 can mount over one group T of connectors 625. Of course, each coupler 635 also could be adapted to service multiple rows of connectors 625. The spacing S between groups T accommodates the end walls of adjacent couplers 635.

Figure 31:
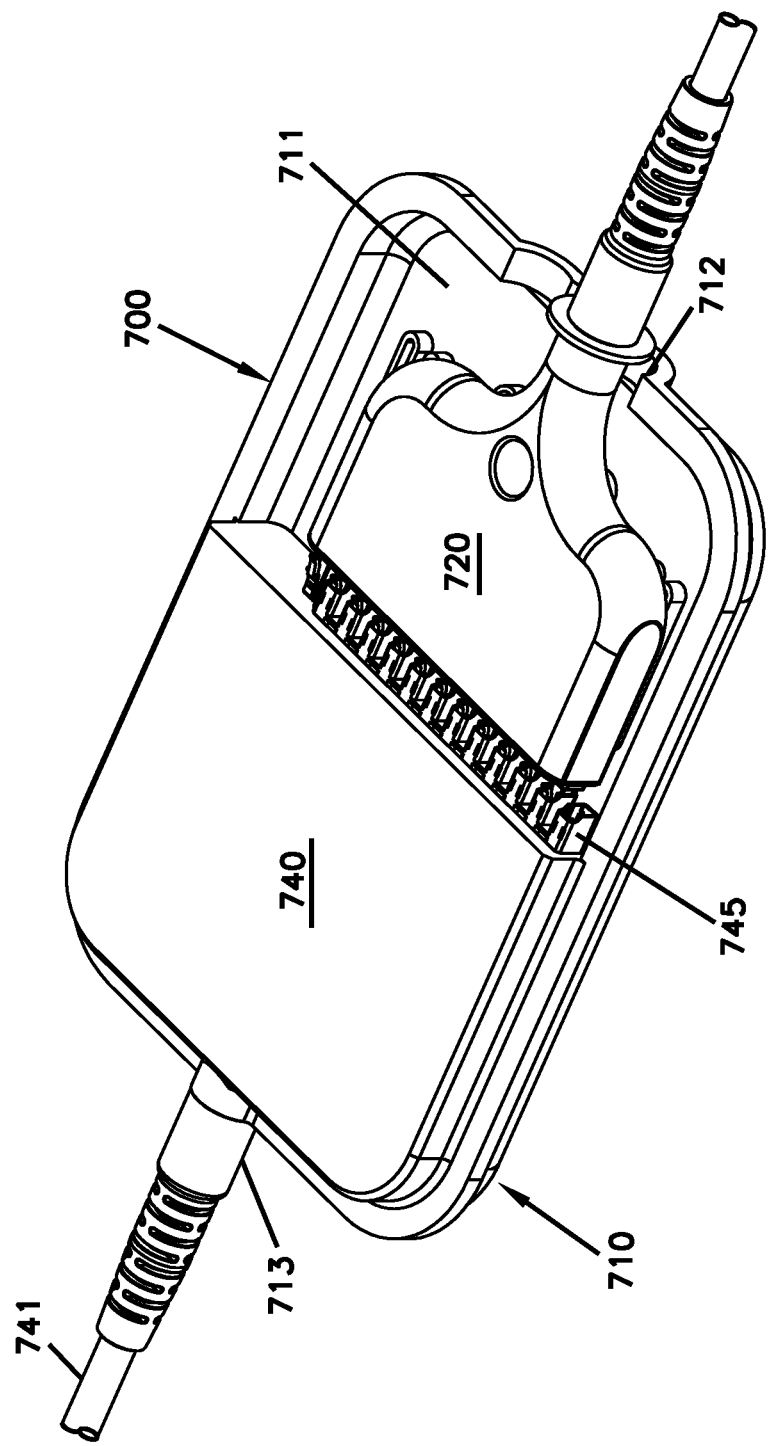
FIG. 31 is a perspective view of another example connection terminal including a male connection module directly optically coupled to female connectors built into an enclosure (a portion of which is hidden from view for ease in viewing)

FIG. 31 illustrates another example connection terminal 100, 700 in which one of the connection modules is built into the enclosure 710. In the example shown, a female connection module 740 is built into the enclosure 710 to mate with a male connection module 720 that is subsequently installed at the enclosure 710. In other examples, a male connection module could be built into the enclosure 710 to mate with a female connection module that is subsequently installed at the enclosure 710.

In certain examples, the sealed port 713 for the built-in connection module 740 has only one position while the sealed port 712 for the subsequently installable connection module 720 has multiple positions.

Figure 32:
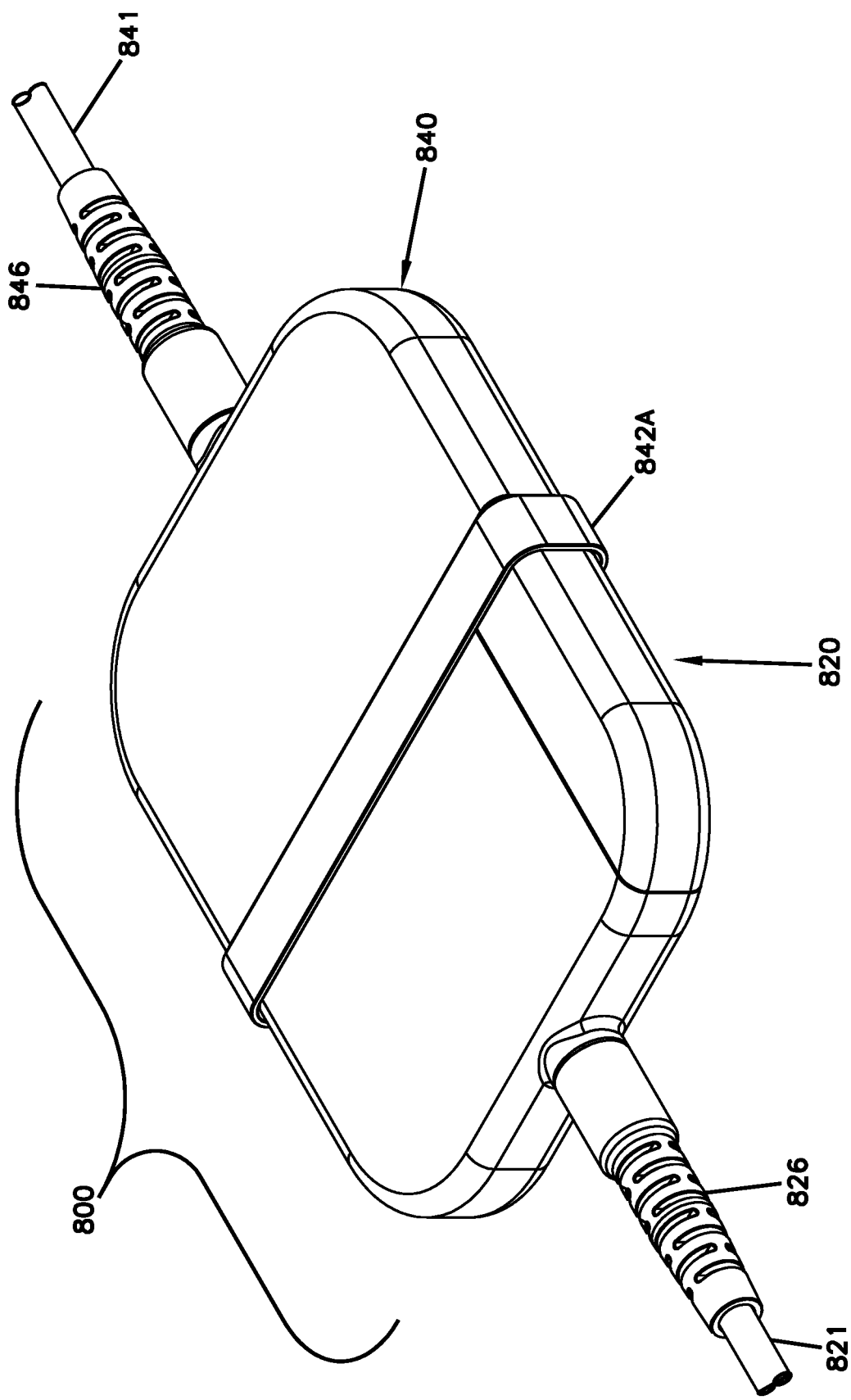
FIG. 32 is a perspective view of another example connection terminal including a male connection module and a female connection module that directly optically couple to each other.
Figure 33:
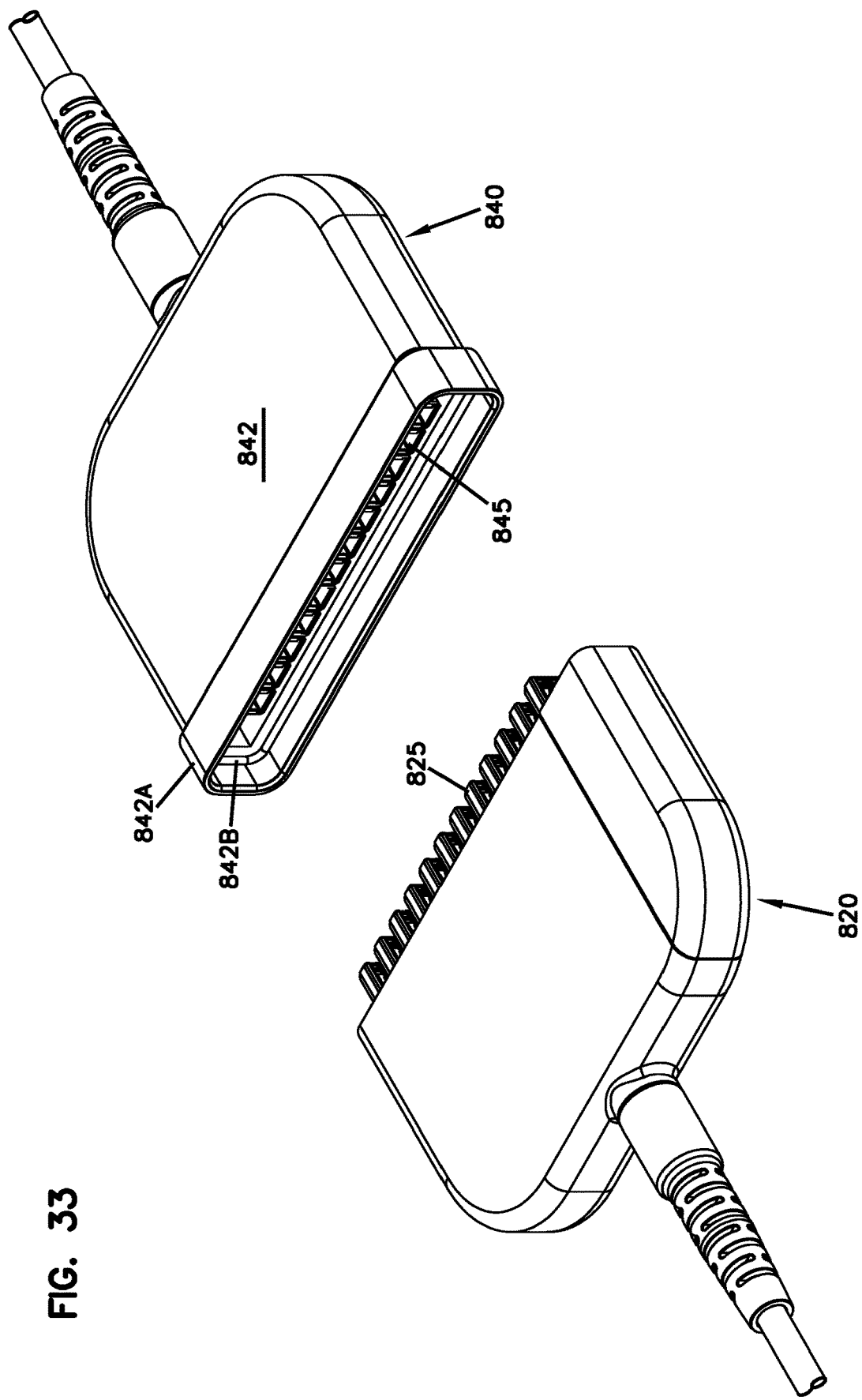
FIG. 33 shows the male and female connection modules of FIG. 32 separated from each other.
Figure 34:
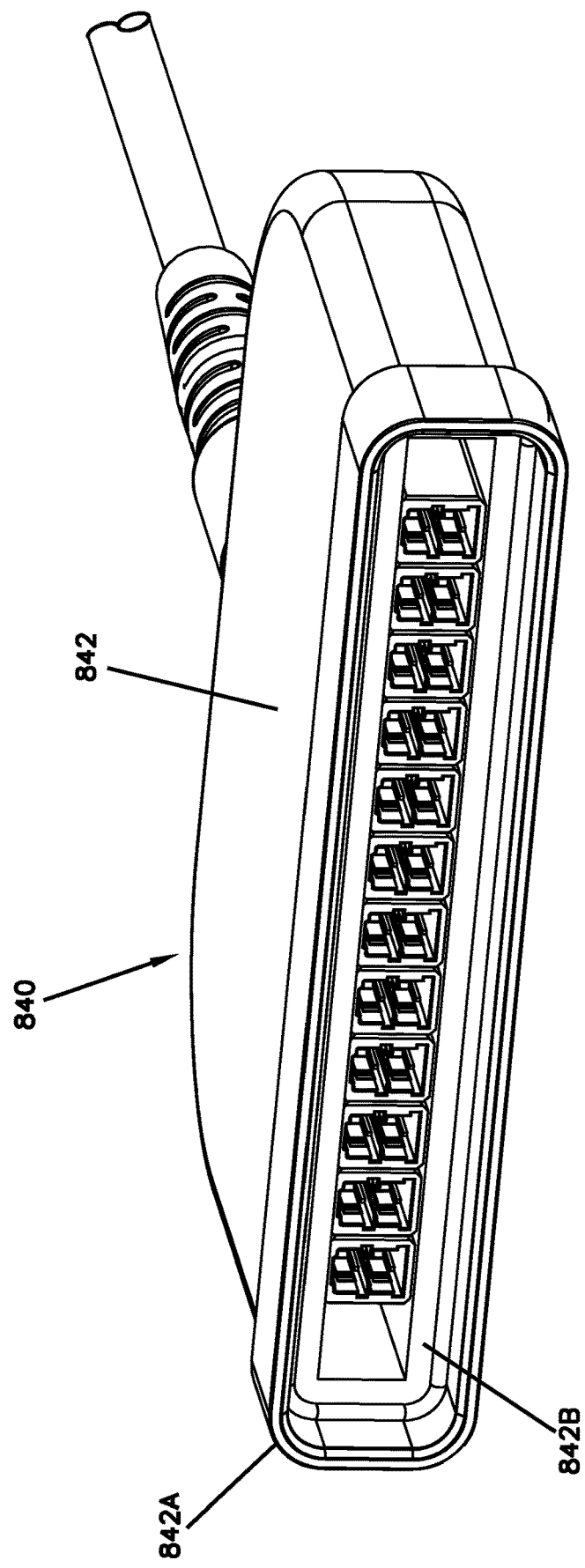
FIG. 34 is a perspective end view of the female connection module of FIG. 33.

FIGS. 32-34 illustrate another example terminal 100, 800 including a male connection module 120, 820 and a female connection module 140, 840 that directly optically couple together without a separate coupler arrangement. Each connection module 820, 840 includes connectors 825, 845 disposed at a fanout body 822, 842. A strain-relief boot 826, 846 surrounds the respective cable 821, 841 and respective neck 823, 843 of the fanout body 822, 842.

The connection modules 820, 840 are configured to sealingly engage each other. In certain implementations, the fanout body 842 of the female connection module 840 extends over the connectors 845. Accordingly, the connectors 825 of the male connection module 820 enter the fanout body 842 of the female connection module 840 when inserted into the female connectors 845.

In certain examples, the fanout body 842 of the female connection module 840 includes a shroud 842A that extends over a portion of the fanout body 822 of the male connection module 820. In certain examples, a sealing surface 842B is recessed within the shroud 842A. In some examples, a gasket (e.g., rubber gasket, foam gasket, gel gasket, etc.) can be disposed at the sealing surface 842B. In other examples, the gasket can be carried by the male connection module 820.

Figure 35:
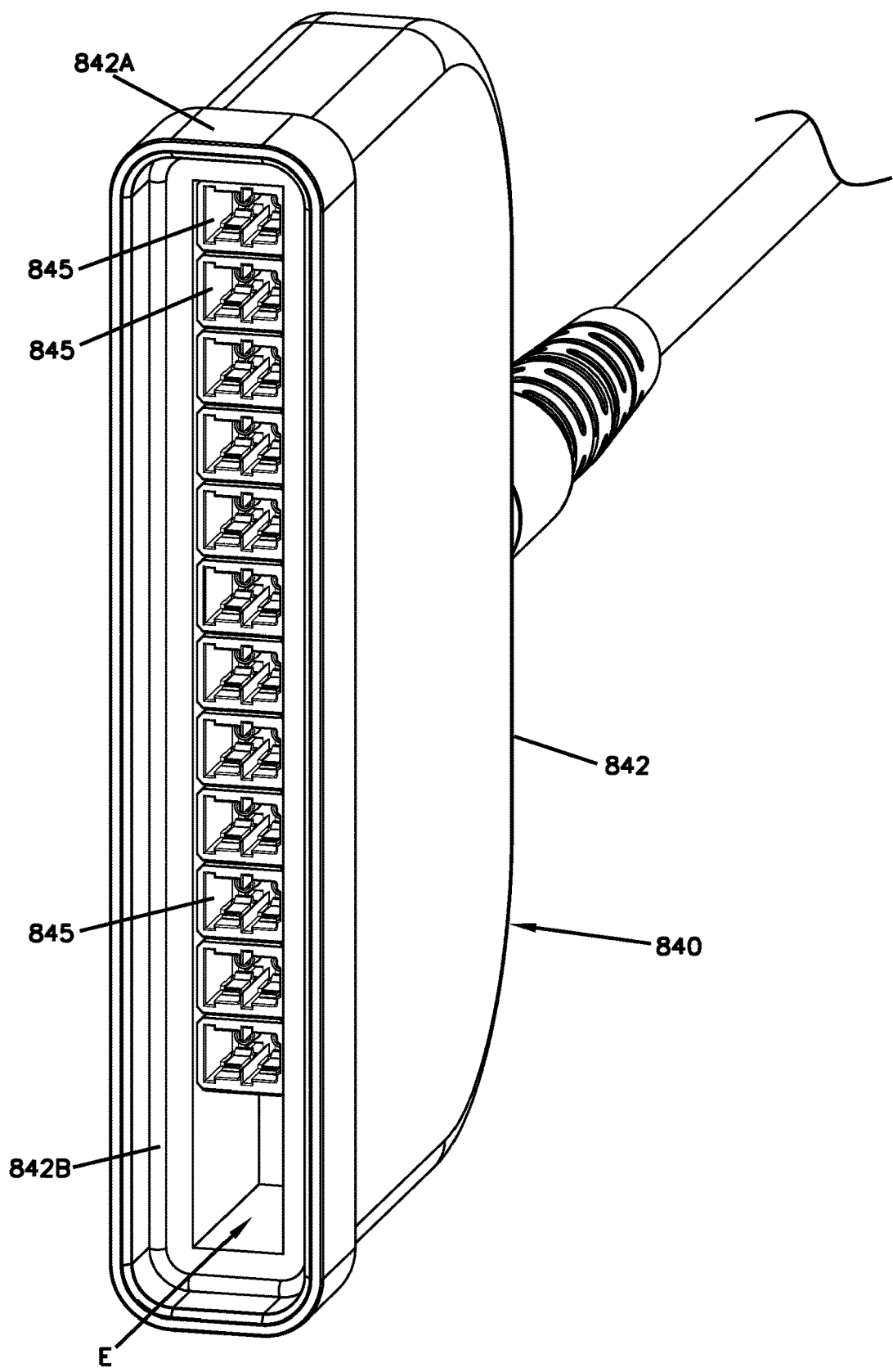
FIGS. 35-38 illustrate how the female connectors of the female connection module are movable relative to a fanout housing of the connection module.
Figure 36:
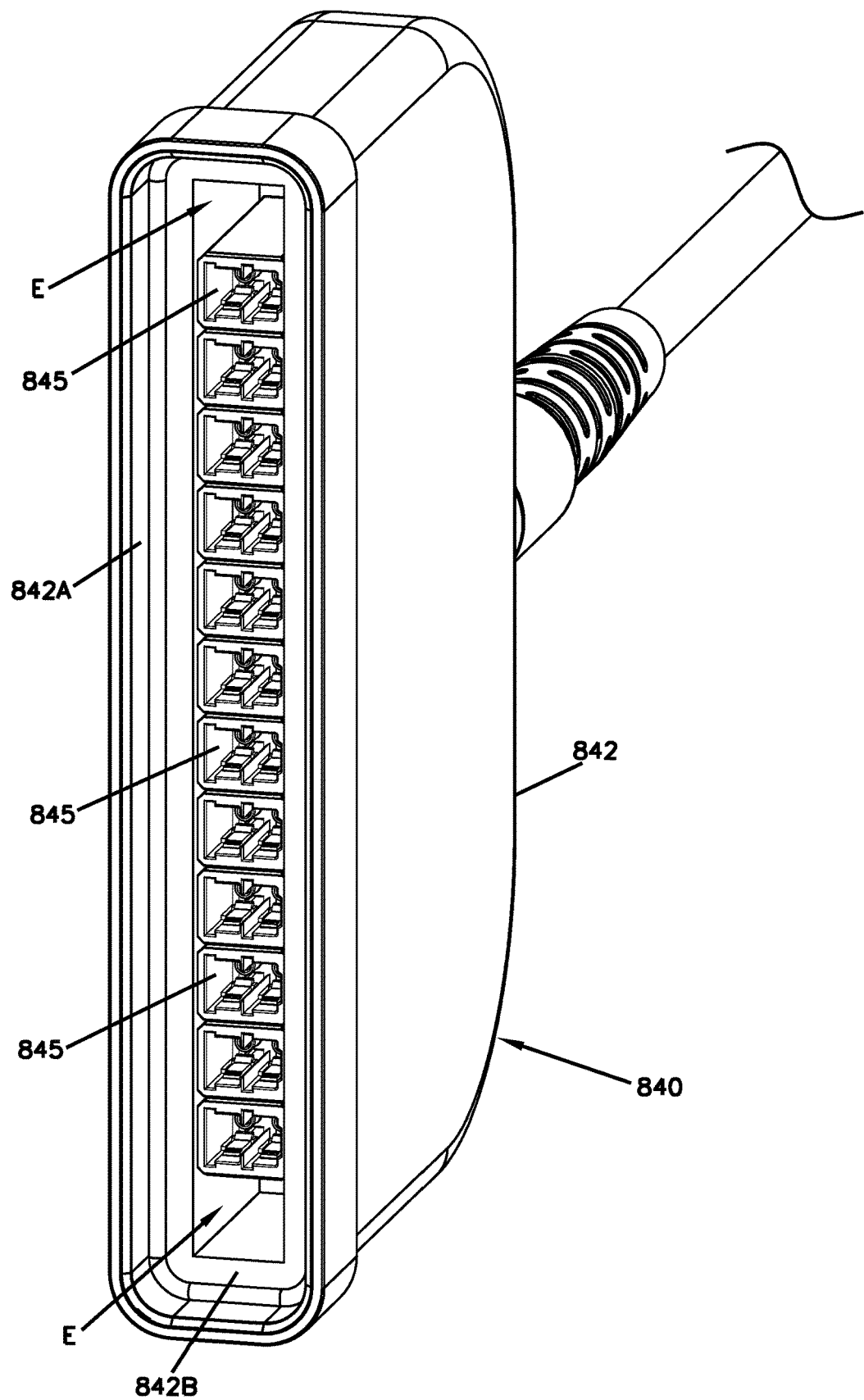
Figure 37:
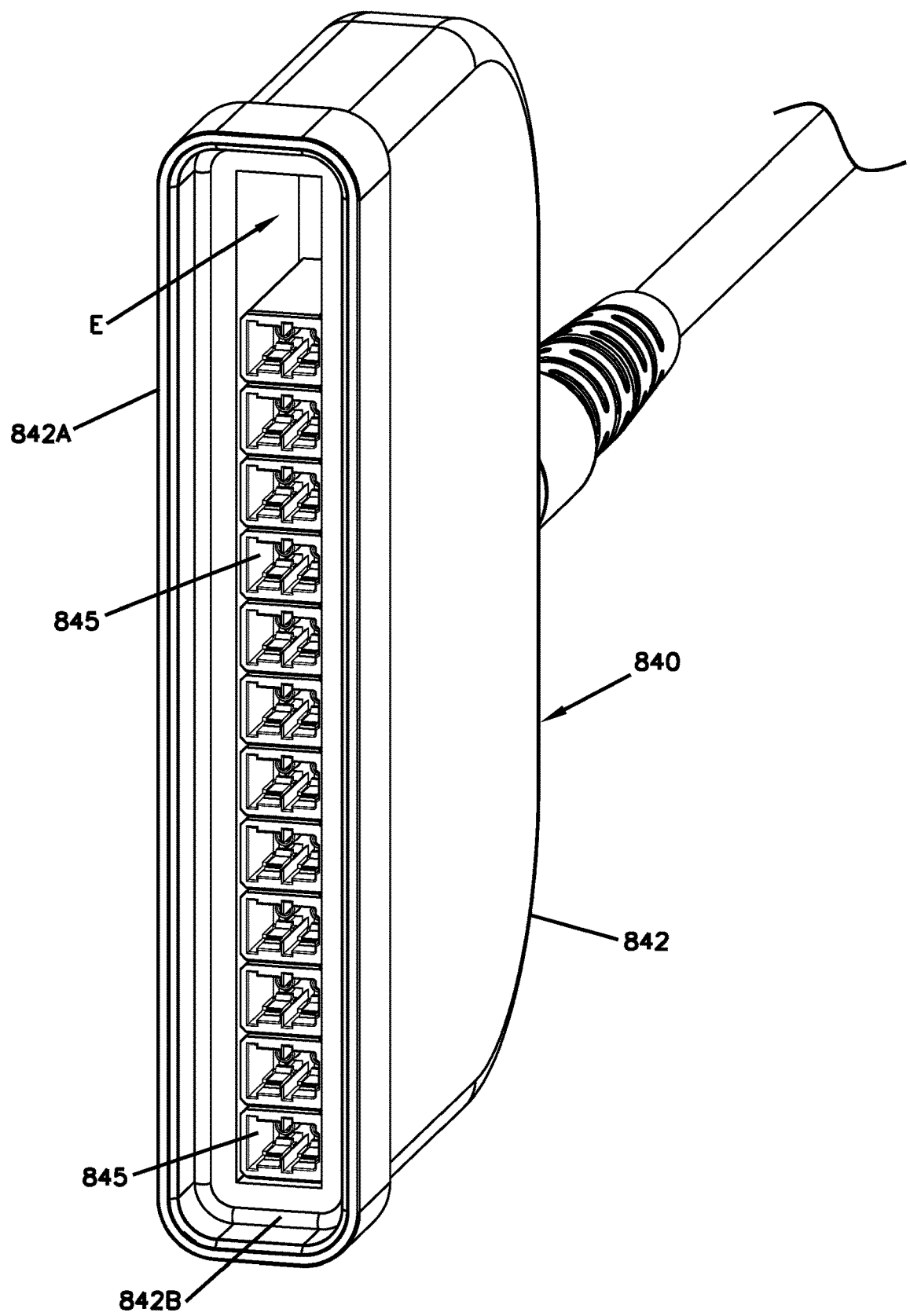

As shown in FIGS. 35-38, certain types of female connection modules 140, 840 include movable female connectors 845 to facilitate offsetting of the connection modules 820, 840. In FIG. 35, the female connectors 845 are positioned to a first end of the fanout body 842, leaving an empty space E at an opposite second end of the body 842. In FIG. 36, the female connectors 845 are positioned at intermediate locations within the fanout body 842, thereby leaving empty spaces E at both ends of the body 842. In FIG. 37, the female connectors 845 are positioned at the second end of the body 842, thereby leaving an empty space E at the first end of the body 842.

In some implementations, the connectors 845 are slideable within the fanout body 842. For example, the connectors 845 may slide along a rail disposed within the fanout body 842. In other implementations, the connectors 845 are removable from the fanout body 842 and insertable into desired positions. In certain implementations, the connection module 840 is not cabled with fibers of the cable 841 until the connectors 845 are disposed at the desired positions. In other implementations, the connectors 825 of the male connection module 820 are positionable instead of or in addition to the female connectors 845.

Figure 38:
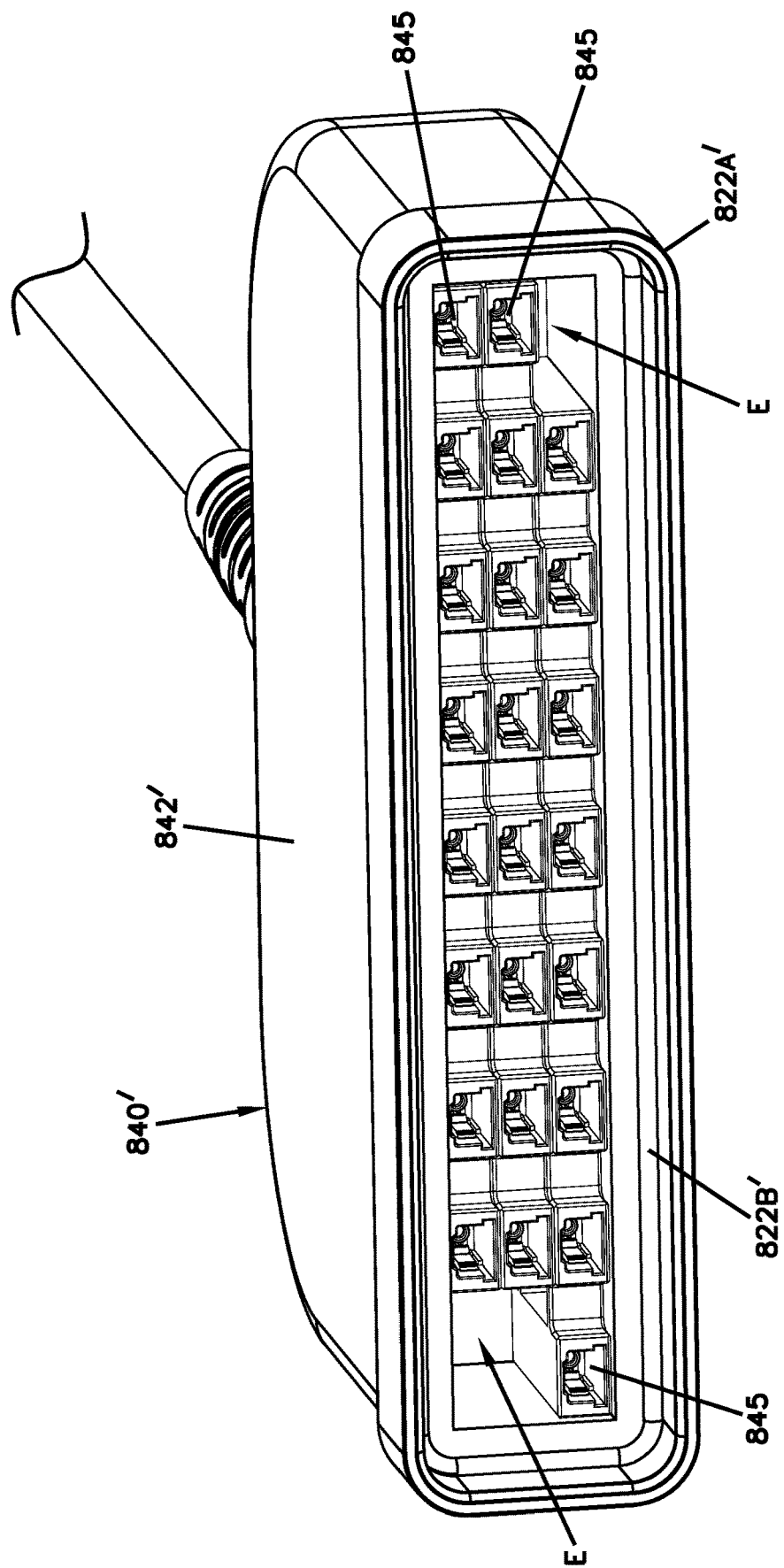
Figure 39:
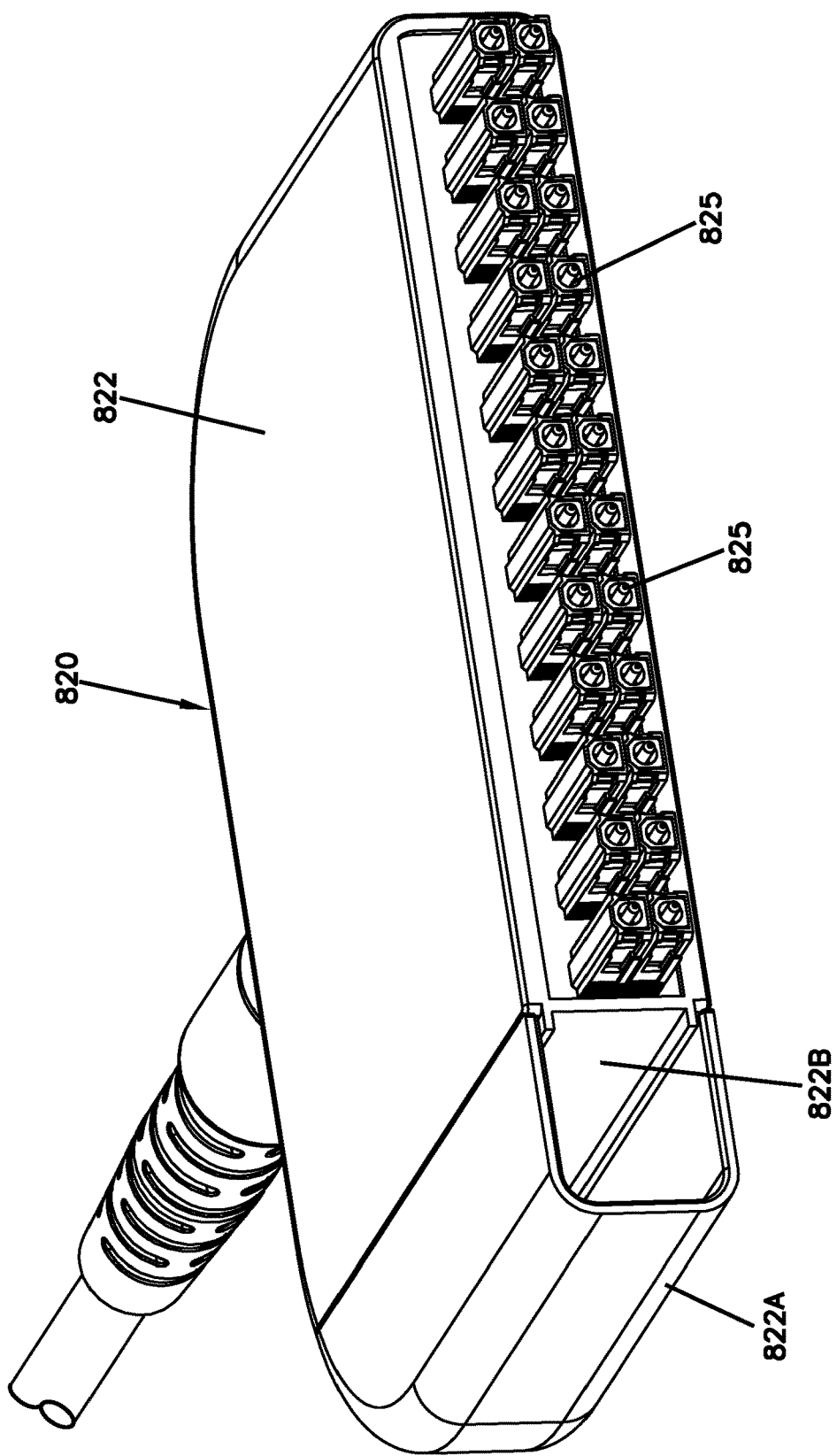
FIG. 39 is a perspective view of an example male connection module suitable for use with any of the female connection modules disclosed herein.

FIG. 38 shows an alternative female connection module 840' having multiple rows of connectors 845 disposed within the fanout body 842'. In some implementations, each row of connectors 845 is separately movable as a unit relative to the fanout body 842. In other implementations, each connector 845 is individually moveable relative to the other connectors 845 in the corresponding row. Accordingly, one row of connectors 845 can provide an empty space E at one end of the fanout body 842 while another row of connectors 845 can provide an empty space E at another end of the fanout body 842.

FIGS. 39-42 illustrate an example male connection module 820 configured to provide access to one or more tap-off connectors 845N of the female connection module 840. The connection module 820 includes a fanout body 822 defining an end wall 822B covered by a shell 822A. If no tap-off connectors 845N need to be accessed, then the shell 822A fully seals the connectors 845 within the terminal 800. If access to one or more tap-off connectors 845N is desired, then a connectorized cable can be passed through the space covered by the shell 822A.

In some examples, the shell 822A is removed (see FIG. 40) from the connection module 820. In other examples, the connectorized cable is routed through the shell 822A to the tap-off connector 845N. In such examples, the shell 822A environmentally seals about the connectorized cable. For example, a perforated (or otherwise weakened) portion of the shell 822A can be removed to enable the connectorized cable to enter the shell 822A. In other examples, the shell 822A can be replaced with a different shell that provides sealing for a connectorized cable.

Figure 40:
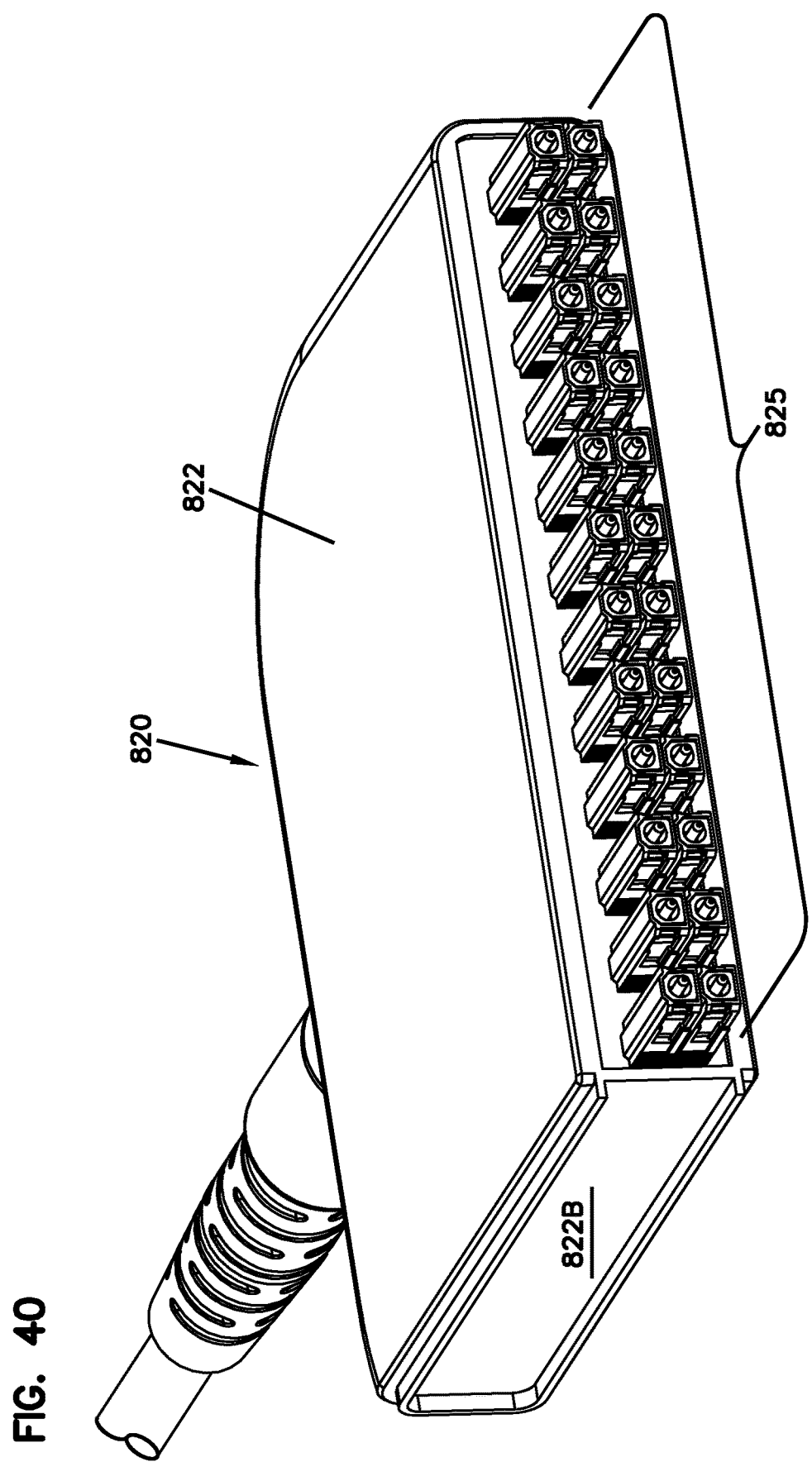
FIG. 40 shows the connection module of FIG. 39 with a shell removed.
Figure 41:
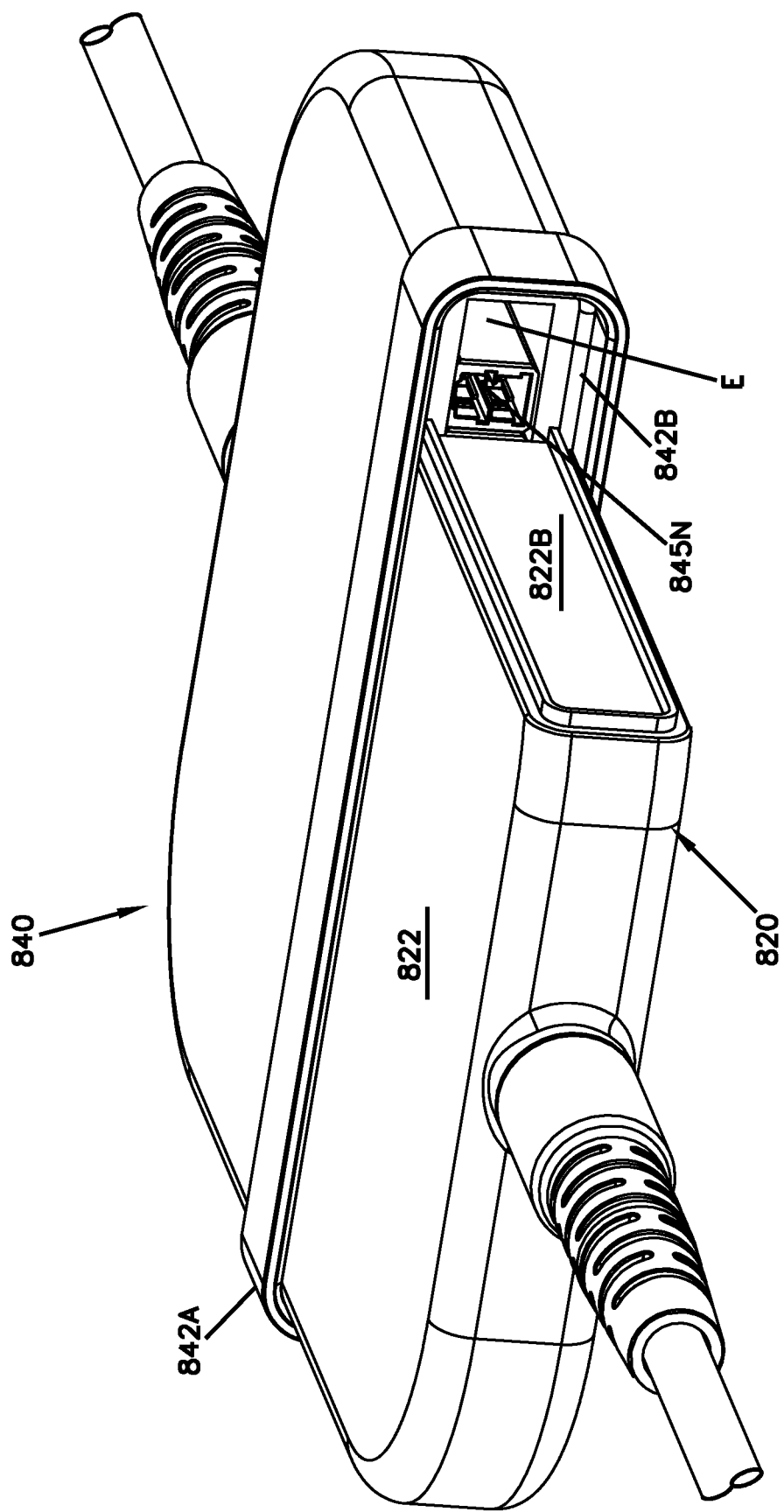
FIG. 41 shows the connection module of FIG. 40 directly optically coupled to the connection module of FIG. 34 so that a tap-off connector remains accessible.
Figure 42:
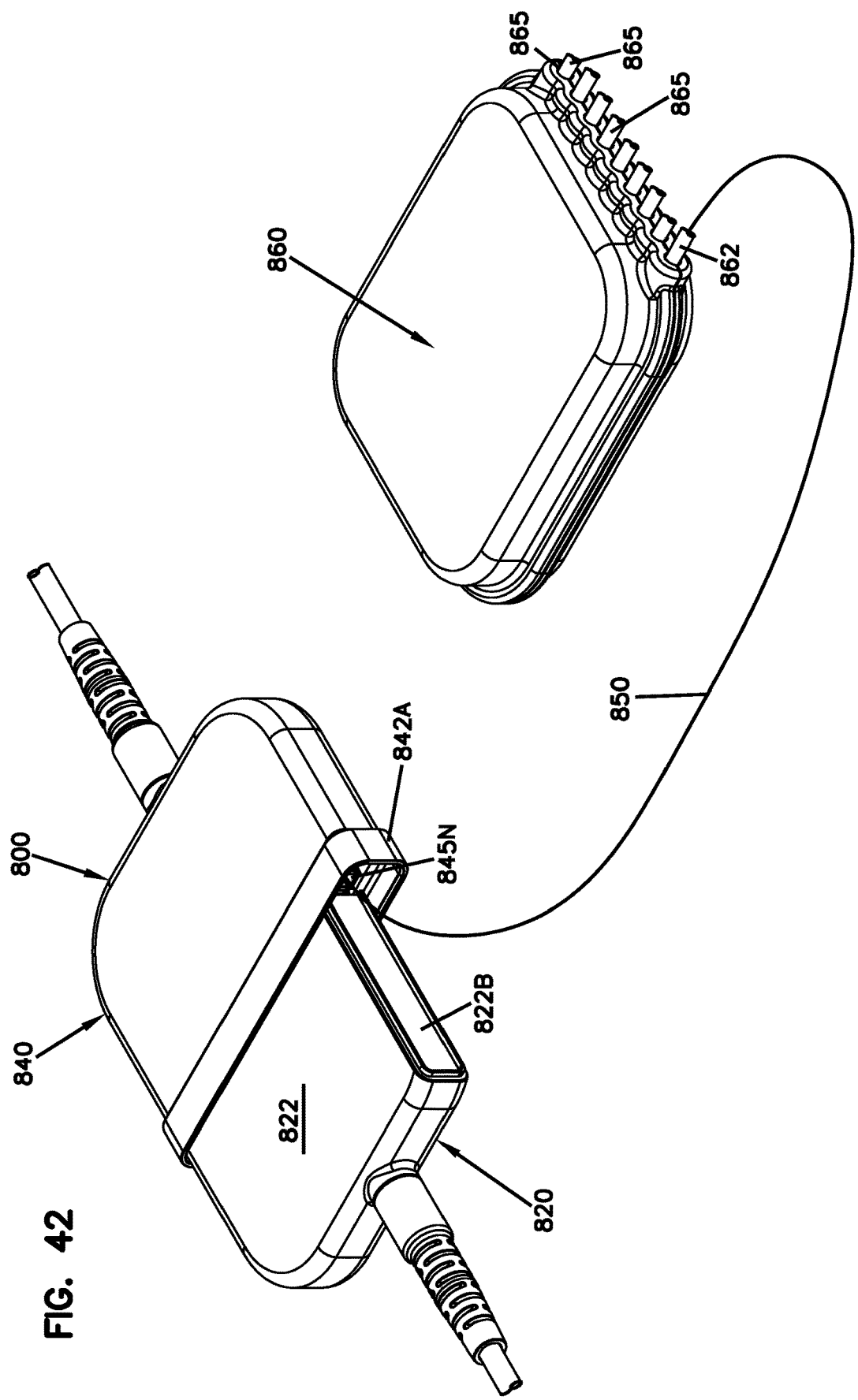
FIG. 42 shows a splitter module optically coupled to the tap-off connector of FIG. 41.
Figure 43:
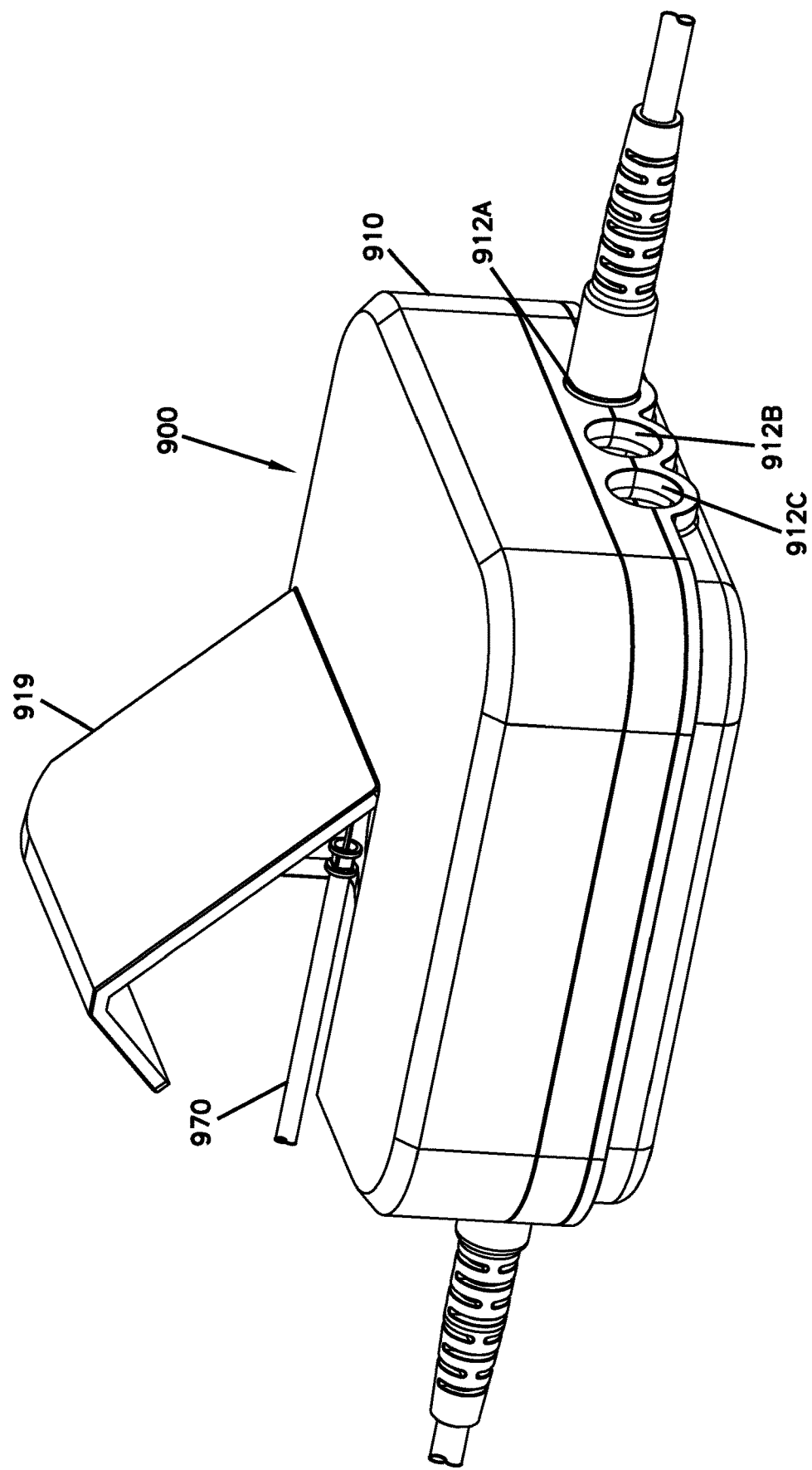
FIG. 43 is a perspective view of an example connection terminal including two connection modules capable of directly optically coupling together in multiple offset configurations within a sealed enclosure, the connection terminal also including a splitter module within the sealed enclosure.

For clarity and ease in viewing, FIGS. 40-42 illustrate the shell 822A being removed so that a connectorized cable 850 can be routed to the tap-off connector 845N. It will be understood, however, that the shell 822A or a different shell can be mounted to the connection module 820 to mate with the connection module 840 to maintain an environmental seal between the connection modules 820, 840. As shown in FIG. 41, a tap-off connector 845N is disposed in alignment with the shell 822A. In the example shown, the connection module 840 includes additional empty space E adjacent the tap-off connector 845N. If additional tap-off connectors 845N are desirable, then such connectors 845N can be moved into the empty space E.

In the example shown, the shell 822A is provided on one end of the connection module 820. In other examples, however, the shell 822A can be provided at the opposite end of the connection module 820. In other examples, however, the shell 822A can be provided at both ends of the connection module 820.

As shown in FIG. 42, a splitter module 160, 860 can be optically coupled to the terminal 100, 800 by routing a tap-off cable 150, 850 between the tap-off connector 845 and a splitter input 862. The splitter module 860 can include an enclosure containing an optical splitter (e.g., a power splitter, a wavelength division multiplexer, etc.). Signals carried over the tap-off cable 850 to the splitter module input 862 are split into splitter outputs 865. In some examples, the splitter outputs 865 include connectorized pigtails extending out from the enclosure. In other examples, the splitter outputs 865 include cables routed into the enclosure and spliced or otherwise optically coupled to the splitter.

FIGS. 43-47 illustrate an example terminal 100, 900 including an enclosure 910 housing two connection modules 920, 940 and an optical splitter module 960. In the example shown, the connection modules include a male connection module 920 and a female connection module 940. In other examples, the enclosure 910 could house two male connection modules 920 and a coupler arrangement.

Figure 45:
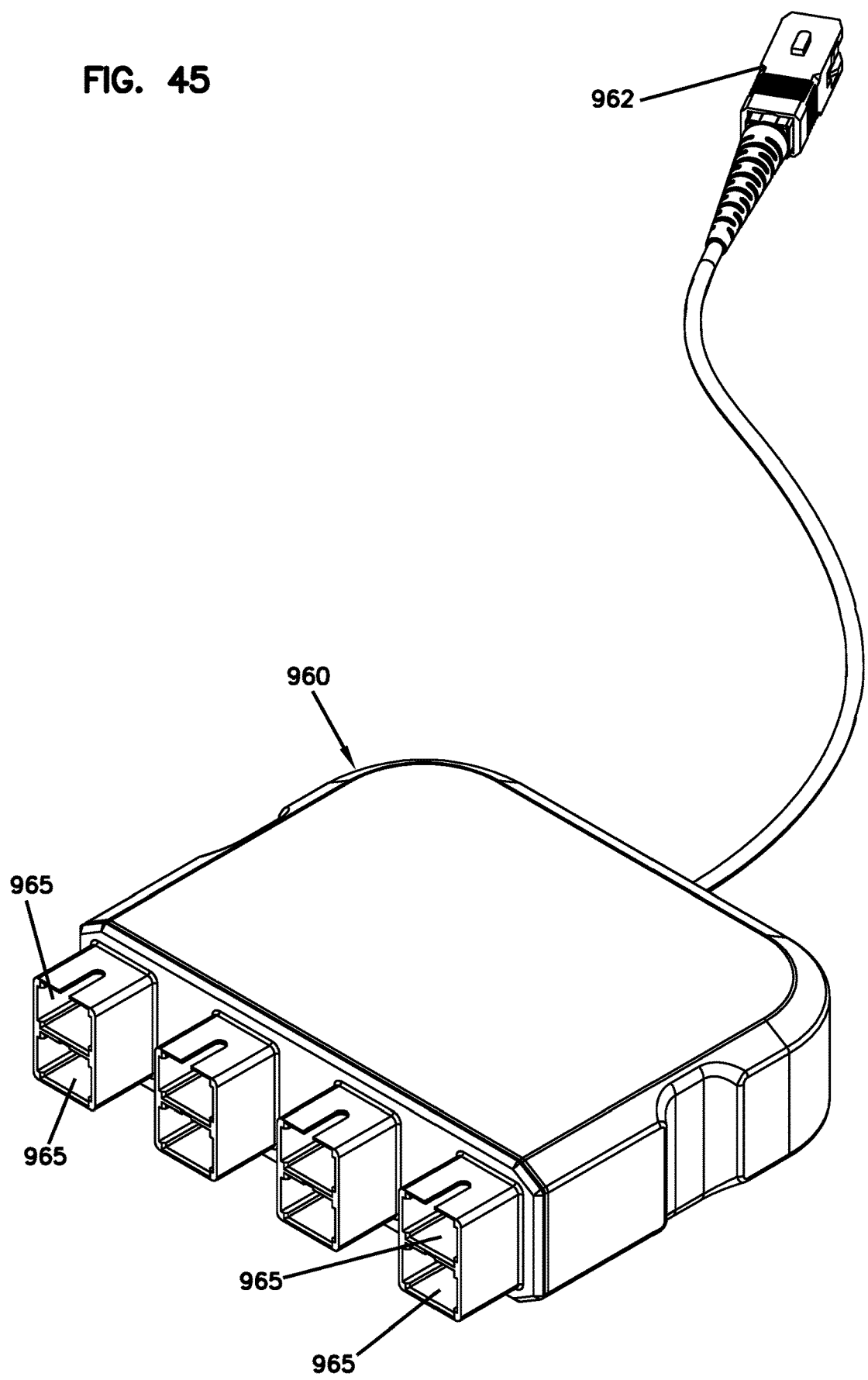
FIG. 45 is a perspective view of the splitter module of FIG. 43.

The splitter module 960 includes a splitter input 962 that can be optically coupled to a tap-off connector of one of the connection modules 920, 940. The splitter module 960 contains a splitter that splits the optical signals onto splitter outputs 965. An example splitter module 960 is shown in FIG. 45. In the example shown, the splitter input 962 can includes a connectorized pigtail. In other examples, the splitter input 962 can include a port configured to receive a separate splitter input cable. In the example shown, the splitter outputs 965 include female connectors (i.e., ports) configured to receive tap-off cables 970. In other examples, the splitter outputs 965 may include male connectors or connectorized pigtails.

The enclosure 910 is configured to enable access to the outputs 965 of the splitter module 960. In certain implementations, the enclosure 910 provides access to the splitter outputs 965 without providing access to the connection modules 920, 940. For example, the enclosure 910 may include a dividing wall 917 that separates the interior of the enclosure 910 into two compartments. The connection modules 920, 940 are disposed in the first compartment. The splitter module 960 is disposed in the second compartment.

Figure 44:
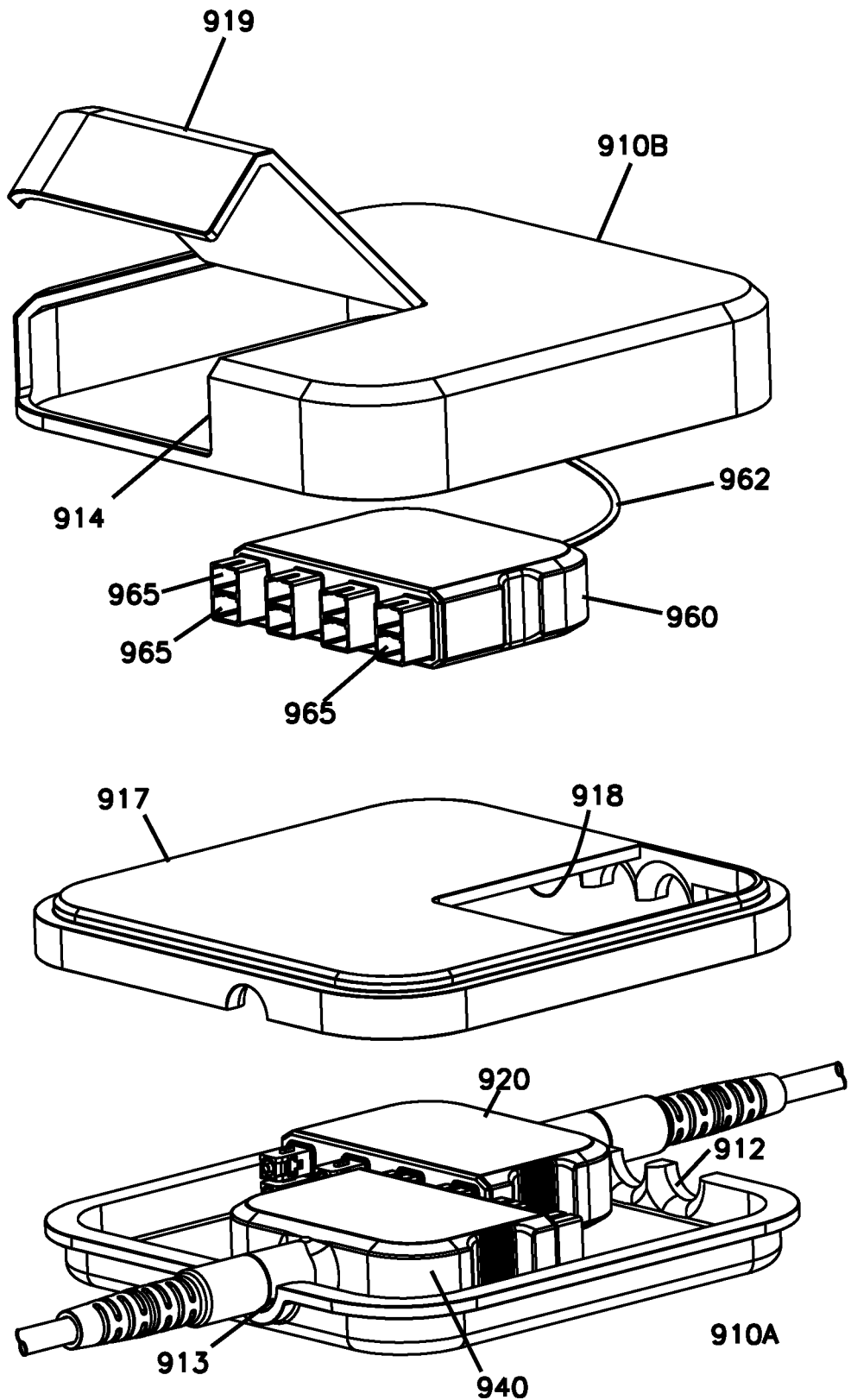
FIG. 44 is an exploded view of FIG. 43.
Figure 46:
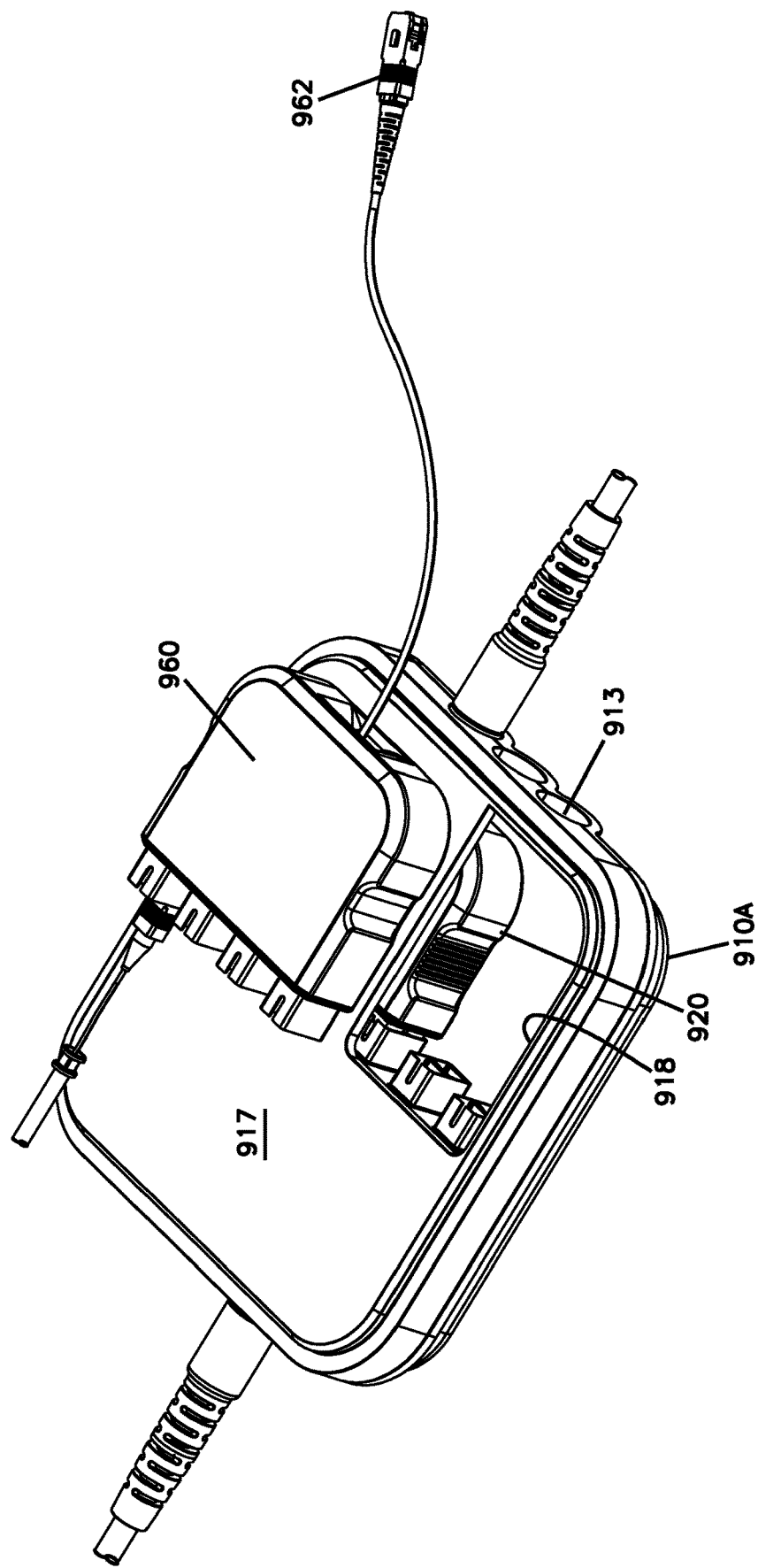
FIG. 46 shows the connection terminal of FIG. 43 without a top portion of the enclosure for ease in viewing.

As shown in FIGS. 44 and 46, the dividing wall 917 may define an aperture 918 through which the splitter input cable 962 can pass to enter the first compartment. Once in the first compartment, the splitter input cable 962 can be routed to one of the tap-off connectors. In some examples, the splitter input cable is plugged into a tap-off connector of the female connection module 940. In other examples, the splitter input cable 962 can be coupled to a tap-off connector of the male connection module 920 via a separate coupler (e.g., adapter). In still other examples, the splitter input cable 962 can be connectorized with a female connector to mate with the male connection module 920.

Figure 47:
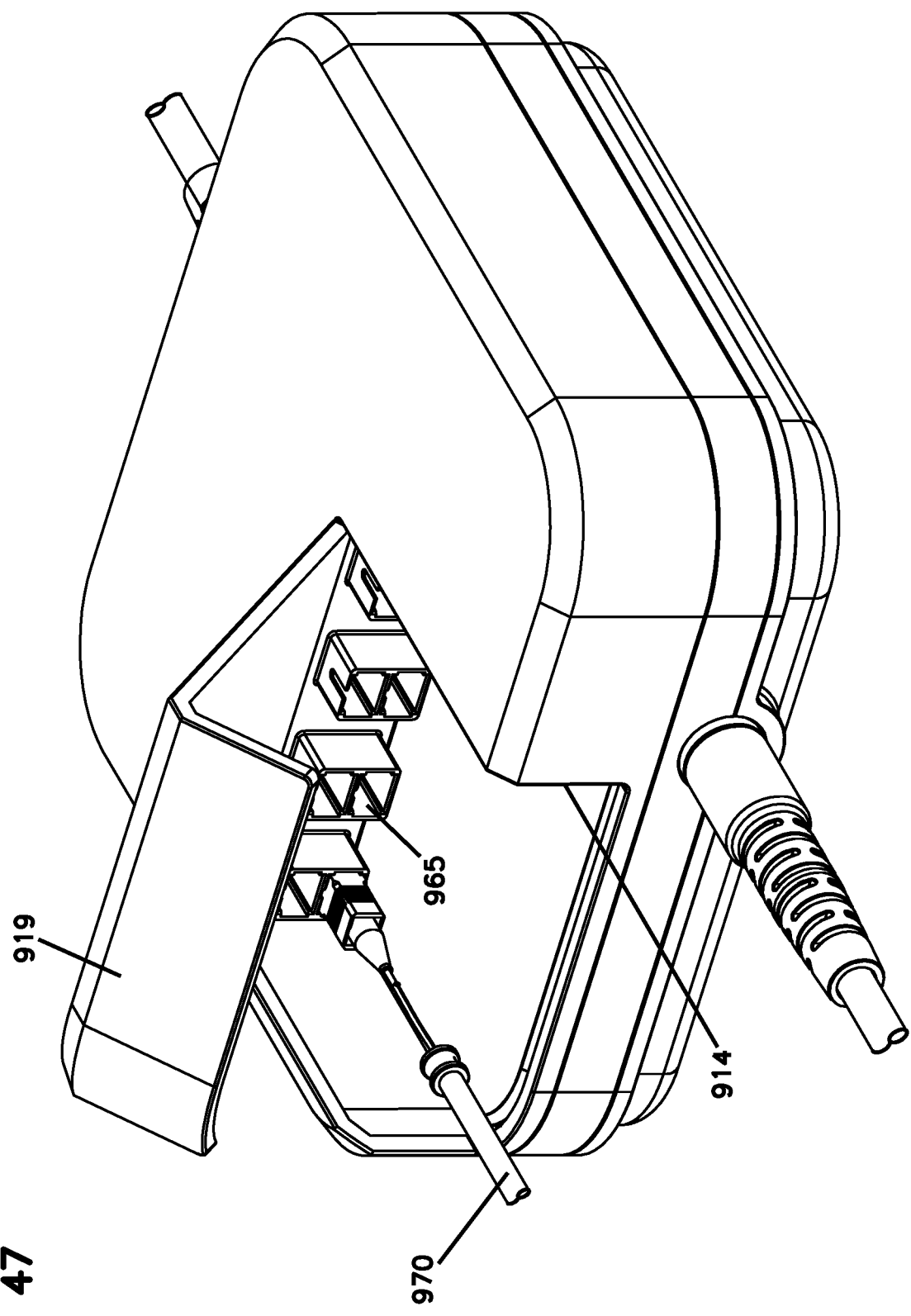
FIG. 47 is another perspective view of the connection terminal of FIG. 43.

As shown in FIG. 47, the enclosure 910 defines a tap-off opening 914 through which the splitter outputs 965 are accessible. In certain implementations, the enclosure 910 includes a cover 919 that is movable to cover and uncover the tap-off opening 914 to inhibit and allow access to the splitter outputs 965 respectively. In the example shown, the cover 919 is pivotally mounted (e.g., hinge pin, living hinge, etc.) to the enclosure 910. In other examples, the cover 919 is fully removable from a remainder of the enclosure 910.

FIGS. 48-52 illustrate an example optical connection terminal 1000 including an enclosure 1010 holding two connection modules. The enclosure 1010 defines sealed ports 1012, 1013 through which the cables corresponding to the connection modules enter the enclosure 1010. In certain implementations, the enclosure also defines one or more sealed tap-off ports 1014. In the example shown, the enclosure 1010 defines four tap-off ports 1014. In other examples, the enclosure 1010 defines a greater or lesser number of tap-off ports 1014.

A splitter module 1060 can be mounted to an exterior of the enclosure 1010. The splitter 1060 includes an input 1062 and a plurality of outputs 1065. In some implementations, the splitter module 1060 is oriented relative to the enclosure 1010 so that the outputs 1065 face in an orthogonal direction from the sealed ports 1012, 1013. In other examples, the splitter module 1060 is oriented so that the outputs 1065 face in a parallel direction with the sealed ports 1012, 1013. In still other examples, the splitter module 1060 can be mounted in any desired orientation.

The splitter module 1060 of FIGS. 48-52 is shown without a cover. It is noted, however, that a cover could be added to enclosure the input 1062 and outputs 1065. In certain examples, the cover could provide environmental sealing for the cables routed to the input 1062 and/or to the outputs 1065.

Figure 48:
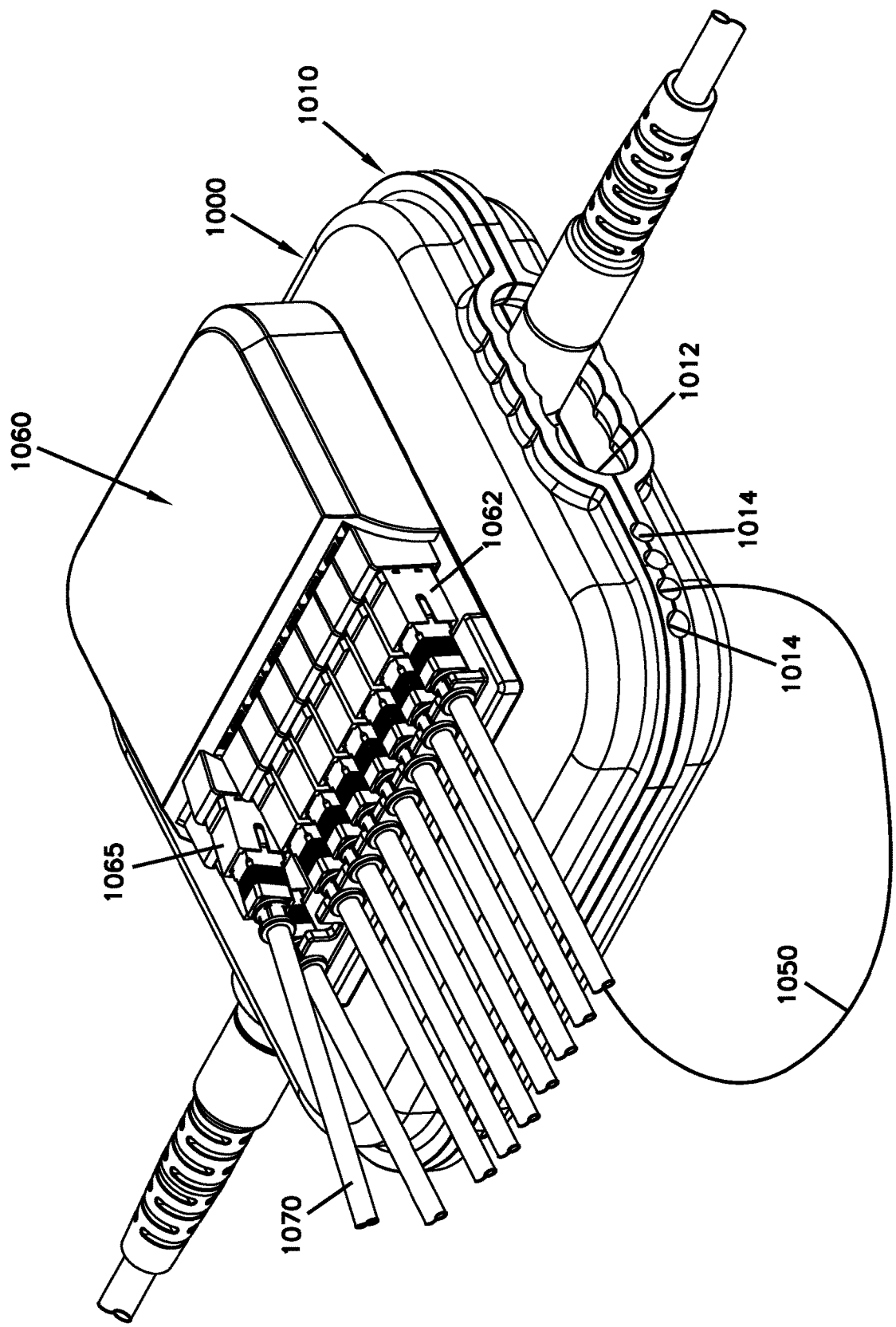
FIG. 48 is a perspective view of another example connection terminal having an external splitter module in a first orientation.

A tap-off cable 1050 can be routed between the splitter input 1062 and the tap-off port 1014 of the enclosure 1010 (see FIGS. 48 and 49). In certain examples, the tap-off cable 1050 extends through the sealed port 1014 and couples to a tap-off connector of one of the connection modules.

Figure 48A:
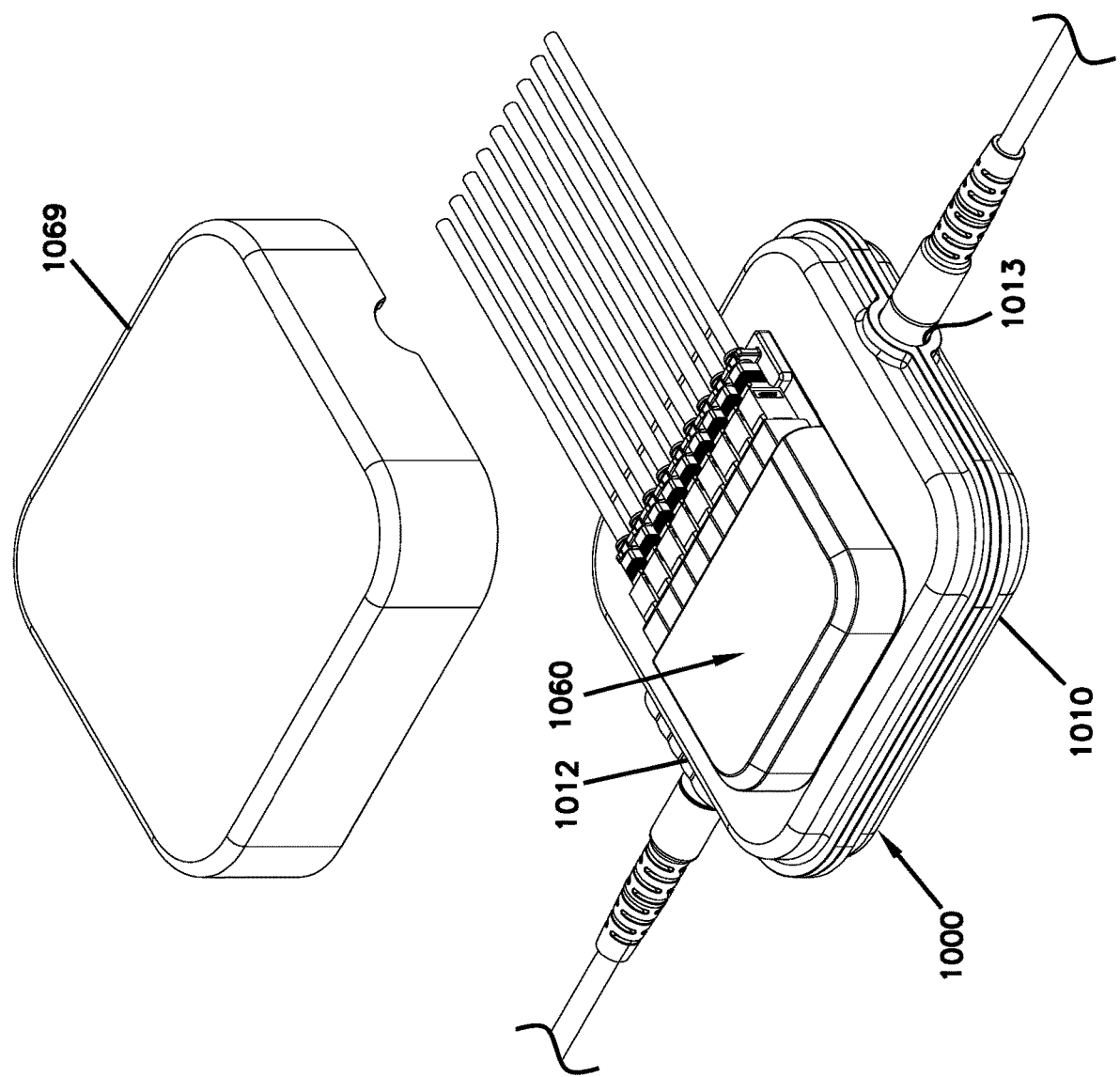
FIG. 48A is a perspective view of the connection terminal and splitter module of FIG. 48 with an outer cover exploded above the splitter module.
Figure 50:
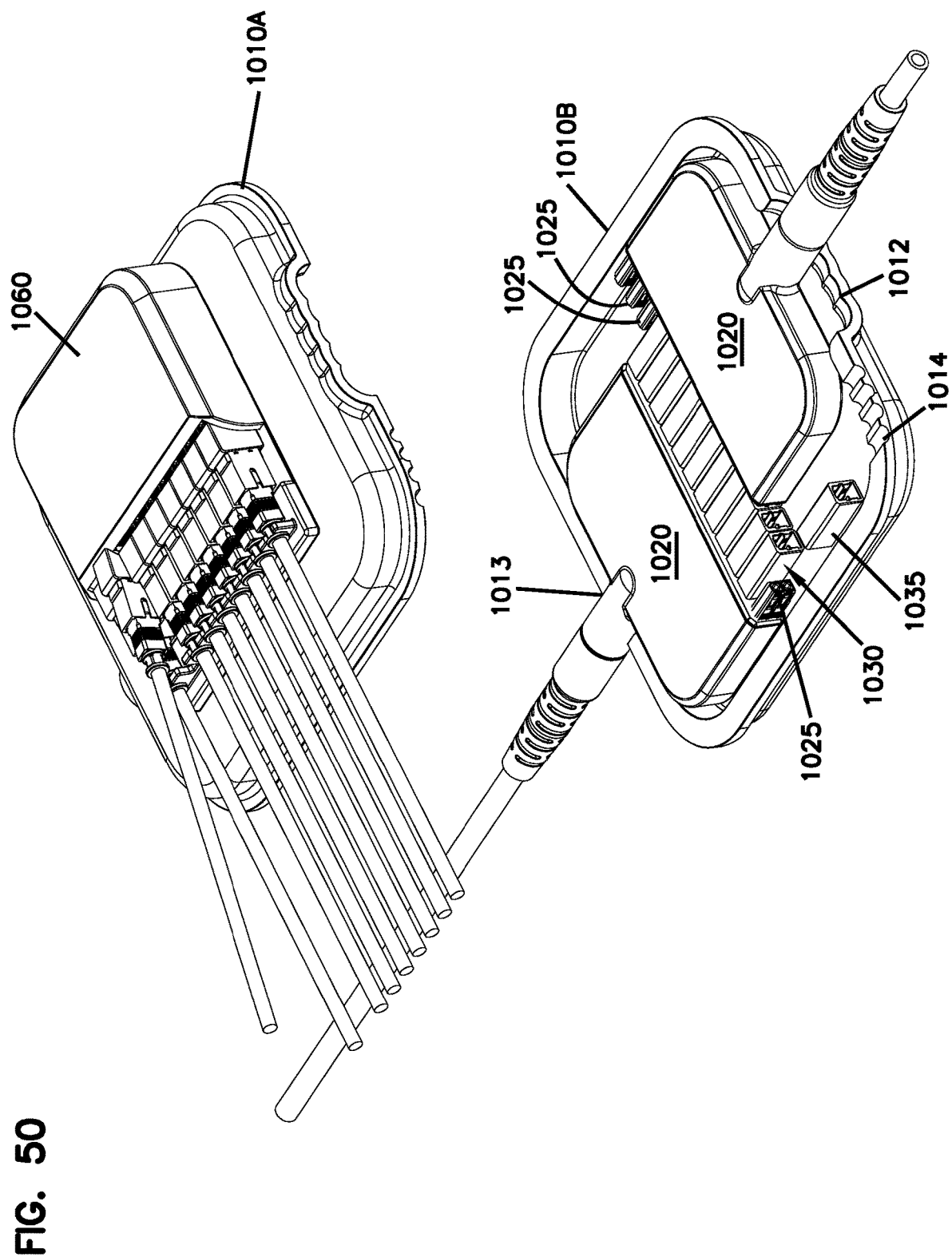
FIG. 50 is an exploded view of the connection terminal of FIG. 48.

As shown in FIG. 48A, an outer cover 1069 can be mounted to the enclosure 1010 to cover the splitter module 1060. In certain examples, the outer cover 1069 inhibits access to the splitter input and outputs 1062, 1065 (e.g., inhibits access to the ports or connections at the ports). The outer cover 1069 defines openings, slots, or notches to accommodate the splitter output cables 1070, tap-off cables 1050, and/or other splitter input cables. In certain implementations, the outer cover 1069 also defines notches to accommodate the sealed ports 1012, 1013.

In certain implementations, the enclosure 1010 holds a coupler arrangement 1030 that optically couples two male connection modules 1020 to each other. In other examples, however, the enclosure 1010 could hold a male connection module 1020 and a female connection module as described above. In the example shown, the coupler arrangement 1030 includes a plurality of separate couplers 1035. In other examples, however, the coupler arrangement 1030 could have a one-piece construction.

Figure 51:
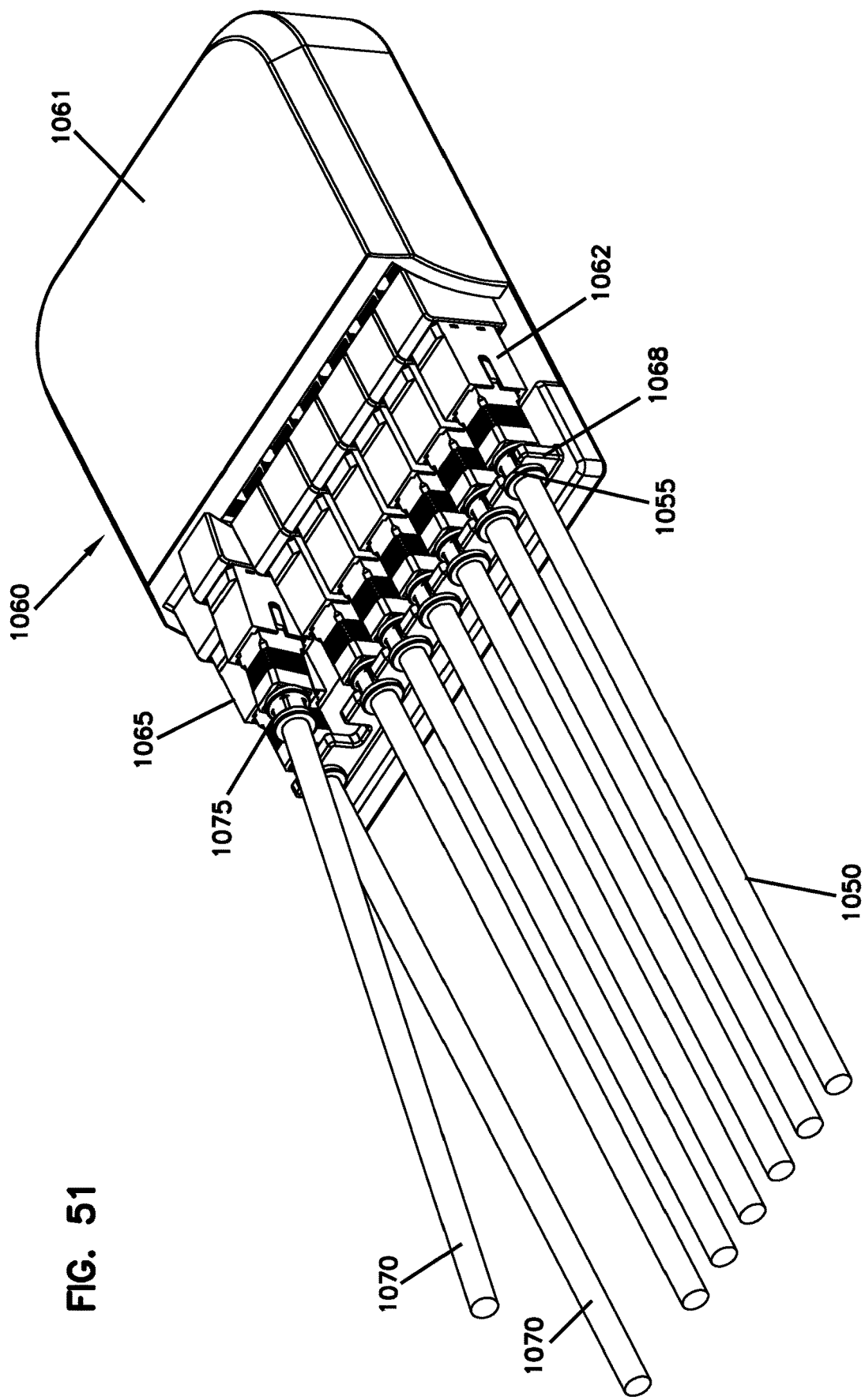
FIG. 51 illustrates an example splitter module shown in FIG. 48 and suitable for use with any of the connection terminals disclosed herein.
Figure 52:
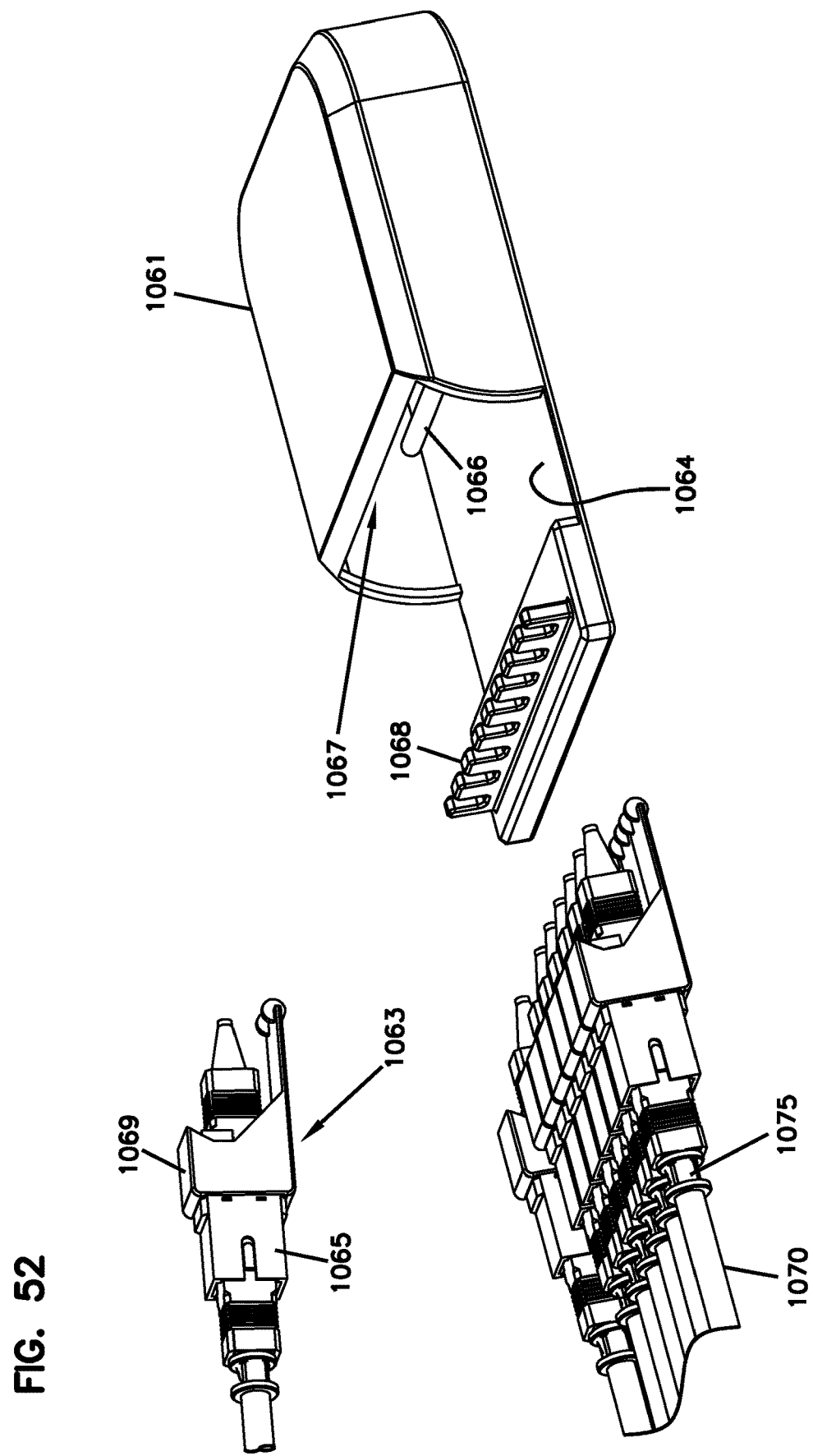
FIG. 52 is an exploded view of the splitter module of FIG. 51.

FIGS. 51 and 52 illustrate an example splitter module 1060 suitable for use with the enclosure 1010. The splitter module 1060 includes a housing 1061 and a plurality of adapter arrangements 1063 that mount to the housing 1061. Each adapter arrangement 1063 holds an input adapter 1062 or output adapter 1065. In some implementations, the adapter arrangements 1063 are pivotally mounted to the adapter arrangements 1063. In certain examples, each adapter arrangement 1063 is configured to pivot relative to the housing 1061 separate from the remaining adapter arrangements 1063.

The housing 1061 defines a pocket 1067 in which pivot mount 1066 is disposed. The adapter arrangements 1063 are pivotally mounted to the housing 1061 at the pivot mount 1066. The adapter arrangements 1063 pivot between raised and lowered positions.

In certain implementations, a base 1064 of the housing 1061 extends out of the pocket 1067. Cable anchors 1068 are disposed at the distal end of the base 1064. When a tap-off cable 1050 or splitter output cable 1070 is plugged into one of the splitter inputs 1062 or outputs 1065, respectively, an anchor 1055, 1075 on the cable 1050, 1070 engages the cable anchor 1068 when the adapter arrangement 1063 is lowered. Raising the adapter arrangement 1063 removes the anchor 1055, 1075 from engagement with the cable anchor 1068.

Figure 53:
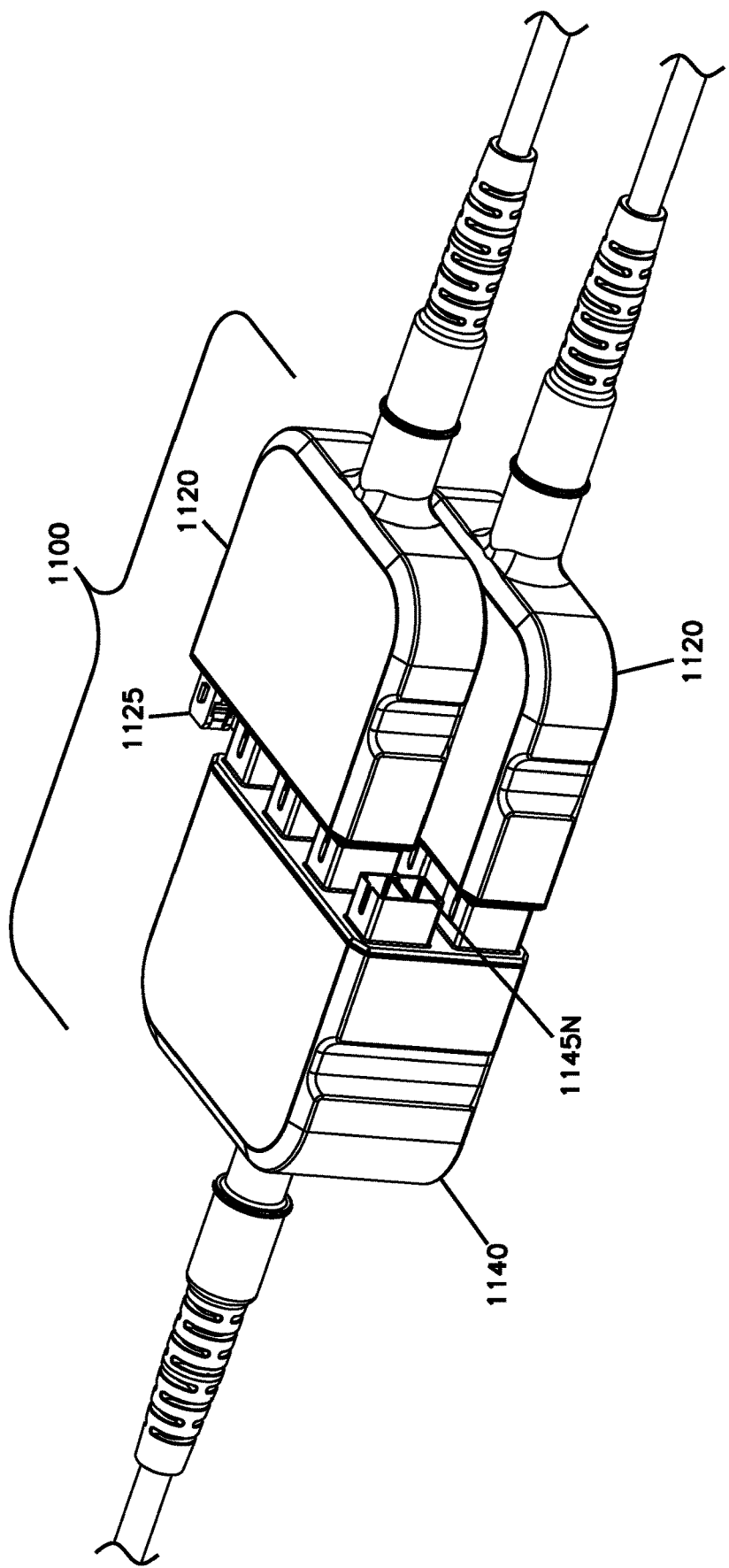
FIG. 53 is a perspective view of multiple connection modules directly optically coupled to the same connection module.
Figure 54:
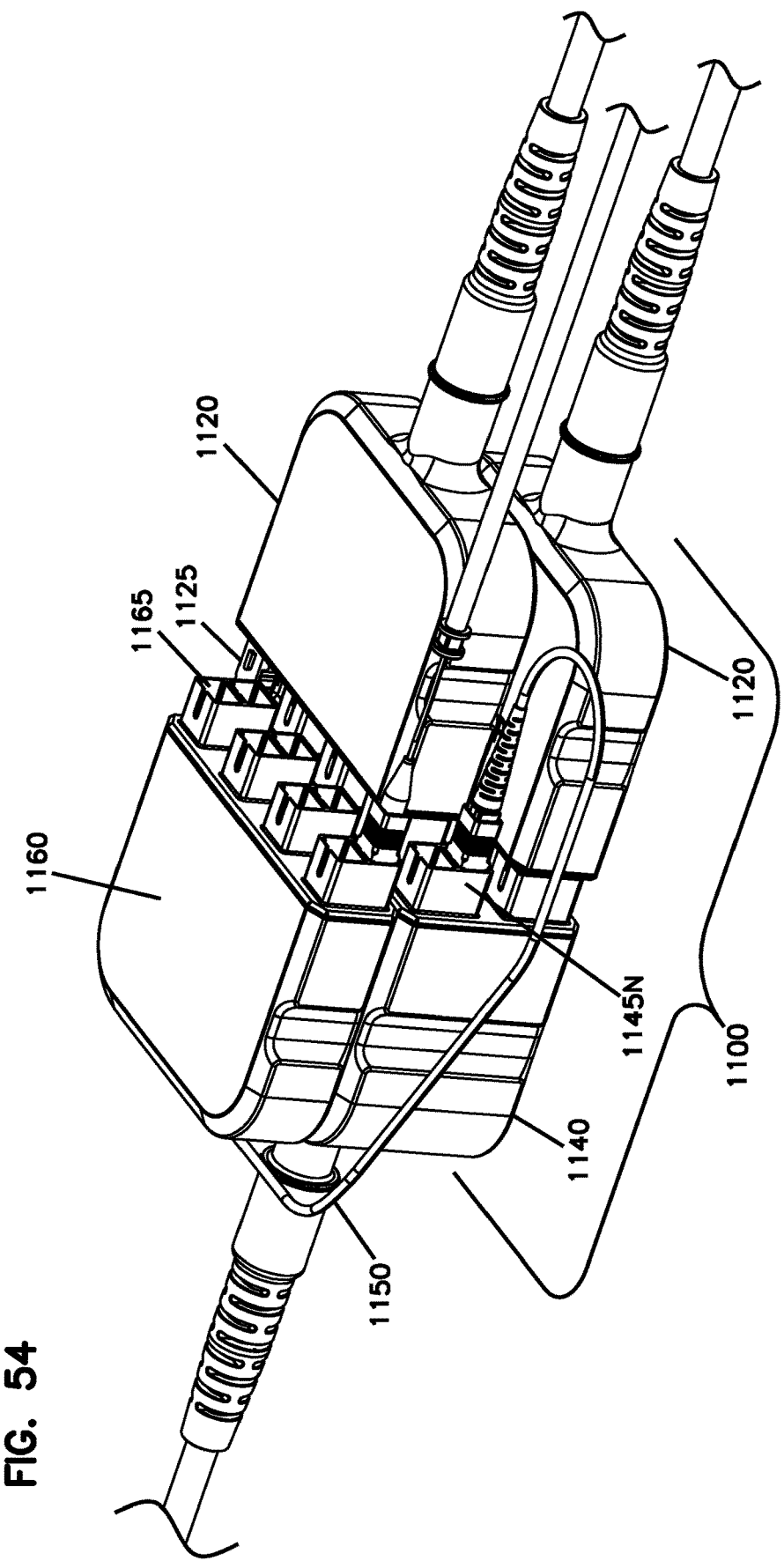
FIG. 54 shows a splitter module mounted to the connection modules of FIG. 53.

FIGS. 53 and 54 illustrate an example terminal 100, 1100 having multiple second connection modules directly optically coupling to a single first connection module. In the example shown, multiple male connection modules 1120 couple to a single female connection module 1140. In other examples, however, multiple female connection modules 1140 could couple to a single male connection module 1120.

In the example shown, the first connection module 1140 defines four rows of connectors 1145. Each of the second connection modules 1120 defines two rows of connectors 1125. One of the second connection modules 1120 directly optically couples to the bottom two rows of the first connection module 1140 and the other of the second connection modules 1120 directly optically couples to the top two rows.

In certain implementations, each of the second connection modules 1120 is separately positioned relative to the first connection module 1140. Accordingly, the second connection modules 1120 can be offset differently relative to the first connection module 1140. For example, in FIG. 53, the first connection module 1140 has accessible tap-off connectors 1145N at the top left side of the module 1140, but not at the bottom left side.

In certain implementation, the connection modules 1120, 1140 are disposed within any of the sealed enclosures disclosed herein.

FIG. 54 shows a splitter module 1160 added to the terminal 1100. A tap-off cable 1150 connects one of the tap-off connectors 1145N to the splitter module input. Splitter outputs 1165 are accessible separate from the tap-off connectors.

Figure 55:
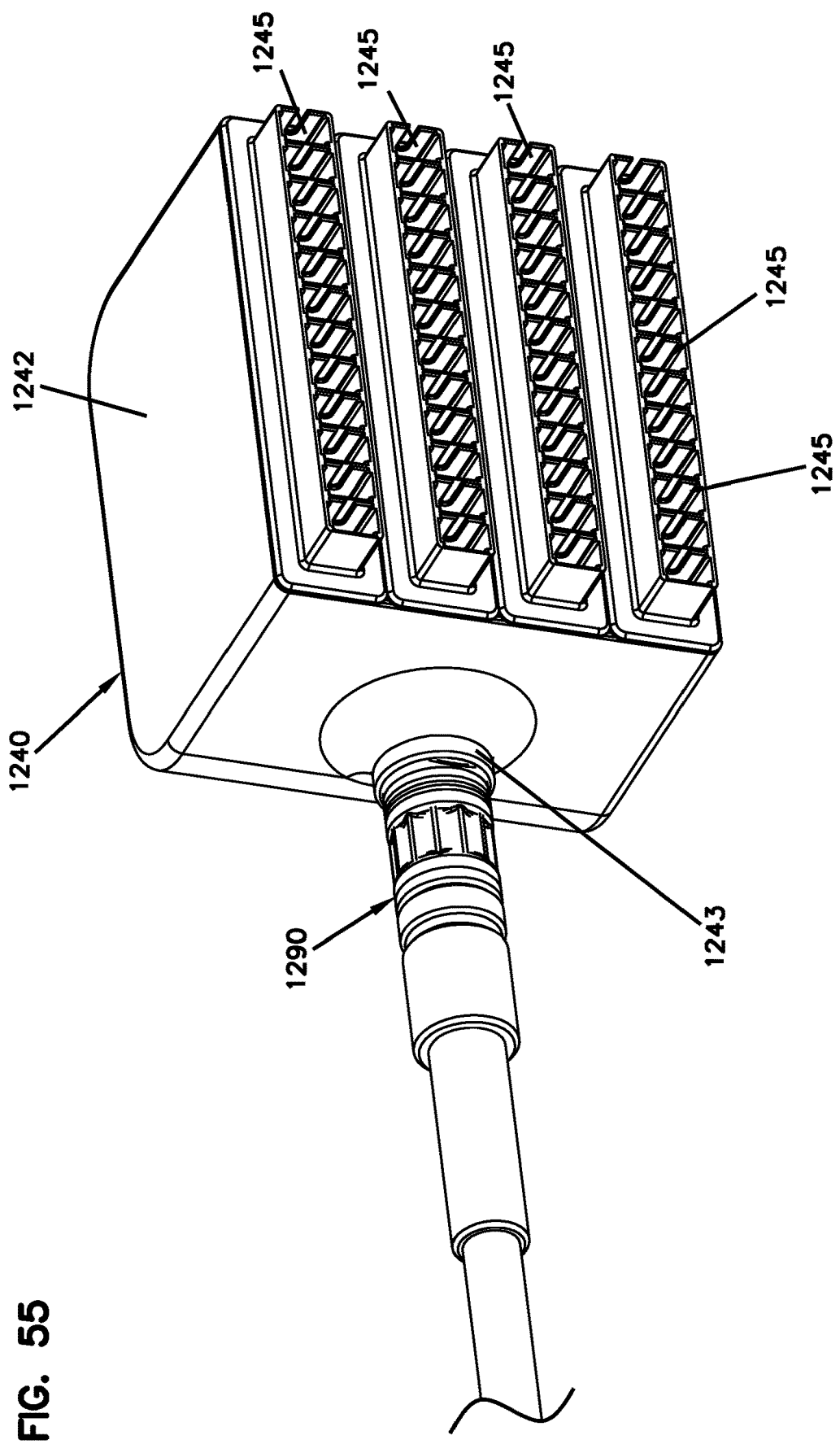
FIG. 55 is a perspective view of another example connection module having four rows of female connectors.

FIG. 55 illustrates an example female connection module 1240 including a fanout body 1242 at which multiple rows of female connectors 1245 are disposed. The fanout body 1242 defines a tapered neck 1243 at which the cable 1241 attaches to the module 1240. In the example shown, the neck 1243 extends orthogonally relative to the insertion axes of the connectors 1245. In other examples, the neck 1243 can extend parallel to the connectors 1245.

Figure 57:
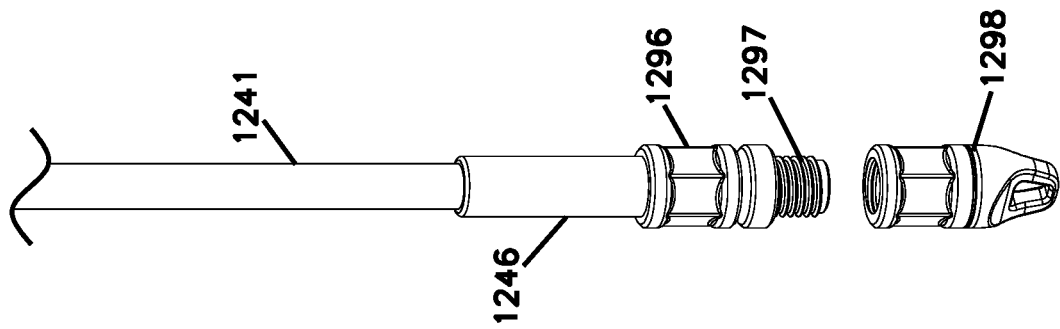
FIG. 57 shows the pulling cap removed from the multi-fiber cable of FIG. 56.
Figure 56:
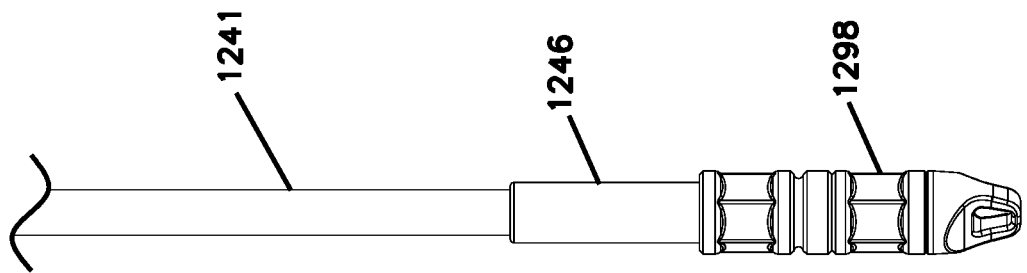
FIG. 56 shows a multi-fiber cable with a pulling cap.

In certain implementations, the cable 1241 attaches to the module 1240 using a twist-to-lock securement arrangement 1290. For example, as shown in FIGS. 56-58, a multi-fiber cable 1241 is terminated by a multi-fiber connector can be mated to a corresponding connector 1299 at the neck 1243 of the connection module 1240. In an example, the multi-fiber connector is a ferrule-less multi-fiber connector that optically couples to the connection module 1240 using an alignment device, such as the alignment device disclosed in WO 2016/043922, the disclosure of which is hereby incorporated herein by reference. In certain examples, the twist-to-lock securement arrangement 1290 includes a threaded section 1297 and a grip section 1296.

As shown in FIG. 56, a pulling cap 1298 can be mounted over the threaded portion 1297 of the multi-fiber connector. The multi-fiber cable 1241 can thereby be pulled through a shaft, duct, vent, or other conduit. When the cable 1241 has been routed, the pulling cap 1298 is removed and the threaded region 1297 of the connector is inserted into a threaded socket 1299 at the neck 1243 of the connection module 1240. Accordingly, the multi-fiber cable 1241 can be terminated at the connection module 1240 without splicing.

In other implementations, however, the twist-to-lock securement arrangement 1290 can be used with any of the connection modules disclosed herein.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An optical connection terminal comprising:
a first connection module terminating a first cable having multiple fibers, the first connection module including at least one row of optical connectors that each terminate at least one of the fibers of the first cable; and
a second connection module terminating a second cable having multiple fibers, the second connection module including at least one row of connectors that each terminate at least one of the fibers of the second cable;
the second connection module operatively coupling to the first connection module so that at least one of the optical connectors of the first connection module directly optically couples with one of the optical connectors of the second connection module, the first connection module being offset relative to the second connection module when the first and second connection modules are operatively coupled; wherein a connection between the at least one optical connector of the first connection module and the optical connector of the second connection module is sealed from an exterior of the terminal.

2. The optical connection terminal as claimed in claim 1, further comprising an enclosure defining a sealed interior, the enclosure defining a first sealed port and a second sealed port leading to the sealed interior, wherein the first connection module and the second connection module are disposed within the sealed interior, wherein the first cable extends into the sealed interior of the enclosure through the first sealed port, and wherein the second cable extends into the sealed interior of the enclosure through the second sealed port.

3. The optical connection terminal as claimed in claim 2, wherein the enclosure defines a sealed tap-off port through which a tap-off cable enters the sealed interior of the enclosure.

4. The connection terminal as claimed in claim 2, wherein each connection module is configured to anchor to the enclosure to hold the respective connection module in a fixed position relative to the enclosure.

5. The optical connection terminal as claimed in claim 1, wherein the first and second connection modules cooperate to define the terminal when operatively coupled together to seal the connection.

6. The connection terminal as claimed in claim 5, wherein the second connection module includes a shroud extending over the row of connectors, the shroud defining an opening leading to a sealing surface recessed within the opening, the opening also leading to the respective row of connectors, the shroud being configured to extend over a portion of the first connection module when the first and second connection modules are operatively coupled.

7. The optical connection terminal as claimed in claim 5, wherein a tap-off port remains accessible from an exterior of the terminal when the connection is sealed.

8. The optical connection terminal as claimed in claim 1, wherein the optical connectors of the first connection module are male; and wherein the optical connectors of the second connection module are female and configured to receive the male connectors of the first connection module.

9. The optical connection terminal as claimed in claim 1, further comprising a coupler arrangement that aligns and optically couples the connectors of the first connection module to the connectors of the second connection module, the coupler arrangement defining a first row of coupler ports and a second row of coupler ports, the second row of coupler ports facing in an opposite direction from the first row of coupler ports, each coupler port of the first row being aligned with one of the coupler ports of the second row.

10. The optical connection terminal as claimed in claim 9, wherein the first row of coupler ports of the coupler arrangement is one of a plurality of rows of coupler ports; and wherein the second row of coupler ports of the coupler arrangement is one of a plurality of rows of coupler ports.

11. The optical connection terminal as claimed in claim 9, wherein the coupler arrangement is formed of a one-piece construction.

12. The optical connection terminal as claimed in claim 9, wherein the coupler arrangement includes multiple separate couplers.

13. The optical connection terminal as claimed in claim 1, wherein each connection module includes a fanout body, the at least one row of connectors accessible from a first end of the fanout body, and the cable attached to a second end of the fanout body, the second end of the fanout body defining a tapered neck.

14. The optical connection terminal as claimed in claim 13, wherein the first and second ends of each fanout body face in opposite directions.

15. The optical connection terminal as claimed in claim 13, wherein the first and second ends of each fanout body face in orthogonal directions.

16. The optical connection terminal as claimed in 13, wherein the row of connectors of at least one of the connection module is slideable relative to the fanout body.

17. The optical connection terminal as claimed in claim 13, wherein the tapered neck of each connection module carries a sealing arrangement including a radial flange that abuts an exterior surface of the enclosure at the respective sealed port.

18. The optical connection terminal as claimed in claim 17, wherein the radial flange is a first radial flange, and wherein the sealing arrangement includes a sealing surface extending between the first radial flange and a second radial flange.

19. The optical connection terminal as claimed in claim 18, wherein the sealing surface has a lens shape.

20. The optical connection terminal as claimed in claim 1, wherein the row of connectors of at least one of the connection modules is one of a plurality of rows of connectors.

21. The optical connection terminal as claimed in claim 1, wherein the first connection module is offset from the second connection module by one connector position.

22. The optical connection terminal as claimed in claim 1, wherein the first connection module is offset from the second connection module by a plurality of connector positions.

23. The optical connection terminal as claimed in claim 1, wherein the first cable is secured to the first connection module using a twist-to-lock fastener.

24. The optical connection terminal as claimed in claim 1, further comprising an optical splitter module having an input and a plurality of outputs, the input of the optical splitter module being optically coupled to one of the connectors of one of the first and second connection modules while the first connection module is operatively coupled to the second connection module.

25. The optical connection terminal as claimed in claim 24, further comprising an enclosure defining a sealed interior in which the first connection module, the second connection module, and the splitter module are disposed.

26. The optical connection terminal as claimed in claim 25, wherein the enclosure includes a divider wall, wherein the optical splitter is disposed at an opposite side of the divider wall from the first and second connection modules, and wherein the enclosure is partially openable to provide access to the outputs of the optical splitter without providing access to the first and second connection modules.

27. An optical connection terminal comprising:
a first connection module terminating a first cable having multiple fibers, the first connection module including at least one row of optical connectors that each terminate at least one of the fibers of the first cable;
a second connection module terminating a second cable having multiple fibers, the second connection module including at least one row of connectors that each terminate at least one of the fibers of the second cable, the second connection module operatively coupling to the first connection module so that at least one of the optical connectors of the first connection module directly optically couples with one of the optical connectors of the second connection module; wherein a connection between the at least one optical connector of the first connection module and the optical connector of the second connection module is sealed from an exterior of the terminal; and
an enclosure defining a sealed interior, the enclosure defining a first sealed port and a second sealed port leading to the sealed interior, wherein the first connection module and the second connection module are disposed within the sealed interior, wherein the first cable extends into the sealed interior of the enclosure through the first sealed port, and wherein the second cable extends into the sealed interior of the enclosure through the second sealed port, wherein the enclosure defines a sealed tap-off port through which a tap-off cable enters the sealed interior of the enclosure.

28. An optical connection terminal comprising:
a first connection module terminating a first cable having multiple fibers, the first connection module including at least one row of optical connectors that each terminate at least one of the fibers of the first cable; and
a second connection module terminating a second cable having multiple fibers, the second connection module including at least one row of connectors that each terminate at least one of the fibers of the second cable;
the second connection module operatively coupling to the first connection module so that at least one of the optical connectors of the first connection module directly optically couples with one of the optical connectors of the second connection module, wherein the first and second connection modules cooperate to define the terminal when operatively coupled together to seal the connection; wherein a connection between the at least one optical connector of the first connection module and the optical connector of the second connection module is sealed from an exterior of the terminal, wherein a tap-off port remains accessible from an exterior of the terminal when the connection is sealed.

29. An optical connection terminal comprising:
a first connection module terminating a first cable having multiple fibers, the first connection module including at least one row of optical connectors that each terminate at least one of the fibers of the first cable; and a second connection module terminating a second cable having multiple fibers, the second connection module including at least one row of connectors that each terminate at least one of the fibers of the second cable, the second connection module operatively coupling to the first connection module so that at least one of the optical connectors of the first connection module directly optically couples with one of the optical connectors of the second connection module; wherein a connection between the at least one optical connector of the first connection module and the optical connector of the second connection module is sealed from an exterior of the terminal; and
a coupler arrangement that aligns and optically couples the connectors of the first connection module to the connectors of the second connection module, the coupler arrangement defining a first row of coupler ports and a second row of coupler ports, the second row of coupler ports facing in an opposite direction from the first row of coupler ports, each coupler port of the first row being aligned with one of the coupler ports of the second row.

30. An optical connection terminal comprising:
a first connection module terminating a first cable having multiple fibers, the first connection module including at least one row of optical connectors that each terminate at least one of the fibers of the first cable; and
a second connection module terminating a second cable having multiple fibers, the second connection module including at least one row of connectors that each terminate at least one of the fibers of the second cable, the second connection module operatively coupling to the first connection module so that at least one of the optical connectors of the first connection module directly optically couples with one of the optical connectors of the second connection module; wherein a connection between the at least one optical connector of the first connection module and the optical connector of the second connection module is sealed from an exterior of the terminal,
wherein each connection module includes a fanout body, the at least one row of connectors accessible from a first end of the fanout body, and the cable attached to a second end of the fanout body, the second end of the fanout body defining a tapered neck.

31. An optical connection terminal comprising:
a first connection module terminating a first cable having multiple fibers, the first connection module including at least one row of optical connectors that each terminate at least one of the fibers of the first cable;
a second connection module terminating a second cable having multiple fibers, the second connection module including at least one row of connectors that each terminate at least one of the fibers of the second cable, the second connection module operatively coupling to the first connection module so that at least one of the optical connectors of the first connection module directly optically couples with one of the optical connectors of the second connection module; wherein a connection between the at least one optical connector of the first connection module and the optical connector of the second connection module is sealed from an exterior of the terminal; and
an optical splitter module having an input and a plurality of outputs, the input of the optical splitter module being optically coupled to one of the connectors of one of the first and second connection modules while the first connection module is operatively coupled to the second connection module in an offset configuration.

\* \* \* \* \*